(12) United States Patent
Kawai et al.

(10) Patent No.: US 6,603,481 B1
(45) Date of Patent: *Aug. 5, 2003

(54) GEOMETRY PROCESSOR CAPABLE OF EXECUTING INPUT/OUTPUT AND HIGH SPEED GEOMETRY CALCULATION PROCESSING IN PARALLEL

(75) Inventors: Hiroyuki Kawai, Hyogo (JP); Robert Streitenberger, Hyogo (JP); Yoshitsugu Inoue, Hyogo (JP); Keijiro Yoshimatsu, Hyogo (JP); Junko Kobara, Hyogo (JP); Hiroyasu Negishi, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,002

(22) Filed: Apr. 19, 1999

(30) Foreign Application Priority Data

Nov. 9, 1998 (JP) .......................................... 10-318190

(51) Int. Cl.$^7$ ............................................. G06F 15/80
(52) U.S. Cl. ..................... 345/505; 345/558; 345/520; 345/572
(58) Field of Search ................................ 345/505, 506, 345/501–503, 520, 558, 572, 522, 559, 536, 537, 619, 643; 708/495

(56) References Cited

U.S. PATENT DOCUMENTS

| 5,230,039 | A | * | 7/1993 | Grossman et al. | .......... | 345/582 |
| 5,357,599 | A | * | 10/1994 | Luken | .......... | 345/423 |
| 5,440,682 | A | | 8/1995 | Deering | .......... | 345/505 |
| 5,999,196 | A | * | 12/1999 | Storm et al. | .......... | 345/505 |

FOREIGN PATENT DOCUMENTS

JP 7-105388 4/1995

* cited by examiner

Primary Examiner—Kee M. Tung
(74) Attorney, Agent, or Firm—McDermott, Will & Emery

(57) ABSTRACT

The geometry processor includes mutually independent first and second external interface ports connected to a host processor, and a rendering processor, respectively, and a geometry calculation core which processes a geometry calculation applied through the first external interface port from the host processor. The geometry calculation core includes a plurality of SIMD type floating point calculating units, a floating point power computing unit, an integer calculating unit, a controller responsive to an instruction from the host processor which controls the plurality of floating point calculating units, the floating point power computing unit and the integer calculating unit to process data from the host processor, and an output controller which outputs the processed data to the rendering processor through the second external interface port.

11 Claims, 32 Drawing Sheets

GEOMETRY PROCESSOR CAPABLE OF EXECUTING INPUT/OUTPUT AND HIGH SPEED GEOMETRY CALCULATION PROCESSING IN PARALLEL

BACKGROUND OF THE INVENTION

1. Field of the Invention

The present invention relates to a geometry processor for three-dimensional (3D) graphics of SIMD (Single-Instruction stream and Multiple-Data stream) type and, more specifically, to a geometry processor for 3D graphics capable of performing input/output to and from peripherals in parallel with geometry calculation.

2. Description of the Background Art

Recently, widening range of objects of image processing has developed a demand for systems requiring 3D graphics processing. It is often the case that such systems require real time processing.

It is noted that image processing, especially 3D graphics processing has the following features.

(1) Frequent conditional branching (2) Computation of inverse (1/x), square root ($\sqrt{x}$), inversed square root ($1/\sqrt{x}$), x raised to the ath power (a representing floating point data)

(3) Calculation of product and summation (c=a×b+c)

Such calculations require formidable amount of computation. For this reason, there has not been any geometry processor having such an architecture that is capable of processing all these calculations at high speed. Accordingly, in the conventional system involving image processing, the time of processing has been made long because of the slow speed of calculation of the 3D graphics processing.

SUMMARY OF THE INVENTION

Therefore, an object of the present invention is to provide a geometry processor capable of processing geometry calculations at high speed, and to provide a floating point power computing apparatus and a data output control apparatus used in the processor.

Another object of the present invention is to provide a geometry processor capable of processing geometry calculation at high speed and in addition, capable of data input/output to and from peripherals at high speed, and to provide a floating point power computing apparatus and a data output control apparatus, used in the processor.

Another object of the present invention is to provide a geometry processor capable of processing calculations frequently encountered in geometry calculations to enable high speed processing of geometry calculations and in addition, capable of input/output of data to and from peripherals at high speed, and to provide a floating point power computing apparatus and a data output control apparatus used in the processor.

A still further object of the present invention is to provide a geometry processor capable of geometry calculations and data input/output to and from peripherals at high speed, and in addition, capable of executing data input/output and geometry calculations in parallel, as well as to provide a floating point power computing apparatus and a data output control apparatus used in the processor.

The geometry processor in accordance with the present invention includes: first and second external interface ports independent from each other, connected to a host processor and a rendering processor (Rendering Controller: RC), respectively; and a geometry calculation core for processing geometry calculation applied through the first external interface from the host processor. The geometry calculation core includes: a plurality of SIMD type floating point calculating units; a floating point power computing unit; an integer calculating unit; a controller for processing data from the host processor by controlling the plurality of floating point calculating units, floating point power computing unit and the integer calculating unit, in response to an instruction from the host processor; and an output controller for outputting the processed data to the rendering processor through the second external interface.

In the geometry processor in accordance with the present invention, the geometry calculation core includes the floating point calculating unit employing the SIMD type architecture, and further employs the floating point power computing unit and the integer calculating unit. This allows high speed processing of geometry calculation especially in the 3D graphic system. Further, as the geometry processor has three external interfaces, data output after calculation and operation of the geometry calculation core can be executed in parallel.

Preferably, the geometry calculation core further includes: a first data bus capable of communication with the first and second external interface ports, the plurality of floating point calculating units, the floating point power computing unit, the integer calculating unit and the controller; a second data bus connecting the plurality of floating point calculating units and the floating point power computing unit; a third data bus for applying data received from the plurality of floating point calculating units and the floating point power computing unit to the second external interface port; and first, second and third address buses capable of communicating with the first external interface port, the plurality of floating point calculating units, the geometry processor, the integer calculating unit and the controller, for carrying three addresses generated by the controller. The first data bus is capable of data multicasting among components connected to the first data bus.

Data necessary for calculating process can all be prepared in one cycle, and at the same time, results of calculating process can be stored in the destinations. Accordingly, pipeline processing can be implemented easily, and the speed of processing is improved.

More preferably, the second data bus includes a first uni-directional data bus for applying outputs of the plurality of floating point calculating units to the geometry processor, and a second uni-directional data bus for applying an output of the geometry processor to the plurality of floating point calculating units.

As two data buses are used for data exchange within the geometry calculation core, the wait time until the data bus is granted is eliminated, resulting in faster processing.

More preferably, the geometry processor further includes an output FIFO (First-In First-Out buffer) provided between the third data bus and the second external interface. The third data bus has a function of converting parallel data as the outputs of geometry processor for 3D graphics and the geometry processor to serial data and to apply the resulting data to the output FIFO. The data output accompanied with serial data conversion to the output FIFO is executed parallel to and independent from the processing in the geometry calculation core. This enables multiplexing of processings, further improving the speed of operation.

In another configuration, the controller of the geometry processor includes: an instruction memory for storing a graphic processing instruction applied through the first external interface port; a sequencer decoding an instruction stored in the instruction memory and controlling operation sequences of the plurality of floating point calculating units, the geometry processor and the integer calculating unit in accordance with the result of decoding; and an address generating circuit which generates three addresses to be output to the first, second and third address buses under the control of the sequencer.

The sequencers of calculations are controlled by a controller separate from the host processor, and three addresses for executing calculations are generated and output to three address buses. Therefore, execution cycle of calculation can be made short, and the overall processing speed is improved.

According to another aspect of the present invention, the geometry processor includes: an external interface port connected to a host processor and including a first register storing information to be exchanged with the host processor; a geometry calculation core for processing an instruction applied from the host processor through the external interface; a second register; and a circuit for copying contents of the first register applied from the host processor to the second register. The geometry calculation core operates in accordance with the contents of the second register. The geometry processor further includes a circuit for performing communication with the host processor and the external interface port, parallel to the operation of the geometry calculation core in accordance with the contents of the second register.

After the contents of the first register are copied to the second register, it becomes possible to perform the operation of the geometry calculation core based on the contents of the second register and the processing of storing the second instruction to the first register. This allows multiplexing of processings, improving speed of operation.

More preferably, the geometry processor further includes an input FIFO for storing data applied from the host processor to the geometry calculation core. The geometry calculation core accesses the input FIFO and if the input FIFO is empty, it temporarily stops its operation.

According to a still further aspect of the present invention, the floating point power computing apparatus includes a look-up table including a logarithmic table having a prescribed number (for example, 2) as a base for certain numbers and a power table having the aforementioned prescribed number as a base for certain numbers, for receiving an input of a certain number and outputting the corresponding logarithmic or a corresponding power; and a calculating circuit receiving inputs of a first number represented by first floating point data and a second number n, for computing, with reference to the look-up table, the first number raised to the nth power.

The power can be calculated by a simple structure and the process of calculation can be implemented in pipelines. Therefore, graphics processing involving frequent power calculations can be done at a higher speed.

According to another aspect of the present invention, the data output control apparatus includes: a data bus connected to a plurality of calculation processing units each having a prescribed memory for storing result of calculating process and receiving data from the prescribed memory; an output FIFO including a plurality of output FIFO banks each having a storing section and an address section for the storing section; and a burst transfer control connected between the data bus and the output FIFO, responsive to an address signal and a data output request applied from the calculation processing unit through the data bus, which reads data from the prescribed memory and transfers burst of the data to a position determined by the address signal of that one of the plurality of output FIFO banks which is determined by the data output request.

In response to the output request from the calculation processing unit, data transfer to the output FIFO is performed in burst, and therefore output processing itself can be done at high speed. Further, in this period, it is possible for the calculation processing unit to execute the next calculating process parallel to the data output, and therefore the overall processing speed can further be improved.

Preferably, the burst transfer controller includes: a circuit receiving the number of data to be transferred from the calculation processing unit which has output the data output request, counting the number of data blocks to be burst-transferred and detecting termination of transfer; a circuit which generates and applies to the output FIFO a write pointer of the output FIFO based on the address signal; and a circuit responsive to a signal indicating whether writing is possible or not applied from the output FIFO which controls continuation and stopping of data transfer to the output FIFO.

Even when reception of data is not possible because of data left in the output FIFO, data output can be controlled without the necessity of control by the host processor or the calculation processing unit. Therefore, the load on the calculation processing unit for ensuring normal output processing is not increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in the following. In the embodiments, the geometry processor for 3D graphics in accordance with the present invention is described as implemented in the form of a board added to a computer system (a so-called "add-in board" or "add-in card") having a PCI (Peripheral Component Interface) bus. Application of the present invention, however, is not limited thereto. Any implementation is possible provided that it is connected to the host CPU (Central Processing Unit) through bus interconnection. The present invention may be mounted on one board together with other apparatuses, or it may be implemented integrally with the CPU as an LSI Large-Scale Integration).

Figure 1:
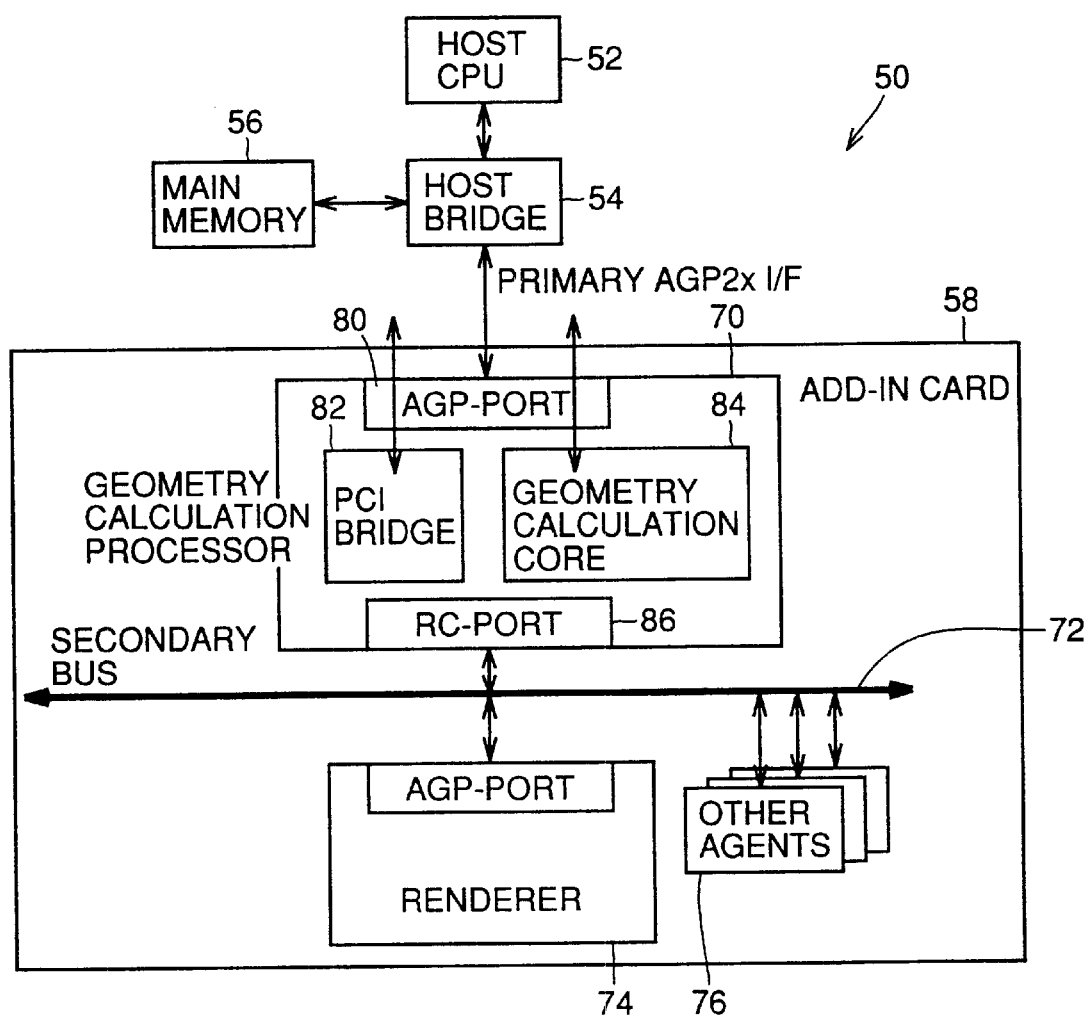
FIG. 1 is a block diagram of a computer system including an add-in card having the geometry processor for 3D graphics in accordance with the present invention.

Referring to FIG. 1, an embodiment of the present invention will be described. Referring to FIG. 1, the first embodiment of the present invention will be described. A computer system 50 as an example includes a host CPU 52, a main memory 56 connected to host CPU 52 through a host bridge 54, and an add-in card 58. Add-in card 58 is the card for graphic processing in accordance with the present invention.

Add-in card 58 includes a secondary bus 72; a geometry calculation processor 70 implementing bridging function with the PCI bus of host CPU 52 and including a geometry calculation engine (geometry calculation core) for performing 3D graphics processing in accordance with the present invention; and a renderer 74 and a plurality of agents 76 connected to secondary bus 72.

The geometry calculation processor 70 is an LSI suitable for performing geometry calculation processing in the 3D graphic processing system. The geometry calculation process requires high calculation precision and large computing power. For this reason, geometry calculation processor 70 adopts SIMD type architecture to improve processing power, as will be described later.

Referring to FIG. 1, generally speaking, geometry calculation processor 70 includes: an AGP (Accelerated Graphics Port) port 80 for interfacing with host bridge 54; an RC port for interfacing with secondary bus 72; a PCI bridge 82 for implementing PCI bridge function with AGC port 80 and RC port 86; and a geometry calculation core 84 for performing 3D geometry calculation processing.

Figure 2:
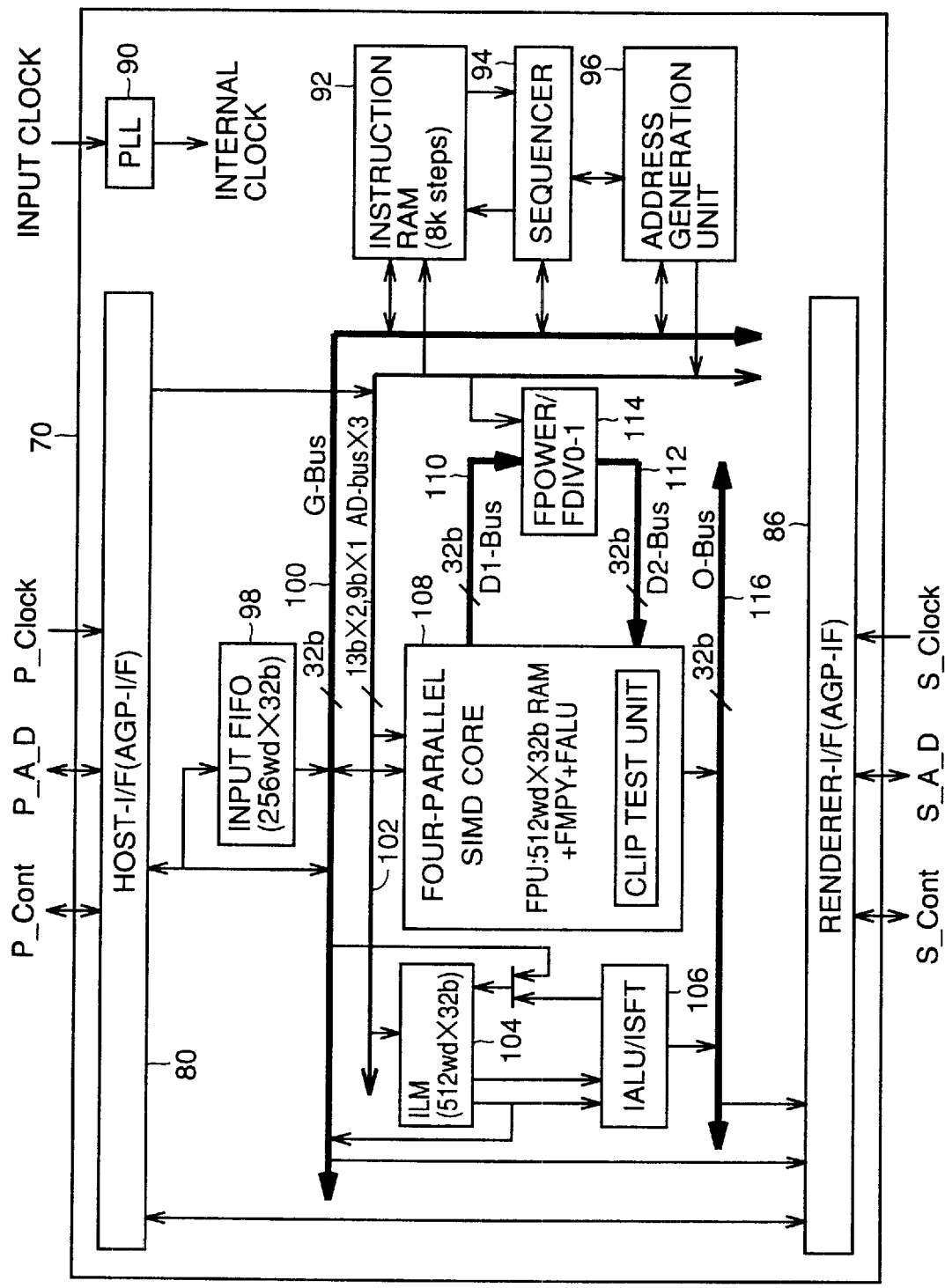
FIG. 2 is a block diagram of the geometry processor for 3D graphics in accordance with the present invention.

Referring to FIG. 2, details will be described. Of geometry calculation processor 70, geometry calculation core 84 includes: an input FIFO 98 connected to AGP port 80; G (Global)-Bus 100 connected to AGP port 80 and input FIFO 98; an AD (ADdress)-Bus 102 connected to AGP port 80 and G-Bus 100; an ILM (Instruction processing unit Local Memory) 104 connected to AD-Bus 102; an IPU (Instruction Processing Unit) 106 connected to ILM 104; and an O (Output)-Bus 116 connected to an output of IPU 106. O-Bus 116 is further connected to RC port 86.

Geometry calculation core 84 includes: an SIMD core 108 connected to G-Bus 100 and AD-Bus 102 for performing the floating point calculation process having the above described SIMD architecture; a 32 bit D1 (Data 1)-Bus 110 receiving an output from SIMD core 108; an FPOWER (Floating point POWER)/FDIV (Floating point DIVision) section 114 connected to AD-Bus 102 and D1-Bus 110; and a D2 (D)ata 2)-Bus 112 for providing an output of FPOWER/FDIV section 114 to SIMD core 108. The output of SIMD core 108 is also connected to O-Bus 116.

The geometry calculation core 84 further includes: an instruction memory 92 connected to G-Bus 100 and AD-Bus 102; a sequencer 94 connected to G-Bus 100 for controlling sequence of instructions read from instruction memory 92; an AGU (Address Generating Unit) 96 connected to G-Bus 100, AD-Bus 102 and sequencer 94; and a PLL (Phase Locked Loop) 90 for supplying a prescribed clock signal to these components.

Figure 3:
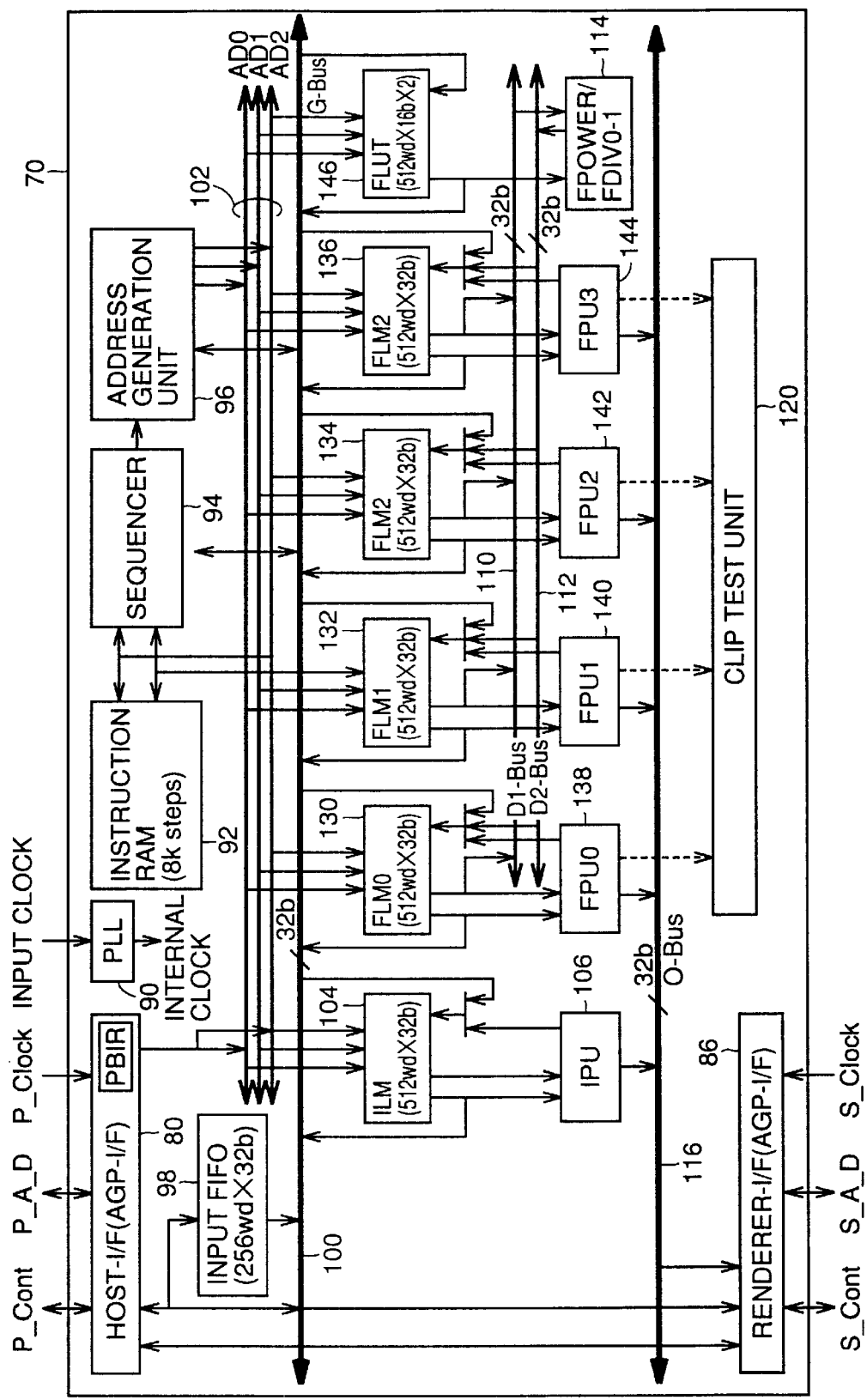
FIG. 3 is a detailed block diagram of the geometry processor for 3D graphics in accordance with the present invention.

FIG. 3 shows, in greater detail, connections between each of the components. Referring to FIG. 3, AD-Bus 102 includes three address buses (AD-Bus) AD0–AD2. SIMD core 108 includes four floating point calculating apparatuses and a clip test unit 120. Floating point calculating apparatuses respectively include floating point calculating units FPU0 (138) to FPU3 (144) and local memories FLM0 (130) to FLM3 (136). Geometry calculation processor 70 further includes two floating point dividing apparatuses (FDIV0, FDIV1) provided in FPOWER/FDIV section 114, a floating point FPOWER calculating circuit 314, an IPU 106 for integer calculation (ALU (Arithmetic Logic Unit) and a shifter) and an ILM 104 which is a local memory for the IPU. This configuration improves processing power of lighting calculation. Floating point calculations are all compliant with IEEE-754 single precision data format.

Two AGP ports, that is, AGP port 80 and RC port 86 are used for the interface with the host and the renderer, respectively. These ports are each a 32 bit interface operating at double edges of 66 MHz clock. For higher and flexible system data flow, the present system is provided with bridging function with DMA (Direct Memory Access) function. This facilitates configuration of the 3D graphics system having a renderer LSI supporting AGP-I/F.

The geometry processor for 3D graphics may have a system configuration with two processors and two renderers, which further improves the system performance. The architecture of the processor system will be described in the following.

(1) Architecture

(1.1) PCI-I/F (Interface) unit

The PCI interface within the geometry processor for 3D graphics has two functions. First, it acts as an interface between the primary PCI bus and the geometry calculation core. Second, it provides a PCI-PCI bridge function between the primary PCI bus and the secondary PCI bus. This function is provided for connecting devices (agents) located on the secondary bus with the primary bus.

These functions are implemented by PCI_I_O_BRIDGE module, which consists of eight submodules. The submodules will be described in the following.

(1.1.1) [PRIM_I_O]

This submodule handles the asynchronous data exchange between the primary PCI bus and the secondary PCI bus with the geometry calculation core. The module is controlled by two state machines, one for the master function and the other for the target function. If acting as a master, a DMA transfer is carried out. If acting as a target, an FSM (finite state machine) channels the data through the buffers and interacts with the state machines of the secondary PCI bus and the geometry calculation core. PRIM_I_O further includes a configuration space, a PCI register and a flag required for configuring the computer system 50.

(1.1.2) [SEC_I_O]

SEC_I_O handles the asynchronous data exchange between the secondary PCI bus and the primary PCI bus with the geometry calculation core. Since this submodule acts exclusively as a master, it is controlled by only one state machine for the master. Actually, SEC_I_O is triggered only by two sources, that is, the primary PCI bus and the geometry calculation core, except for interrupts on the secondary PCI bus, and therefore it acts as a "slave" for this. When activated, SEC_I_O submodule inputs/outputs data through respective buffers. Further, SEC_I_O submodule includes an arbiter for the secondary PCI bus.

(1.1.3) [GE_I_O]

GE_I_O submodule handles the asynchronous data exchange between the geometry calculation core and the primary PCI bus. When data input/output to and from the geometry calculation core is necessary, a state machine inside the GE_I_O interacts with sequencer 94 in geometry calculation core and generates proper control and address signals (converting the PCI address into internal address of the geometry calculation core).

(1.1.4) [FIFO_P2S, FIFO_P2C, FIFO_C2S]

FIFO_P2S submodule is a posting buffer with a capacity of 16×36 bits for data and 2×32 bits register capacity for addresses. FIFO_P2C submodule is a posting buffer with a capacity of 32×36 bits for data. FIFO_C2S submodule is a posting buffer with a capacity of 32×36 bits for data and 4×32 bits register capacity for addresses. A dual port RAM (Random Access Memory) is used for emulating the FIFOs. Each FIFO is capable of asynchronous handshake with the respective interface. If the corresponding flag is set, all buffers can be bypassed.

(1.1.5) [FIFO_S2P, FIFO_C2P]

These submodules are prefetching buffers with a capacity of 8×32 bits for data. Each FIFO is capable of asynchronous handshake with the corresponding interface. If the corresponding flag is set, all buffers can be bypassed.

(1.2) Geometry Calculation Core

Figure 4:
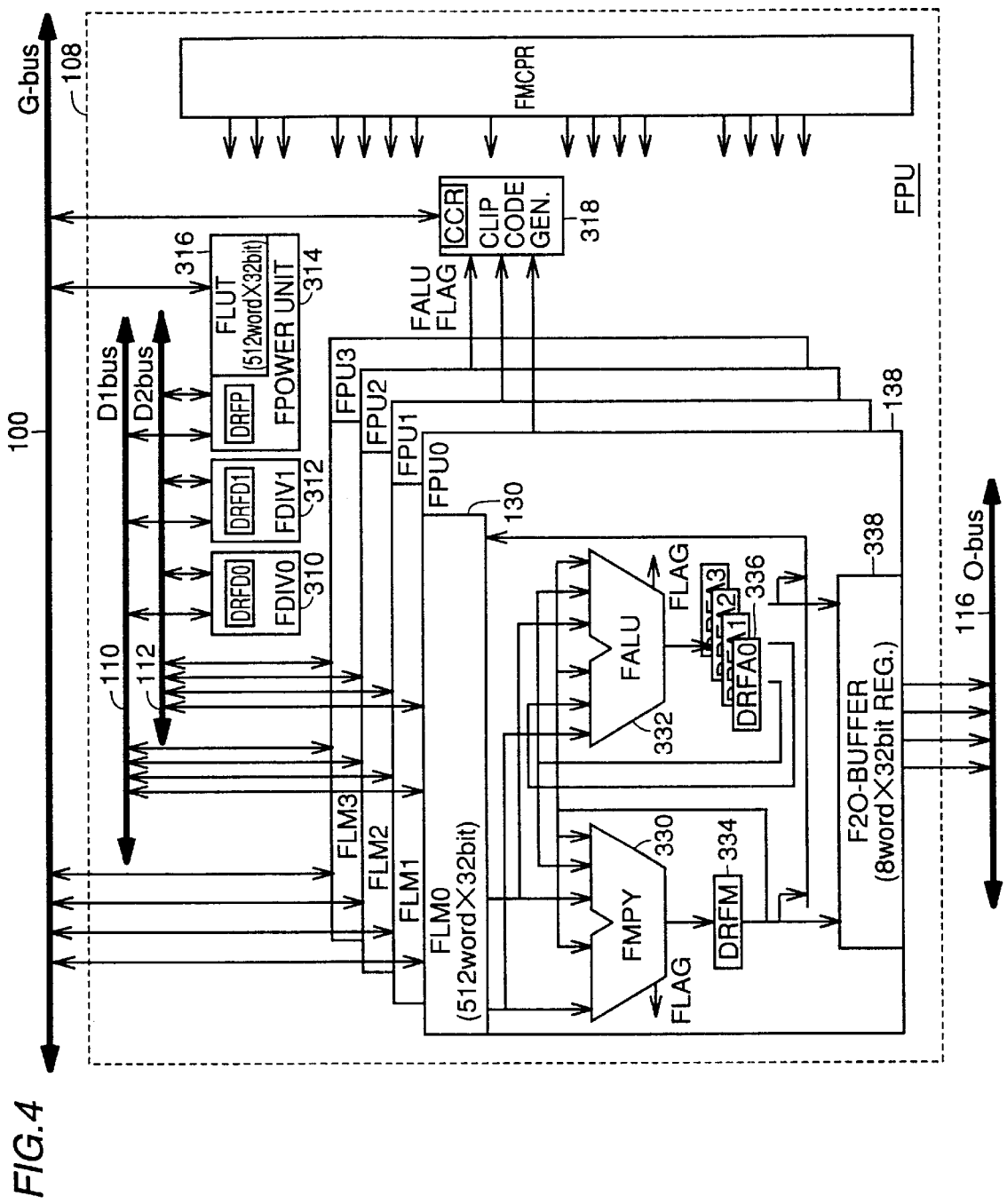
FIG. 4 is a block diagram of the floating point calculating apparatus.

Referring to FIG. 2, as already described, geometry calculation core 82 includes SIMD core 108, FPOWER/FDIV section 114, instruction memory 92, sequencer 94 and AGU 96. Referring to FIG. 4, geometry calculation core 84 further includes a clip code generators 318 (CCG) and an FMCPR 340. FPOWER/FDIV section 114 includes floating point dividers (FDIV0 (310) and FDIV1 (312)) and a floating point power calculator (FPOWER calculating circuit 314). FPOWER calculating circuit 314 also functions as a floating point square root calculator (FSQRT) and an integer square root calculator (FISQRT), and used for vector normalization.

(1.2.1) [Bus Structure]

Data movement in the geometry calculation core occurs over two global buses and two local buses. The two global buses are called G-Bus 100 and O-Bus 116 shown in FIGS. 2 and 3. The local buses are called D1-Bus 110 and D2-Bus 112 in SIMD core 108 shown in FIGS. 2 and 3. All these buses are 32-bit wide.

G-Bus 100 can transfer data between FIFO_P2GE or input FIFO 98 and data memories (FLM0 (130) to FLM3 (136) and ILM 104), or between data memory/control register and data memory/control register. O-Bus 116 supports a data transfer from the geometry calculation core to renderer LSI. Data from the geometry calculation core are transmitted to the output FIFO through O-Bus 116 which is a unidirectional data bus. D1-Bus 110 and D2-Bus 112 are for transferring data between each of the floating point calculating units in SIMD core 108 and to floating point calculating apparatuses and the floating point power calculator included in FPOWER/FDIV section 114. D1-Bus 110 is a uni-directional bus from each floating point calculating unit to FPOWER/FDIV section 114, and D2-Bus 112 is a unidirectional bus from FPOWER/FDIV section 114 to each floating point calculating unit. As these two data buses are used locally, wait time until the data bus is granted can be eliminated and therefore processes can easily be realized in pipeline manner, and hence the speed of processing can be improved.

Three source address buses AD0–2 of AD-Bus 102 are each a uni-directional bus. AD0 is a 9 bit source 0 address bus. AD1 is a 13 bit source 1 address bus. AD2 is a 13 bit source 2 address bus. AD1 is also used for PCI "memory read" from internal data memories and/or control registers. AD2 is also used for PCI "memory write" to internal data memories and/or control registers. FLUT (Floating point processing unit Look Up Table) 146 within FPOWER calculation circuit 314 is accessible with AD1 and AD2 only by the PCI "memory read/write".

(1.2.2) [SIMD Geometry Processing Core]

(1.2.2.1) Floating Point Processing (FPU0 (138) to FPU3 (144))

Referring to FIG. 4, SIMD core 108 includes four floating point calculation units (FPU0 (138) to FPU3 (144)). Each unit includes a floating point multiplier (FMPY 330), a floating point ALU (FALU 332), a local data memory of the floating point calculator (any of FIL0 (130) to FLM3 (136)) and an F2O buffer 338. All units carry out the same process at the same time during two stage pipelines.

Number of pipeline stages required at various sections of the floating point units are listed in Table 1.

TABLE 1

| Unit | Number of Stage(s) |
|---|---|
| FALU | 1 or 3 |
| FMPY | 2 |
| FDIV | 9 |
| FPOW | 5 |
| FNORM | 4 |
| FSQRT | 4 |
| FRCP | 4 |

Figure 5:
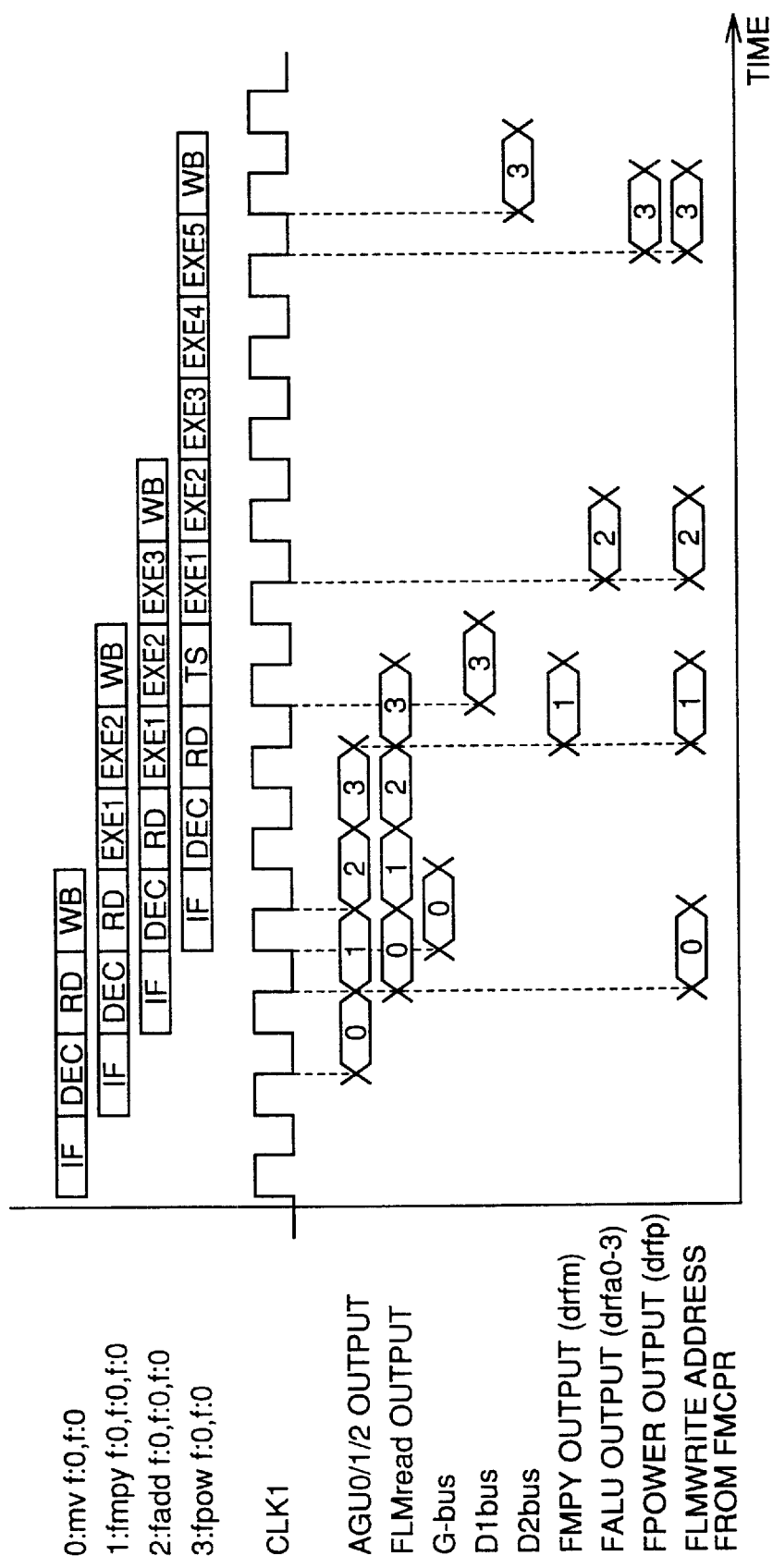
FIG. 5 is a timing chart representing an example of address and data timing among main blocks of the floating point calculating apparatus.

FIG. 5 is a timing chart representing an exemplary address and data timings among main blocks in the FPU. Though fdiv0 and fdiv1 instructions for operating FDIV0 and FDIV1 are not shown in FIG. 5, the timing in that case corresponds to the execution stage o-f fpow instruction extended to EXE9. It should be noted in FIG. 5 that as FDIV0, FDIV1 and FPOWER require data transfer from FLM to the calculator through G-Bus 100, one stage is necessary as the D1-Bus transfer stage (indicated as TS stage in FIG. 5).

Figure 6:
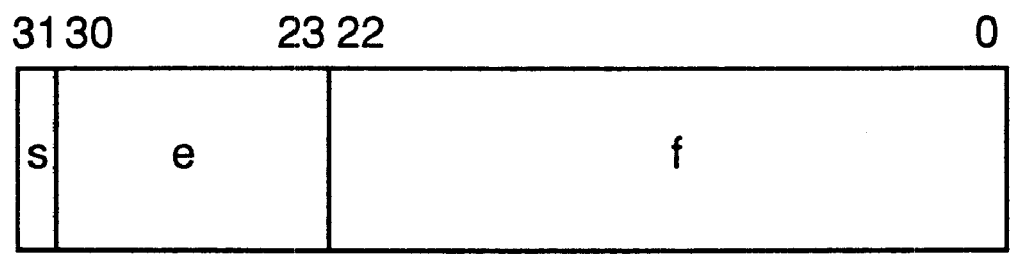
FIG. 6 represents format of single precision floating point data in accordance with IEEE standard.

FMPY 330, FALU 332, FDIV0 (310) and FDIV1 (3312), and FPOWER calculating circuit 314 are capable of executing processes in compliance with the single precision floating point data format in accordance with IEEE-745 standard. FIG. 6 shows IEEE single precision data format. Table 2 shows data format supported by the geometry calculation core.

TABLE 2

|  | Normalized Number | Signed Zeros | Signed Infinity | NaNs |
|---|---|---|---|---|
| e | 1 ≦ e ≦ 254 | 0 | 255 | 255 |
| f | Zero or non-zero | zero | zero | non-zero 1..1:QNaN 1x.x:recognized QNaN 0x.x:SNaN |
| Mantissa | 1.f | 0.f = 0.0..0 | 1.f = 0.0..0 |  |

All floating-point processing units execute arithmetic operations with the "Round to Nearest" mode. Other rounding modes are not supported by these units. Each floating point processing unit further includes a DRFM 334 connected to an output of FMPY 330, DRFA0–3 (336) connected to an output of FALU 332 and an F2O buffer 338. An output of DRFM 334 is connected to a data memory, for example FLM0 (130), inputs of FMPY 330 and FALU 332, and to F2O buffer 338. An output of DRFA0–3 (336) is connected to an input of FMPY 330, an input of FALU 332, F2O buffer 338 and a data memory, for example, FLM0 (130).

A number not normalized (denormalized) is automatically replaced with a signed zero for the internal calculations.

Components within the floating point unit will be described in the following.

(1.2.2.1.1) Data Memory (FLM)

Figure 7:
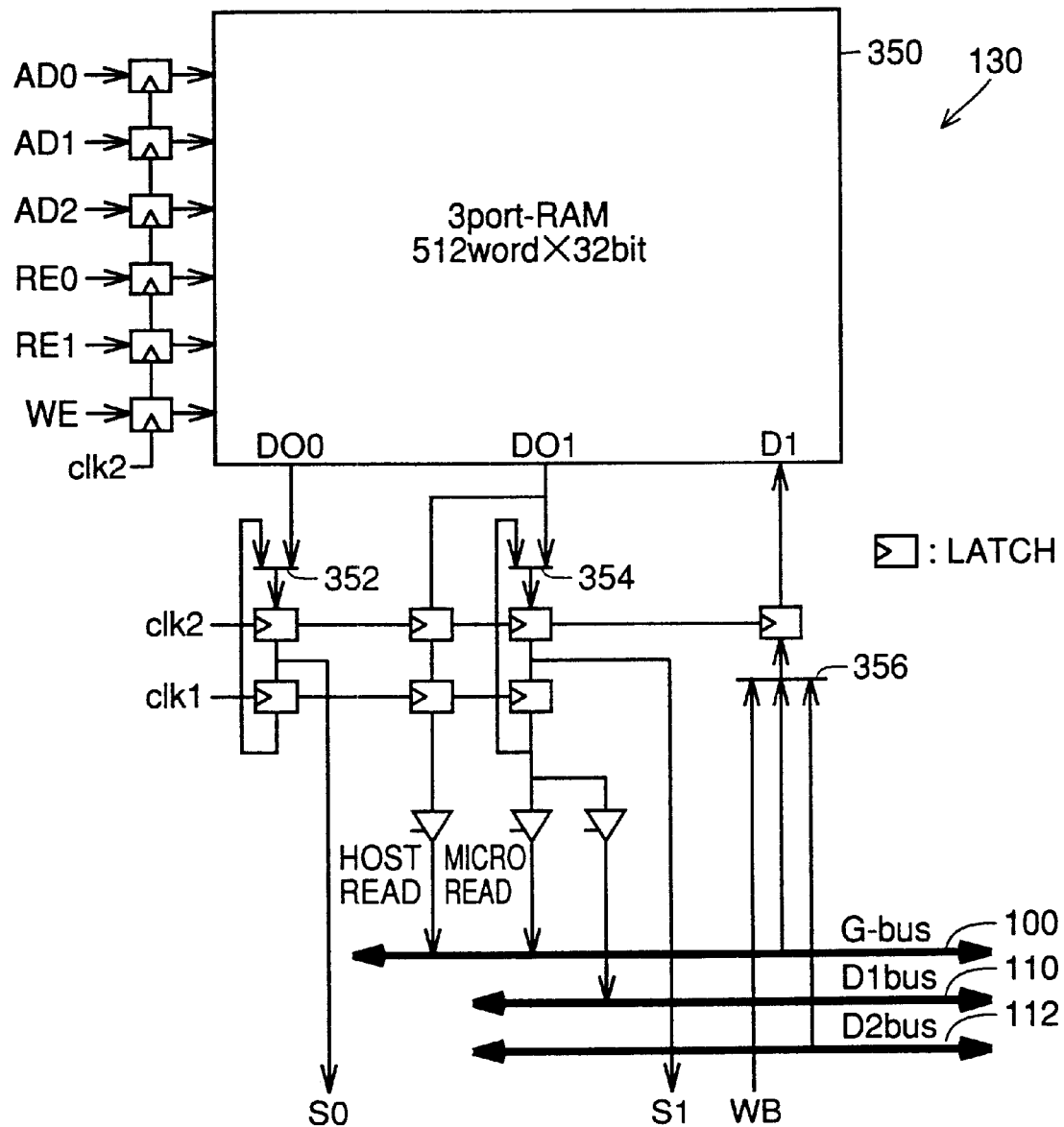
FIG. 7 is a block diagram of a data memory of the floating point calculating apparatus.

Referring to FIG. 7, FLM0 (130) for example, includes a 3 port RAM 350 of 2 read (DO0, DO1)/1 write (DI) of 512 word×32 bit; 2-input selectors 352 and 354 having inputs connected to DO0 and DO1, respectively; a 3-input selector 356 having inputs connected to G-Bus 100, D2-Bus 112 and a write back data (WB) input respectively and an output connected to DI; and a plurality of latch circuits operating in accordance with clock signals clk1 and clk2. Selectors 352 and 354 receive outputs of themselves through two latch circuits, and thus the selectors are capable of holding data.

Read data DO0 and DO1 are source data (S0, S1) of FMPY and FALU. DO 1 output will be the source data of FDIV0, FDIV1 and FPOWER through D1-Bus 110, and source data of data transfer between memories and between memories and registers through G-Bus 100 in response to a move instruction. Any of FMPY (DRFM), FALU output (DRFA0–3), D2-Bus 112, and G-Bus 100 is selected as write data (DI input).

In 3 port RAM 350, it is not possible to execute read/write from and to the same address in one cycle.

As the read data by micro operation, the data immediately before enabling of HOLD is maintained during the HOLD period and until the memory read operation is performed by the micro operation after HOLD is disabled. Even in the HOLD period, direct memory access from the outside of the chip is possible. The read data is output from DO 1 to G-Bus 100.

(1.2.2.1.2) Floating Point Multiplier (FMPY)

FMPY performs multiplication of two 32 bit floating point data items in two stages, in accordance with fmpy and fmac instructions. The result is written to output register DRFM. The calculation flag is reported to a flag register through FMCPR. As input 0, FLM read data (s0), FALU output register (DRFA0–3) and FMPY output register (DRFM) are received. As input 1, FLM read data (s1) and FMPY output register (DRFM) are received (it should be noted that FALU output register is not connected to the input register). An output is connected to FMPY output register (DRFM). The calculation flag includes NaN, Operand Error, Infinity, Underflow, Zero and Negative.

Table 3 shows relation among input data, output data and calculation flags of FMPY. In Table 3, DeNorm represents a not-normalized number, Norm represents a normalized number, Inf represents infinity, NaN represents Not-a-Number, respectively.

TABLE 3

|  | s1 | | | | | | | | |
|---|---|---|---|---|---|---|---|---|---|
| s0 | +0 | −0 | +DeNorm | −DeNorm | +Norm | −Norm | +Inf | −Inf | NaN |
| +0 | +0 0000_10 | −0 0000_10 | +0 0000_10 | −0 0000_10 | +0 0000_10 | −0 0000_10 | NaN 0000_00 | NaN 1100_00 | NaN 1000_00 |
| −0 | −0 0000_11 | +0 0000_10 | −0 0000_11 | +0 0000_10 | −0 0000_11 | +0 0000_10 | NaN 1100_00 | NaN 1100_00 | NaN 1000_00 |

TABLE 3-continued

|  | s1 | | | | | | | | |
|---|---|---|---|---|---|---|---|---|---|
| s0 | +0 | −0 | +DeNorm | −DeNorm | +Norm | −Norm | +Inf | −Inf | NaN |
| +DeNorm | +0<br>0000__10 | −0<br>0000__11 | +0<br>0000__10 | −0<br>0000__11 | +0<br>0000__10 | −0<br>0000__11 | NaN<br>1100__00 | NaN<br>1100__00 | NaN<br>1000__00 |
| −DeNorm | −0<br>0000__11 | +0<br>0000__10 | −0<br>0000__11 | +0<br>0000__10 | −0<br>0000__11 | +0<br>0000__10 | NaN<br>1100__00 | NaN<br>1100__00 | NaN<br>1000__00 |
| +Norm | +0<br>0000__10 | −0<br>0000__11 | +0<br>0000__10 | −0<br>0000__11 | +Norm/+0/<br>−Inf<br>00??__?0 | +Norm/−0/<br>−Inf<br>00??__?1 | +Inf<br>0010__00 | −Inf<br>0010__00 | NaN<br>1000__00 |
| −Norm | −0<br>0000__11 | +0<br>0000__10 | −0<br>0000__11 | +0<br>0000__10 | +Norm/−0/<br>−Inf<br>00??__?1 | +Norm/+0<br>+Inf<br>00??__?0 | −Inf<br>0010__01 | +Inf<br>0010__00 | NaN<br>1000__00 |
| +Inf | NaN<br>1100__00 | NaN<br>1100__00 | NaN<br>1100__00 | NaN<br>1100__00 | +Inf<br>0010__00 | −Inf<br>0010__00 | +Inf<br>0010__00 | −Inf<br>0010__00 | NaN<br>1000__00 |
| −Inf | NaN<br>1100__00 | NaN<br>1100__00 | NaN<br>1100__00 | NaN<br>1100__00 | −Inf<br>0010__00 | +Inf<br>0010__00 | −Inf<br>0010__00 | +Inf<br>0010__00 | NaN<br>1000__00 |
| NaN | NaN<br>1000__00 | NaN<br>1000__00 | NaN<br>1000__00 | NaN<br>1000__00 | NaN<br>1000__00 | NaN<br>1000__00 | NaN<br>1000__00 | NaN<br>1000__00 | NaN<br>1000__00 |

Upper Row: FMPY operation result (NaN=0x7FFFFFFF)
Lower Row: FLAG outputs (NaN, Operand Error, Infinity, Underflow, _, Zero, Negative)

(1.2.2.1.3) Floating Point Arithmetic Logic Unit (FALU)
FALU performs arithmetic logic operation for 32 bit floating point data in three stages (for fthru, fabs instruction, one stage), and performs comparing operation of 32 bit fixed point data (ficmp instruction) in one stage, respectively. The results are written in output registers (DRFA0–3). Calculation flags are reported to the flag register through FMCPR. Of calculation flags, NaN flag, Zero flag and Negative flag are also output to the clip code generator.

When outputs resulting from operation instructions of which number of execution stages differ should interfere, writing to the output register and output of calculation flags will interfere. In such a case, output of a result of a preceding instruction is guaranteed, and later issued instruction is neglected. When fthru instruction of execution stage 1 is applied after 2 instructions of fadd instruction of execution stage number 3, for example, output of the preceding fadd instruction is guaranteed, and the later issued fthru instruction is neglected.

The input 0 of FALU includes FLM read data (s0), FALU output register (DRFA0–3) and FMPY output register (DRFM). Input 1 includes FLM read data (s1), FALU output register (DRFA0–3) and FMPY output register (DRFM). The output is connected to FALU output register (DRFA0–3). DRFA1/2/3 are updated when designated as the destination of fthru instruction and when fmac1/2/3 instructions are executed, respectively. When fthru instruction designating FLM or DRFA0 as the destination is executed or when an instruction other than fmac1/2/3 is executed, DRFA0 is updated.

Calculation flags include NaN, Operand Error, Infinity, Underflow, Equal (ficmp instruction), Overflow (when integer is converted), Zero and Negative.

Table 4 represents relation among input/output data and calculation flags in fadd, famc1/2/3 instructions where two sources are added in FALU.

TABLE 4

|  | s1 | | | | | | | | |
|---|---|---|---|---|---|---|---|---|---|
| s0 | +0 | −0 | +DeNorm | −DeNorm | +Norm | −Norm | +Inf | −Inf | NaN |
| +0 | +0<br>0000__0010 | +0<br>0000__0010 | +0<br>0000__0010 | +0<br>0000__0010 | +Norm<br>0000__0000 | −Norm<br>0000__0001 | +Inf<br>0010__0000 | +Inf<br>0010__0001 | NaN<br>1000__0000 |
| −0 | −0<br>0000__0011 | −0<br>0000__0011 | −0<br>0000__0011 | −0<br>0000__0011 | +Norm<br>0000__0000 | −Norm<br>0000__0001 | +Inf<br>1100__0000 | −Inf<br>0010__0001 | NaN<br>1000__0000 |
| +DeNorm | +0<br>0000__0010 | +0<br>0000__0011 | +0<br>0000__0010 | +0<br>0000__0011 | +Norm<br>0000__0000 | −Norm<br>0000__0001 | +Inf<br>0010__0000 | −Inf<br>0010__0001 | NaN<br>1000__0000 |
| −DeNorm | −0<br>0000__0011 | −0<br>0000__0010 | −0<br>0000__0011 | −0<br>0000__0010 | +Norm<br>0000__0000 | −Norm<br>0000__0001 | +Inf<br>0010__0000 | −Inf<br>0010__0001 | NaN<br>1000__0000 |
| +Norm | +Norm<br>0000__0000 | +Norm<br>0000__0000 | +Norm<br>0000__0000 | +Norm<br>0000__0000 | +Norm/+Inf<br>00?0__0000 | +−Norm/+−0<br>000?__00?? | +Inf<br>0010__0000 | −Inf<br>0010__0001 | NaN<br>1000__0000 |
| −Norm | −Norm<br>0000__0001 | −Norm<br>0000__0001 | −Norm<br>0000__0001 | −Norm<br>0000__0001 | +−Norm/+−0<br>000?__00?? | −Norm/−Inf<br>00?0__0001 | +Inf<br>0010__0000 | −Inf<br>0010__0001 | NaN<br>1000__0000 |
| +Inf | +Inf<br>0010__0000 | +Inf<br>0010__0000 | +Inf<br>0010__0000 | +Inf<br>0010__0000 | +Inf<br>0010__0000 | +Inf<br>0010__0001 | +Inf<br>0010__0000 | NaN<br>1100__0000 | NaN<br>1000__0000 |
| −Inf | −Inf<br>0010__0001 | −Inf<br>0010__0001 | −Inf<br>0010__0001 | −Inf<br>0010__0001 | −Inf<br>0010__0001 | −Inf<br>0010__0001 | NaN<br>1100__0000 | −Inf<br>0010__0001 | NaN<br>1000__0000 |
| NaN | NaN<br>1000__0000 | NaN<br>1000__0000 | NaN<br>1000__0000 | NaN<br>1000__0000 | NaN<br>1000__0000 | NaN<br>1000__0000 | NaN<br>1000__0000 | NaN<br>1000__0000 | NaN<br>1000__0000 |

Upper Row: FMPY OPERATION RESULT (NaN=0x7FFFFFFF)
Lower Row: FLAG outputs (NaN, Operand Error, Infinity, Equl, Overflow, Underflow, Zero, Negative)

Table 5 represents relation among input/output data and calculation flags in fsub instruction where subtraction of two sources is performed in FALU.

TABLE 5

| s0 | s1 | | | | | | | | |
|---|---|---|---|---|---|---|---|---|---|
| | +0 | −0 | +DeNorm | −DeNorm | +Norm | −Norm | +Inf | −Inf | NaN |
| +0 | +0 | +0 | +0 | +0 | −Norm | +Norm | −Inf | +Inf | NaN |
| | 0000_0010 | 0000_0010 | 0000_0010 | 0000_0010 | 0000_0001 | 0000_0000 | 0010_0001 | 0010_0000 | 1000_0000 |
| −0 | −0 | −0 | −0 | −0 | −Norm | +Norm | −Inf | +Inf | NaN |
| | 0000_0011 | 0000_0011 | 0000_0011 | 0000_0011 | 0000_0001 | 0000_0000 | 0010_0001 | 1100_0000 | 1000_0000 |
| +DeNorm | +0 | +0 | +0 | +0 | −Norm | +Norm | −Inf | +Inf | NaN |
| | 0000_0010 | 0000_0011 | 0000_0010 | 0000_0011 | 0000_0001 | 0000_0000 | 0010_0001 | 0010_0000 | 1000_0000 |
| −DeNorm | −0 | −0 | −0 | −0 | −Norm | +Norm | −Inf | +Inf | NaN |
| | 0000_0011 | 0000_0010 | 0000_0011 | 0000_0010 | 0000_0001 | 0000_0000 | 0010_0001 | 0010_0000 | 1000_0000 |
| +Norm | +Norm | +Norm | +Norm | +Norm | +Norm/+−0 | +Norm/+Inf | +Inf | −Inf | NaN |
| | 0000_0000 | 0000_0000 | 0000_0000 | 0000_0000 | 000?_00?? | 00?0_0000 | 0010_0000 | 0010_0001 | 1000_0000 |
| −Norm | −Norm | −Norm | −Norm | −Norm | +−Norm/−Inf | +−Norm/+−0 | +Inf | −Inf | NaN |
| | 0000_0001 | 0000_0001 | 0000_0001 | 0000_0001 | 00?0_0001 | 000?_00?? | 0010_0000 | 0010_0001 | 1000_0000 |
| +Inf | +Inf | +Inf | +Inf | +Inf | +Inf | +Inf | NaN | +Inf | NaN |
| | 0010_0000 | 0010_0000 | 0010_0000 | 0010_0000 | 0010_0000 | 0010_0001 | 1100_0000 | 0010_0000 | 1000_0000 |
| −Inf | −Inf | −Inf | −Inf | −Inf | −Inf | −Inf | −Inf | NaN | NaN |
| | 0010_0001 | 0010_0001 | 0010_0001 | 0010_0001 | 0010_0001 | 0010_0001 | 0010_0001 | 1100_0000 | 1000_0000 |
| NaN | NaN | NaN | NaN | NaN | NaN | NaN | NaN | NaN | NaN |
| | 1000_0000 | 1000_0000 | 1000_0000 | 1000_0000 | 1000_0000 | 1000_0000 | 1000_0000 | 1000_0000 | 1000_0000 |

Upper Row: FMPY operation result (NaN=0x7FFFFFFF)
Lower Row: FLAG outputs (NaN, Operand Error, Infinity, Underflow, Equl, Overflow, Zero, Negative)

Table 6 represents relation among input/output data and calculation flags in fclmp instruction for clamping source 0 between 0 and source 1 in FALU.

TABLE 6

| s0 | s1 | | | | | | | | |
|---|---|---|---|---|---|---|---|---|---|
| | +0 | −0 | +DeNorm | −DeNorm | +Norm | −Norm | +Inf | −Inf | NaN |
| +0 | +0 | −0 | +0 | −0 | +0 | −0 | +0 | −0 | NaN |
| | 0000_0010 | 0000_0011 | 0000_0010 | 0000_0011 | 0000_0010 | 0000_0011 | 0000_0010 | 0000_0011 | 1000_0000 |
| −0 | +0 | −0 | +0 | −0 | +0 | −0 | +0 | −0 | NaN |
| | 0000_0010 | 0000_0011 | 0000_0010 | 0000_0011 | 0000_0010 | 0000_0011 | 0000_0010 | 0000_0011 | 1000_0000 |
| +DeNorm | +0 | −0 | +0 | −0 | +0 | −0 | +0 | −0 | NaN |
| | 0000_0010 | 0000_0011 | 0000_0010 | 0000_0011 | 0000_0010 | 0000_0011 | 0000_0010 | 0000_0011 | 1000_0000 |
| −DeNorm | +0 | −0 | +0 | −0 | +0 | −0 | +0 | −0 | NaN |
| | 0000_0010 | 0000_0011 | 0000_0010 | 0000_0011 | 0000_0010 | 0000_0011 | 0000_0010 | 0000_0011 | 1000_0000 |
| +Norm | +0 | −0 | +0 | −0 | s0/s1 | −0 | +Inf | −Inf | NaN |
| | 0000_0010 | 0000_0011 | 0000_0010 | 0000_0011 | 0000_0000 | 0000_0011 | 0010_0000 | 0010_0001 | 1000_0000 |
| −Norm | +0 | −0 | +0 | −0 | +0 | s0/s1 | +Inf | −Inf | NaN |
| | 0000_0010 | 0000_0011 | 0000_0010 | 0000_0011 | 0000_0010 | 0000_0001 | 0010_0000 | 0010_0001 | 1000_0000 |
| +Inf | +0 | −0 | +0 | −0 | s1 | −0 | +Inf | −0 | NaN |
| | 0000_0010 | 0000_0011 | 0000_0010 | 0000_0011 | 0000_0000 | 0000_0011 | 0010_0000 | 0000_0011 | 1000_0000 |
| −Inf | +0 | −0 | +0 | −0 | +0 | s1 | +0 | −Inf | NaN |
| | 0000_0010 | 0000_0011 | 0000_0010 | 0000_0011 | 0000_0010 | 0000_0001 | 0000_0010 | 0010_0001 | 1000_0000 |
| NaN | NaN | NaN | NaN | NaN | NaN | NaN | NaN | NaN | NaN |
| | 1000_0000 | 1000_0000 | 1000_0000 | 1000_0000 | 1000_0000 | 1000_0000 | 1000_0000 | 1000_0000 | 1000_0000 |

Upper Row: FMPY operation result (NaN=0x7FFFFFFF)
Lower Row: FLAG outputs (NaN, Operand Error, Infinity, Underflow, Equl, Overflow, Zero, Negative)

Table 7 represents relation among input/output data and calculation flags for one source instruction (fthru, fabs, ftran and ftranu) in FALU.

TABLE 7

| s0 | func. | | | |
|---|---|---|---|---|
| | fthru | fabs | ftran | ftrnu |
| +0 | +0 | +0 | 0 | 0 |
| | 0000_0010 | 0000_0010 | 0000_0010 | 0000_0010 |
| −0 | −0 | +0 | 0 | 0 |
| | 0000_0011 | 0000_0010 | 0000_0011 | 0000_0011 |
| +DeNorm | +0 | +0 | 0 | 0 |
| | 0000_0010 | 0000_0010 | 0000_0010 | 0000_0011 |
| −DeNorm | −0 | +0 | 0 | 0 |
| | 0000_0011 | 0000_0010 | 0000_0011 | 0000_0010 |
| +Norm | +Norm | +Norm | +Inf/0/ | +Inf/0/ |
| | 0000_0000 | 0000_0000 | 7FFFFFFF | FFFFFFFF |
| | | | 0?00_0??0 | 0?00_0??0 |
| −Norm | −Norm | +Norm | −Inf/0/ | 0 |
| | 0000_0001 | 0000_0000 | 80000000 | |
| | | | 0?00_0??? | 0100_0110 |
| +Inf | +Inf | +Inf | 7FFFFFFF | FFFFFFFF |
| | 0010_0000 | 0010_0000 | 0010_0000 | 0010_0000 |
| −Inf | +Inf | +Inf | 80000000 | 0 |
| | 0010_0001 | 0010_0000 | 0010_0101 | 0010_0110 |
| NaN | NaN | NaN | NaN | NaN |
| | 1000_0000 | 1000_0000 | 1100_0000 | 1100_0000 |

Upper Row: FMPY operation result (NaN=0x7FFFFFFF)
Lower Row: FLAG outputs (NaN, Operand Error, Infinity, Underflow, Equl, Overflow, Zero, Negative)

When ficmp instruction for performing matching between two 32 bit fixed point data in FALU is executed and two data match, Equal flag is set. Previous states of other calculation flags are maintained. The number of execution stages for ficmp instruction is one.

(1.2.2.1.4) F2O Buffer Section

F2O buffer section consists of a 8 word×32 bit register file and functions as an intermediate buffer for transferring an output of FMPY or FALU to OFIFO through O-Bus 116. When OFIFO is designated as a destination in FPU instruction, FMPY output or FALU output is written to the register in four FPUs in parallel, regardless of the OFIFO output mode. When data is read from the register and transferred to OFIFO through O-Bus 116, OFIFO section controls enabling and read pointer for F2O buffer section.

(1.2.3) [FPOWER/FDIV Section 114]

FPOWER/FDIV section 114 shown in FIGS. 2 and 3 will be described. As can be seen from FIG. 4, FPOWER/FDIV section 114 includes FDIV0 (310), FDIV1 (312) and FPOWER calculating circuit 314. Each component will be described in the following.

(1.2.3.1) Floating Point Divider (FDIV0, FDIV1)

The floating point divider calculates inverse of input data with the precision of single precision floating point. The geometry calculation core includes two dividers (FDIV0, FDIV1) of identical structure. FDIV0 and FDIV1 perform calculation in response to fdiv0 instruction and fdiv1 instruction, respectively.

To the floating point divider, any one data of FLM0–3 is provided as input through D1-Bus 110. When FLM is designated as the destination, the output is transferred to FLM through D2-Bus 112. The number of stages for execution of operation in the floating point divider is nine.

Transfer from local memory (FLM)/register (DRFA0–1, DRFP) to FDIV0–1 through D1-Bus 110 requires one stage. Therefore, it takes fourteen (14) stages from instruction fetch to writing of the result when fdiv0 or fdiv1 instruction is executed.

Data transfer through D2-Bus 112 is caused by fdiv0, fdiv1, fpow, frcp, fsqrt, fnorm instructions, and when there is an interference in data transfer over D2-Bus 112, preceding instruction is given priority. Though operation is executed and the result is written to the output register for the later issued instruction, writing to the FLM using D2-Bus 112 is cancelled. As to fdiv0 and fdiv1 instructions, operation is guaranteed until FLM writing, where the number of stages for execution is the largest.

The input to the floating point divider is FLM data through D1-Bus 110. The output is applied from DRFA0/DRFA1 through D2-Bus 112 to FLM0–3. Multicasting is possible. Calculation flags include Divide by Zero, NaN, Operand Error, Infinity, Underflow, Zero and Negative.

Table 8 shows relation among input/output data and calculation flags in FDIV0 and 1.

TABLE 8

| func. s0 | fdiv0, fdfv1 |
|---|---|
| +0 | +Inf |
| | 1_0110_00 |
| −0 | −Inf |
| | 1_0110_01 |
| +DeNorm | +Inf |
| | 1_0110_00 |
| −DeNorm | −Inf |
| | 1_0110_01 |
| +Norm | +Norm/+0 |
| | 0_000?_??0 |
| −Norm | −Norm/−0 |
| | 0_000?_??1 |
| +Inf | +0 |
| | 0_0000_10 |
| −Inf | −0 |
| | 0_0000_11 |
| NaN | NaN |
| | 1000_0000 |

Upper Row: FMPY operation result (NaN = 0x7FFFFFFF)
Lower Row: FLAG outputs NaN, Operand Error, Infinity, Underflow, Equl, Overflow, Zero, Negative)

(1.2.3.2) Floating Point Power Calculator (FPOWER)

Figure 8:
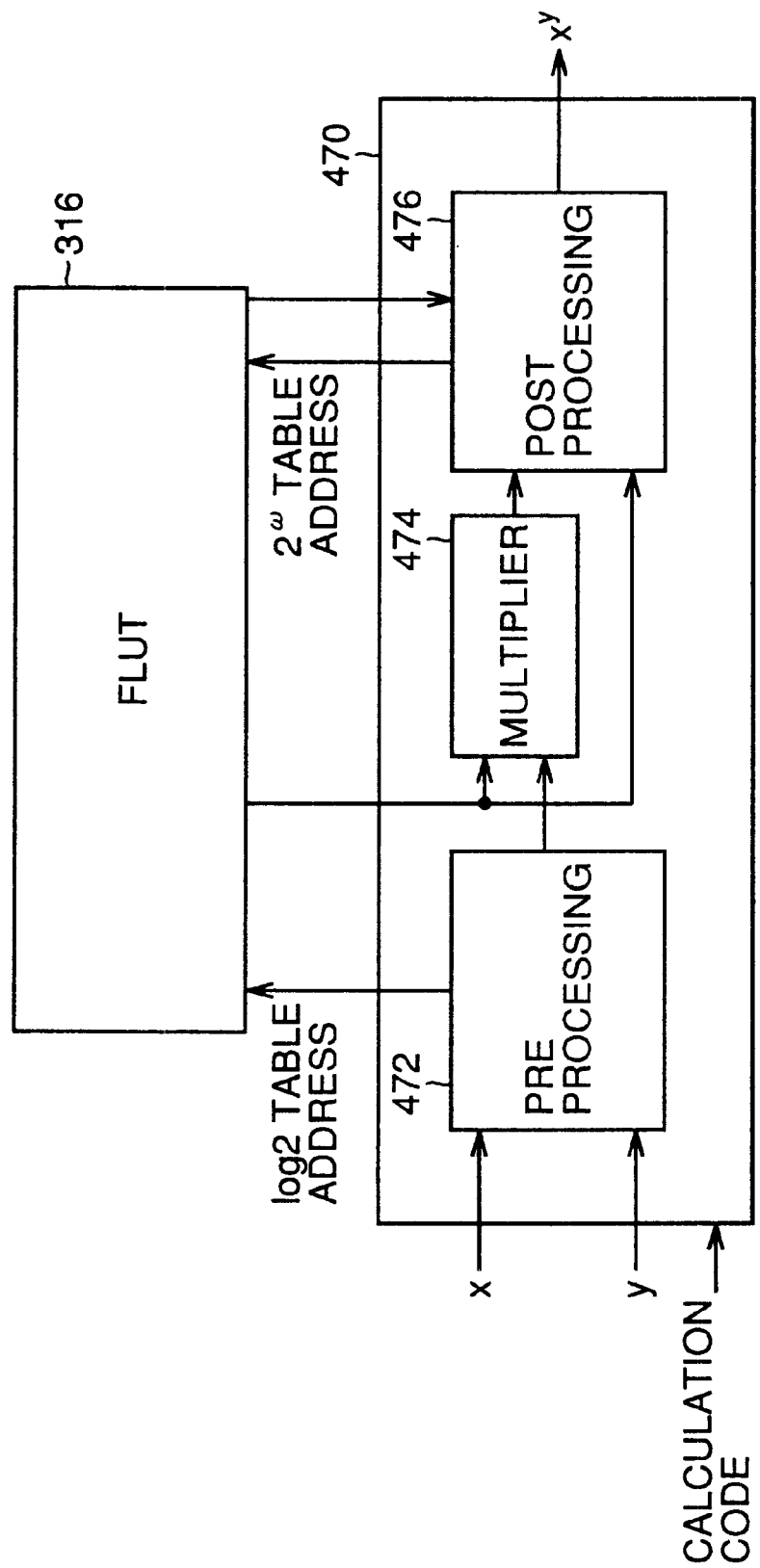
FIG. 8 is a block diagram of the floating point power computing unit.

Referring to FIG. 8, FPOWER calculates power (raising of x to the yth power) utilizing table look up. More specifically, FPOWER includes an FLUT 316 having tables of logarithms and 2's power, with the base being 2, and an FPOWER calculating section 470 receiving two floating point data x (base) and y (exponent) for calculating x raised to the yth power with reference to FLUT 316.

Of the inputs, the base x is data read from any of FLM0–3, applied to FPOWER through D1-Bus 110 or D2-Bus 112. The exponent y must be set in an exponent register EXPR by move instruction or load (ldr) instruction. FPOWER also receives a calculation code, and selects calculation of $1/x$, $\sqrt{x}$, $1/\sqrt{x}$ and raising of x to the yth power.

FPOWER calculating section 470 includes: a preprocessing section 472 receiving x and y and performing a process for taking out from FLUT 316 a logarithm of x with the base being 2, by accessing FLUT 316 using x as an address; a multiplier 474 for multiplying the logarithm of x output from FLUT 316 by the value y applied through preprocessing section 472; and a post processing section 476 for taking and outputting a value of 2 raised to the ωth power (that is, x raised to the yth power, $x^y$) from FLUT 316 by accessing FLUT 316 using the result (represented by ω) output from multiplier 474. These processings proceed successively, and therefore the processings can be implemented in pipelines. Accordingly, calculation of power can be done at high speed.

When the exponent y is set to y=−1, it represents an inverse, y=0.5 represents square root (sqrt), and y=−0.5 represents normalization (1/√x). For the instructions (frcp, fsqrt, fnorm) prepared for performing these calculations using FPOWER, the preprocessing section 472 ignores the value of y in the above described process, and performs the above described process by giving a constant in accordance with the instruction, to multiplier 474. Therefore, it is unnecessary to set exponent y in the EXPR register, and even if a value other than those mentioned above is actually set in the EXPR, such value is neglected, and hence there is no problem. Further, it is possible to perform calculations of inverse/square root/normalization by setting −1/0.5/−0.5 in the EXPR register, respectively. Such processings provide For fdiv0 and fdiv1 instructions, operation is guaranteed until FLM writing having the largest number of stages for execution. Among bpow instruction and frcp, fsqrt and fnorm instructions, FLM writing for fpow instruction is guaranteed, and writing for later issued frcp, fsqrt and fnorm instructions is cancelled.

The input of FPOWER is FLM0–3 through D1-Bus 110. The output is applied from DRFP through D2-Bus 112 to FLM0–3. Calculation flags include NaN, Operand Error, Infinity, Underflow, Zero and Negative.

Table 9 shows relation among input/output data and calculation flag in the FPOWER.

TABLE 9

| x | y | | | | | | | | |
|---|---|---|---|---|---|---|---|---|---|
| | +0 | −0 | +DeNorm | −DeNorm | +Norm | −Norm | +Inf | −Inf | NaN |
| +0 | +1 | +1 | +1 | +1 | +0 | +1 | +0 | +1 | NaN |
| | 0100_00 | 0100_00 | 0100_00 | 0100_00 | 0100_10 | 0100_00 | 0100_10 | 0100_00 | 1000_00 |
| −0 | −1 | +1 | +1 | +1 | −0 | +1 | −0 | +1 | NaN |
| | 0100_00 | 0100_00 | 0100_00 | 0100_00 | 0100_11 | 0100_00 | 0100_11 | 0100_00 | 1000_00 |
| +DeNorm | +1 | +1 | +1 | +1 | +0 | +1 | +0 | +1 | NaN |
| | 0100_00 | 0100_00 | 0100_00 | 0100_00 | 0100_10 | 0100_00 | 0100_10 | 0100_00 | 1000_00 |
| −DeNorm | −1 | +1 | +1 | +1 | −0 | +1 | −0 | +1 | NaN |
| | 0100_00 | 0100_00 | 0100_00 | 0100_00 | 0100_11 | 0100_00 | 0100_11 | 0100_00 | 1000_00 |
| +Norm | +1 | +1 | +1 | +1 | +Norm | +Norm | +Inf/+0 | +1 | NaN |
| | 0000_00 | 0000_00 | 0000_00 | 0000_00 | 0?00_?0 | 0?00_?0 | 01?0_?0 | 0100_00 | 1000_00 |
| −Norm | −0 | −0 | −0 | −0 | −0 | −0 | −0 | −0 | NaN |
| | 0100_11 | 0100_11 | 0100_11 | 0100_11 | 0100_11 | 0100_11 | 0100_11 | 0100_11 | 1000_00 |
| +Inf | +1 | +1 | +1 | +1 | +Inf | +1 | +Inf | +1 | NaN |
| | 0100_00 | 0100_00 | 0100_00 | 0100_00 | 0110_00 | 0100_10 | 0110_00 | 0100_10 | 1000_00 |
| −Inf | −0 | −0 | −0 | −0 | −0 | −0 | −0 | −0 | NaN |
| | 0100_11 | 0100_11 | 0100_11 | 0100_11 | 0100_11 | 0100_11 | 0100_11 | 0100_11 | 1000_00 |
| NaN | NaN | NaN | NaN | NaN | NaN | NaN | NaN | NaN | NaN |
| | 1000_00 | 1000_00 | 1000_00 | 1000_00 | 1000_00 | 1000_00 | 1000_00 | 1000_00 | 1000_00 |

Upper Row: FMPY operation result (NaN=0x7FFFFFFF)
Lower Row: FLAG outputs (NaN, Operand Error, Infinity, Underflow, Zero, Negative)

substantially the same results of calculations as provided by frcp, fsqrt and fnorm instructions. The number of stages for execution, however, is one stage longer.

The exponent y set in the EXPR register must be floating point data. Here, after the value y is written to EXPR register, FPOWER section converts the value y from the floating point to 24 bit fixed point (2's complement integer 9 bits, and decimal 15 bits). Therefore, the value y must be within the range which can be covered by the fixed point data. If the value y is out of this range, FPOWER outputs Operand Error flag, and the value y is forcedly clamped at the upper or lower limit in the fixed point representation, and the calculation is performed.

In executing FRCP instruction using FPOWER, Divide by Zero flag is not output.

The numbers of stages to execute respective instructions in the FPOWER are five for fpow instruction, four for frcp instruction, four for fsqrt instruction and 4 fnorm instruction. It should be noted that additional one cycle is necessary for transfer from FLM0–3 over D1-Bus 110.

When instructions fdiv0, fdiv1, fpow, frcp, fsqrt and fnorm using D2-Bus 112 cause interference in transfer over D2-Bus 112, preceding instruction is given priority. Though calculation itself is executed and the result is written to the output register for the latter issued instruction, FLM writing through D2-Bus 112 transfer is cancelled.

(1.2.4) [Clip Code Generator 318]

Referring to FIG. 4, geometry calculation core 84 further includes a clip code generator 318. The clip code generator 318 (CGU) handles the flags of the clip test. More specifically, clip code generator 318 determines whether the result of calculation is not smaller than zero (!NaN& (!N+Z)) or not larger than zero (!NaN& (N+Z)) using, among the flags generated by addition/subtraction performed in the FALU in response to fclipt instruction, NaN flag, Zero flag and Negative flag of FPU0–2, and performs logic operation of flags with states of the flags set in response to utmost two last flipt instructions. In accordance with the result, clip code generator 318 determines positional relation between primitives (point.line.triangle) and a view volume. The result of determination is written in a clip code register CCR.

It is necessary to set an initial value in the CCR<1:30> for identifying the primitive. In the reset state, CCR=0.

Figure 9:
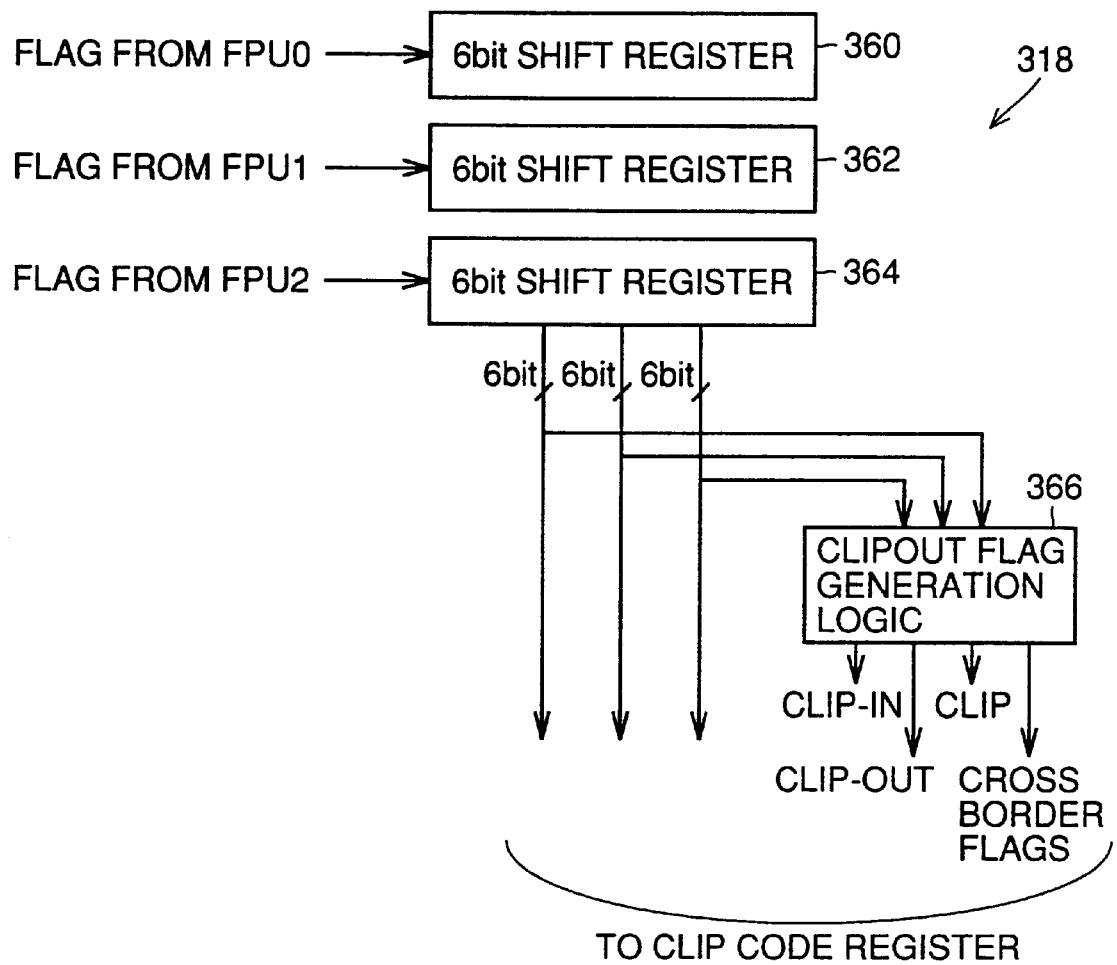
FIG. 9 is a block diagram of a clip code generating circuit.

Clip code generator 318 has a 32 bit shift register (CCR), and the CCR is divided into four sections. More specifically, referring to FIG. 9, clip code generator 318 includes a six bit shift register 360, a six bit shift register 362, a six bit shift register 364 and a clip out flag generating logic 366. The six bit shift registers 360–364 are provided near corresponding floating point calculating units (FPUx). Three flags from FPU0 (138) to FPU2 (142) are shifted into respective sections of the CCR simultaneously. The CCR is capable of reference using instructions. Output of six bit shift registers 360–364 are applied to clip out flag generating logic 366, and clip out flag generating logic 366 generates control signals such as the clip code.

(1.2.5) [Integer Processing Unit (IPU 106)]

Figure 10:
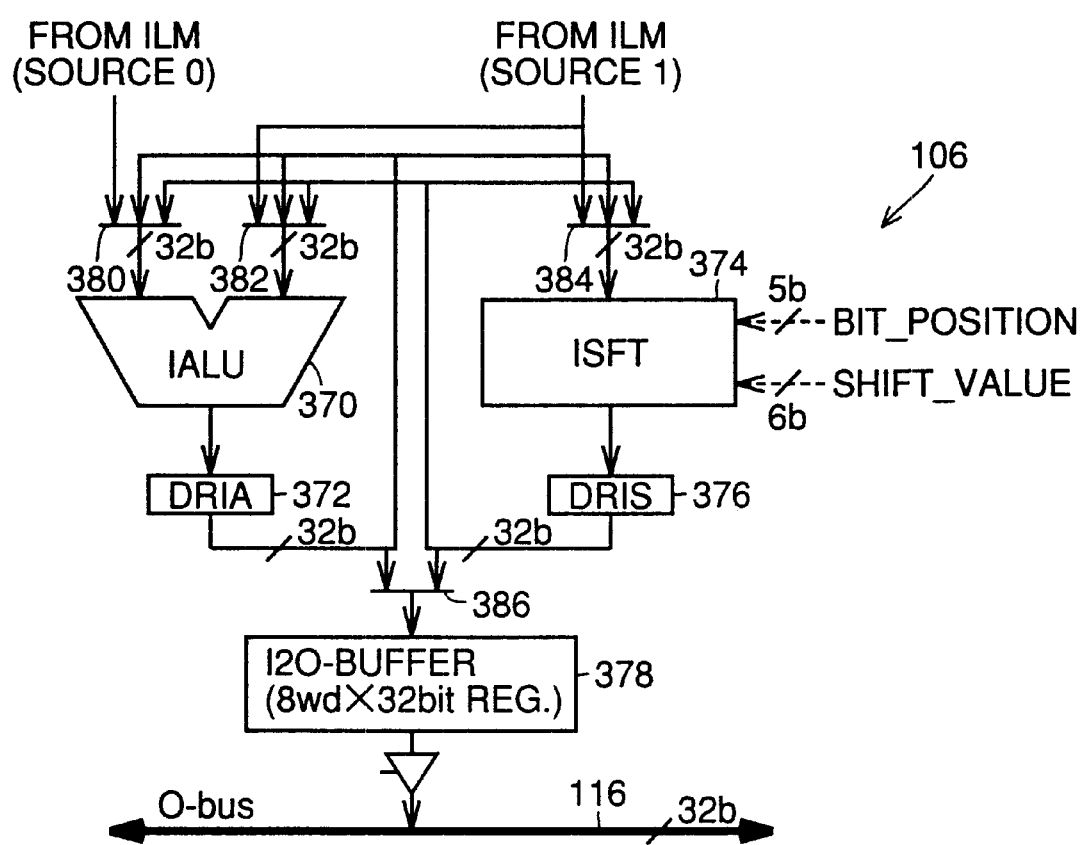
FIG. 10 is a block diagram of the integer processing apparatus.

Referring to FIG. 10, IPU 106 includes a 32 bit integer arithmetic logic unit (IALU 370), a 32 bit integer barrel shifter (ISFT 374), an I2O buffer 378 connected to O-Bus 116, a register DRIA 372 for latching an output of IALU 370 and a register DRIS 376 for latching an output of ISFT 374.

To one 32 bit input of IALU 370, an output of a 3-input selector 380 receiving a source 1 from the ILM, an output of DRIS 376 and an output of DRIA 372 is connected. To the other input of IALU 370, an output of a 3-input selector 384 receiving the source 1 of the ILM, an output of DRIA 372 and an output of DRIS 376 is connected. Outputs of DRIA 372 and DRIS 376 are also connected to I2O buffer 378 through selector 386.

IALU 370 and ISFT 374 are both capable of completing one logic operation in one machine cycle. Other types of arithmetic operation/shift operation are performed in two machine cycles. IALU 370 is capable of bit set/bit reset/bit test operations. Further, data packing operation processing can be implemented in pipelines by IALU 370 and ISFT 374 together. Table 10 shows numbers of pipeline stages of IALU 370 and ISFT 374.

TABLE 10

| Unit | | Number of Stages |
|---|---|---|
| IALU | 3 | (for 'add' and 'sub') |
|  | 2 | (for 'and' and 'or') |
| ISFT | 3 | (for 'asft' and 'isft') |
|  | 2 | (for 'bset', 'brst' and 'btst') |

Figure 11:
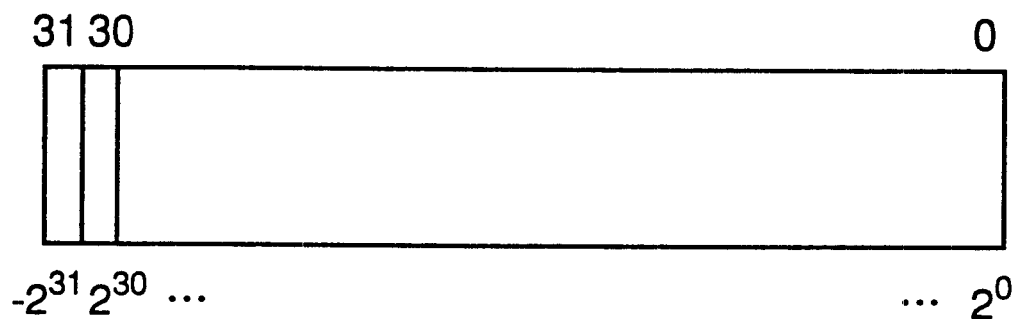
FIG. 11 represents a format of 2's complement integer data.
Figure 12:
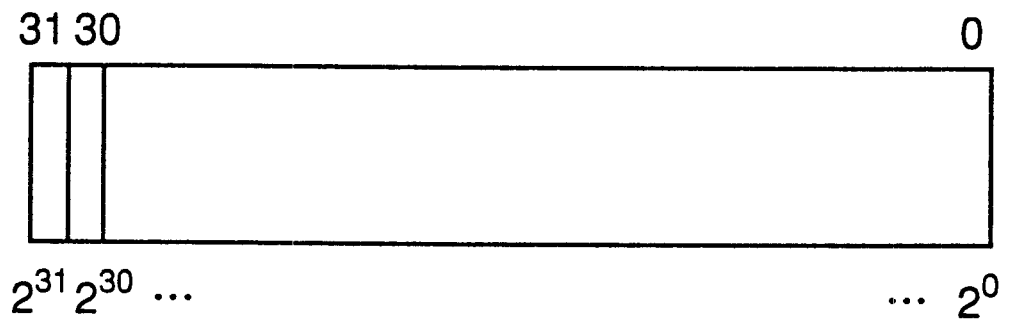
FIG. 12 represents a format of unsigned integer data.

IPU 106 is capable of handling two data formats, that is, 32 bit 2's complement integer format and 32 bit unsigned integer format. FIGS. 11 and 12 represent these formats.

With designation of destination (DST)=OFIFO0, result of operation of IALU 370/ISFT 374 is written to I2O buffer 378. At the same time, only the OFIFO write signal is transmitted from IPU 106 to OFIFO section. The OFIFO output mode signal is not transmitted. When a write request signal from IPU 106 is a asserted, the OFIFO section forcedly sets OFIFO (IPU).

The OFIFO write mode signal which can be designated for integer operation instruction is OFIFO (IPU) only. When other OFIFO1-OFIFOf (for FPU selection) is described, the description is determined to be an error at the assembling stage.

The write enable signal to I2O buffer 378 is generated by IPU 106 itself. The write pointer of I2O buffer 378 is controlled by OFIFO section. The read pointer of I2O buffer 378 is controlled by the OFIFO section. Read data from I2O buffer 378 are output to O-Bus 116. The enabled signal of the output 3-state buffer is controlled by the OFIFO section.

When there is an interference in the write back (WB) stage of IPU 106, priority is given to the preceding instruction.

(1.2.6) [Instruction Memory 92]

Figure 13:
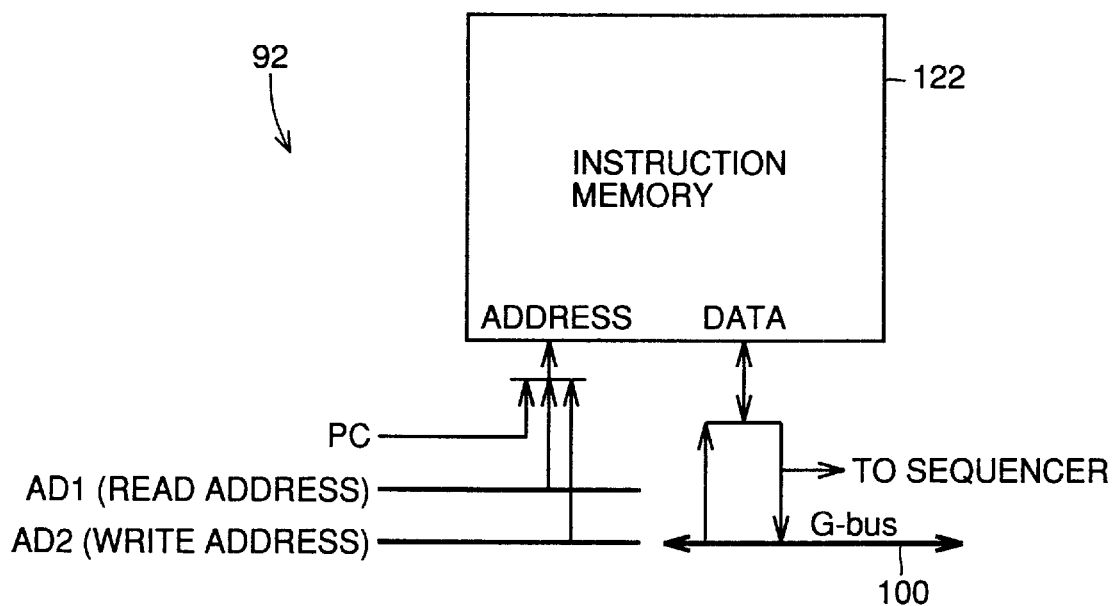
FIG. 13 is a block diagram of an instruction memory 92.

The instruction memory is a 8 k word×32 bit single port memory for storing microcodes. The bit width of each microcode is 32 bit, which is suited for AGP-base system. FIG. 13 is a block diagram of instruction memory 92. The instruction memory 92 includes a single port memory 122 and a selector 148 connected to an output of a program counter and AD1 and AD2 for selecting any of these and applying the selected one to the address port of single port memory 122. Data port of single port memory 122 is connected to G-Bus 100, and an output of the data port is also connected to sequencer 94.

Instruction memory 92 can provide the sequencer 94 with an instruction code designated by the program counter every machine cycle. Instruction memory is accessible via the AGP port 80 by the host. Instruction memory 92 is mapped to main memory 56 of host CPU 52 as well as other memories and registers in the geometry calculation core. Therefore, host CPU 52 can write microcodes into the instruction memory 92 by using the PCI "memory write" command with a write address on AD2 through AGP port 80. When the PCI "memory read" command is issued, instruction memory 92 can transmit a data at a read address output on AD1 bus, provided through AGP port 80, to the AGP port 80 through G-Bus 100.

(1.2.7) [Sequencer 94]

Sequencer 94 decodes the microcode from the instruction memory 92 every machine cycle, and generates control signals to be distributed to various sections in the geometry calculation core.

Figure 14:
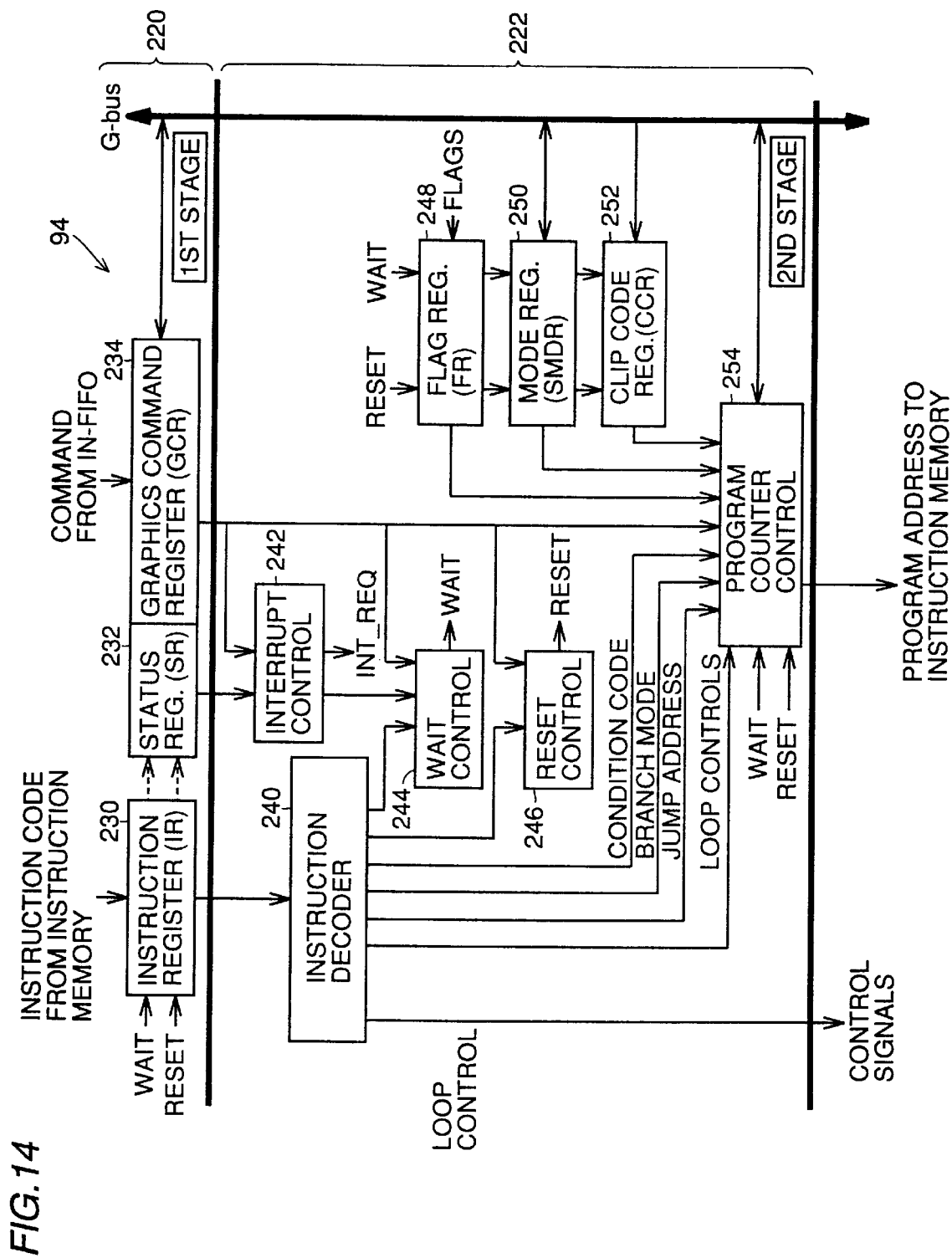
FIG. 14 is a block diagram of the sequence control apparatus.

Referring to FIG. 14, sequencer 94 includes the following units.

(1) Instruction register 230
(2) Instruction decoder 240
(3) Program counter control circuit 254
(4) Interruption control circuit 242
(5) Reset control circuit 246
(6) Wait control circuit 244
(7) 23 bit system mode register (SMDR 250)
(8) System status register (SR 232)
(9) Graphics command register (GCR 234)
(10) Flag register (FR 248)

The instruction code, which is provided by instruction memory 92, is stored in instruction register 230 and is decoded by instruction decoder 240. In the next step, interruption control circuit 242, reset control circuit 246 and wait control circuit 244 generate the control signals required for corresponding functional units, taking account of both the output of instruction decoder 240 and the current status of SMDR 250.

The program counter control circuit 254 selects the source to be loaded into the PC, and controls the modification of the PC, dependent on the output of instruction decoder 240.

The program counter control circuit 254 supports the following PC modification modules.

(1) PC increment
(2) Jump
(3) Conditional jump
(4) Subroutine call
(5) Conditional subroutine jump
(6) Return from subroutine For the conditional jump, the current condition, which is computed with the contents of FR 248 is compared with the conditions specified in the operand. Program counter control circuit 254 also includes an 8-level PC stack and loop counters (LC0, LC1). The PC stack enables the nesting of four subroutine calls. The two loop counters support two levels of hardware loop operation. Program counter control circuit 254 controls modification of the PC by detecting the zero flag corresponding to the activated loop counter.

Figure 15:
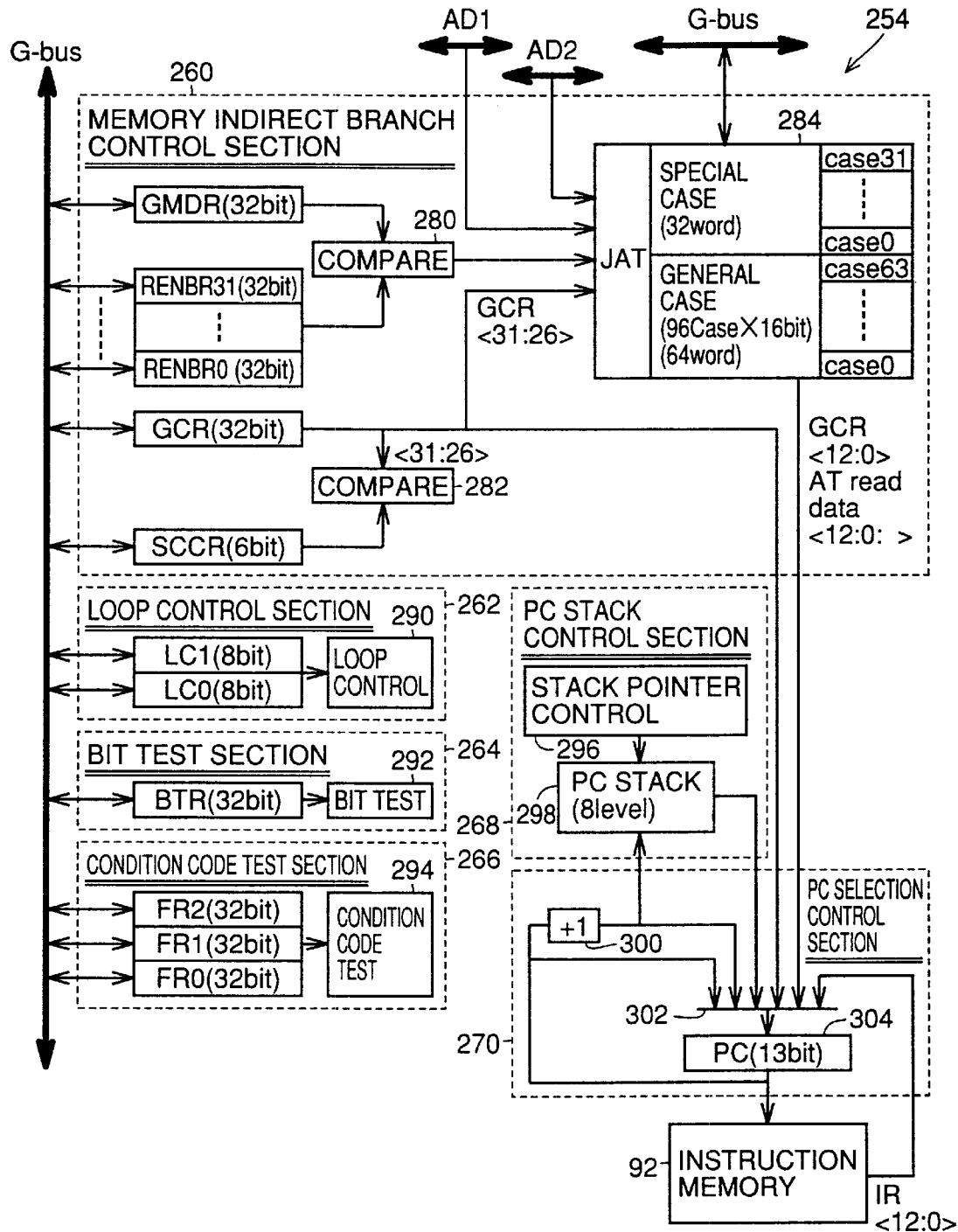
FIG. 15 is a block diagram of the program counter control apparatus.

Referring to FIG. 15, program counter control circuit 254 includes a memory indirect branch control section 260, a loop control section 262, a bit test section 264, a condition code test section 266, a PC stack control section 268 and a PC selection control section 270.

Memory indirect branch control section 260 includes: a 32 bit geometry calculation mode register (GMDR) connected to G-Bus 100; 32 reference enable flag registers (RENBR0 to RENBR31) each being 32 bits, connected to G-Bus 100; a 32 bit graphics command register (GCR); a 6 bit special case command register (SCCR) connected to G-Bus 100; a comparing circuit 280 comparing contents of GMDR with contents of RENBR; a comparing circuit 282 for comparing the contents of SCCR with GCR<31:26>; and a 96 word×16 bit jump address table (JAT 284) (JATx: x=0 to 95) receiving AD1, AD2, G-Bus 100, an output of comparing circuit 280 and GCR<31:26>. The memory indirect branch control section 260 controls memory indirect branching in response to jrmd instruction.

Loop control section 262 includes loop counters LC0 and LC1 connected to G-Bus 100, and a loop control circuit 290.

Bit test section 264 includes a bit test target register (BTR) connected to G-Bus 100, and a bit test circuit 292.

Condition code test section 266 includes flag registers FR0 to FR2 connected to G-Bus 100 and a condition code test circuit 294.

PC stack control section 268 includes a stack pointer control circuit 296 and a PC stack 298.

PC selection control section 270 includes a PC 304, an incrementer 300 receiving an output of PC 304, and a selector 302 which receives outputs of PC 304, incrementer 300, PC stack 298, GCR, JAT 284 and instruction memory 92, selects one of the received outputs and applies the selected output to PC 304. The output of incrementer 300 is also applied to PC stack 298.

(1.2.8) [Address Generating Unit (AGU 96)]

AGU 96 generates under the control of sequencer 94, address data and register identification code for two sources and one destination. The two sources and one destination refer to internal data memory and/or control register.

Figure 16:
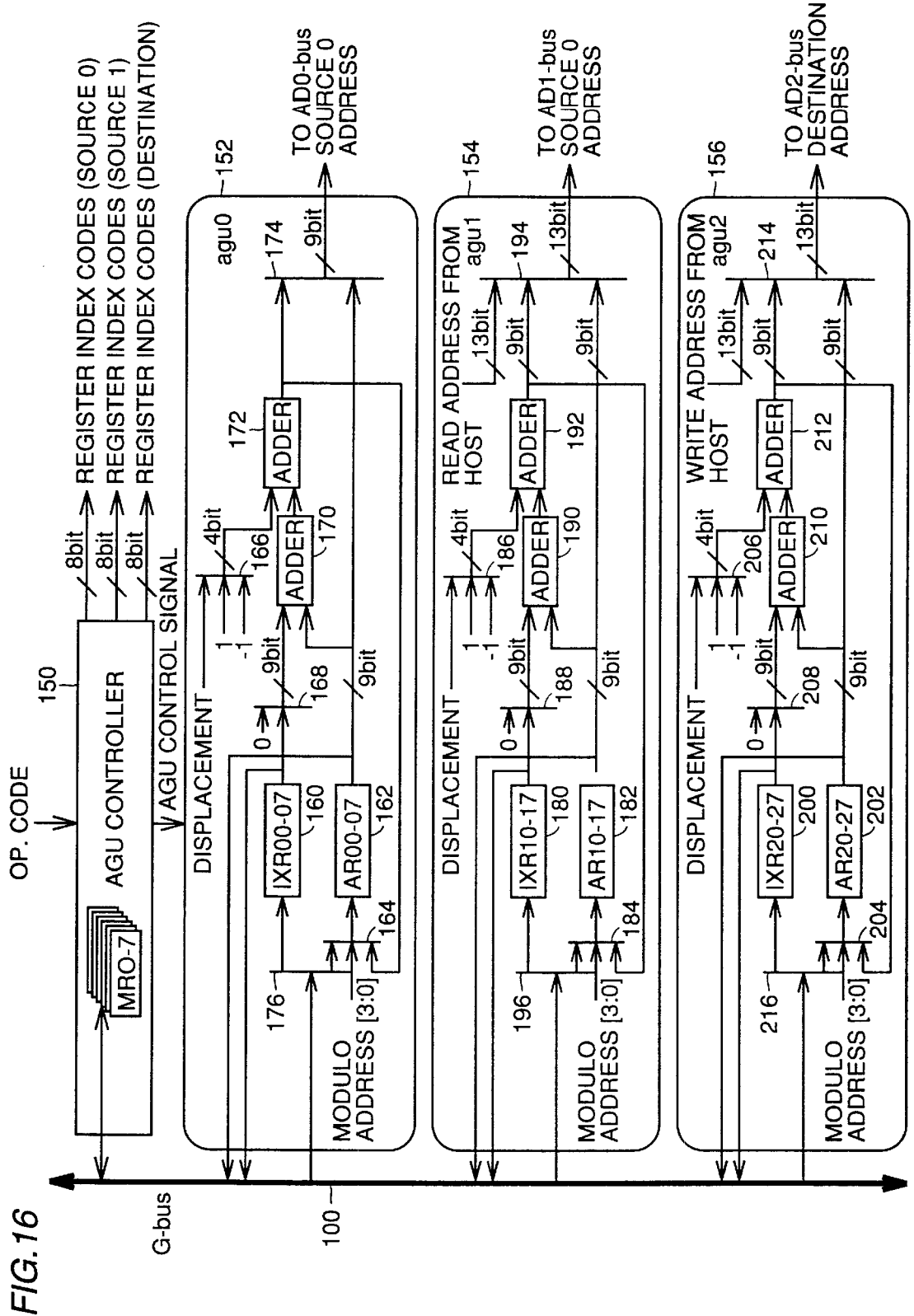
FIG. 16 is a block diagram of an address generating apparatus for the geometry processor for 3D graphics in accordance with a first embodiment of the present invention.

Referring to FIG. 16, AGU 36 includes three independent address generation subunits (AGU0 (152) to AGU2 (156)), and an AGU controller 150 receiving an operation code and outputting signals for controlling the subunits. These are all connected to G-Bus 100.

AGU controller 150 includes a modulo mode register (MRx, 4 bits) [x=0–7]. The three subunits generate address data corresponding to two sources and one destination. Each subunit is capable of generating an address (9 bits) or register identification code (8 bits) every machine cycle. Each subunit includes the following hardware resources.

(1) Address registers (ARnx, 9 bits) [n=0, 1, 2] [x=0–7]
(2) Index registers (IXRnx, 9 bits) [n=0, 1, 2] [x=0–7]
(3) Two full adders (9 bits)

More specifically, AGU0 (152) includes IXR00–07 (160), AR00–07 (162), and adders 170 and 172. An input of IXR00–07 (160) is connected to G-Bus 100. An output of IXR00–07 (160) is connected to G-Bus 100 and one input of selector 168. An input of AR00–07 (162) is connected to an output of selector 164. Selector 164 has three inputs, to which data of G-Bus 100, modulo address [3:0] and an output of adder 172 are applied. An output of AR00–07 (162) is connected to G-Bus 100, an input of adder 170 and one input of selector 174. To the other input of selector 168, zero is applied. To the input of adder 172, an output of selector 166 is applied respectively. Selector 166 has three inputs, to which Displacement, 1 and −1 are applied. To the other input of selector 170, the output of adder 172 is applied. The output of adder 172 is connected to AD0 bus, and provides address of source 0.

Similarly, AGU1 (154) includes IXR10–17 (180), AR10–17 (182), selectors 184, 186 and 188, adders 190 and 192, and a selector 194. The structure of AGU1 (154) is similar to that of AGU0 (152), except that selector 194 is different from selector 174 of AGU0 (152) in that selector 194 has three inputs, to one of which read address (13 bits) from the host is applied. The output of selector 194 is connected to AD1 bus, and provides the calculated data, that is, read address (source 1 address) from the host.

AGU2 (156) also has similar structure as AGU1 (154), and includes IXR20–27 (200), AR 20–27 (202), selectors 204, 206 and 208, adders 210 and 212, and a selector 214. Similar to selector 194, selector 214 also has three inputs. However, selector 214 is different from selector 194 in that write address is applied in place of the read address from the host. The output of selector 214 is connected to AD2 bus, and provides the calculated data, that is, write address (destination address) from the host.

AGU controller 150 will be described as an example. Adder 170 adds IXR00–07 (160) and AR00–07 (162). The other adder 172 adds the output of adder 170 with the Displacement or the offset data. When IXR00–07 (160) is not designated by any instruction, the input of adder 170 is always 0. When (ARnx, IXR, offset) mode is issued, AGU replaces the MSB of the offset value with zero, and handles the value as unsigned three bit integer.

(1.2.9) [Data Memory (FLM0–3, FLUT, ILM, IFIFO)]

A data memory can be classified into three categories. More specifically, FLM0 (130) to FLM3 (136), FLUT 146 and ILM 104. FLM0–3 are each 512 word×32 bit 3-port (2R/1W) RAM, which are provided as data buffers in respective floating point calculating units. FLUT is a 512 word×32 bit 3-port (2R/1W) table RAM for FPOWER calculating circuit 314 included in FPOWER/FDIV section 114. ILM 104 is also a 512 word×32 bit 3-port (2R/1W) buffer RAM for IPU 106. Two reading operations and one writing operation can be executed in one machine cycle to and from FLM0 (130) to FLM 3 (136), FLUT 146 and ILM 104.

Input FIFO 98 latches graphic data to be processed by the graphic calculation core. Input FIFO 98 is an FIFO type buffer utilized for data exchange between AGP port 80 and the geometry calculation core. Input FIFO 98 consists of a 256 word×32 bit FIFO. Writing operation to input FIFO 98 is controlled by sequencer 94. When "END" signal of FIFO-P2C signal is asserted, it means that input FIFO 98 is empty, and transfer from FIFO_P2C to input FIFO 98 starts automatically. When input FIFO 98 is full, transfer is not activated until input FIFO 98 is made empty. This writing operation is allowed even when the geometry calculation core is in the wait state. The IFIFO reading operation is started by issuance of respective move instruction (mv). As a result, the next graphics command must be always transferred to the geometry calculation core, before the graphics data transmission to input FIFO 98.

The address data for read/write are delivered to each data memory through address buses (AD0, AD1 and AD2), except for input FIFO 98. Table 11 shows a list of input/output buses connected to the data memories.

TABLE 11

| Memory | Output Port | Input Port |
|--------|-------------|------------|
| FLM0 | G-bus | G-bus |
|  | FPUO-input | D2-bus |
|  | D1-bus | FPUO-output |

TABLE 11-continued

| Memory | Output Port | Input Port |
|---|---|---|
| FLM1 | G-bus | G-bus |
|  | FPU1-input | D2-bus |
|  | D1-bus | FPUO-output |
| FLM2 | G-bus | G-bus |
|  | FPU2-input | D2-bus |
|  | D1-bus | FPUO-output |
| FLM3 | G-bus | G-bus |
|  | FPU3-input | D2-bus |
|  | D1-bus | FPUO-output |
| FLUT | G-bus | G-bus |
|  | FPOWER-input |  |
| ILM | G-bus | G-bus |
|  | IPU-input | IPU-output |
| IFIFO | G-bus | FIFO__PSC |

Instruction Set (1.3) Instruction Pipeline

Figure 17:
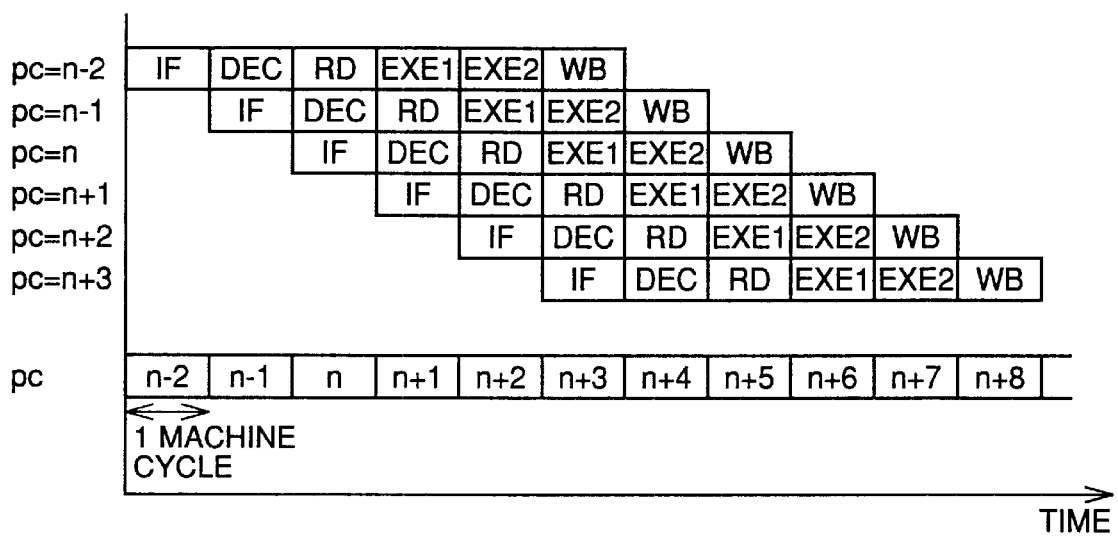
FIG. 17 represents type of instruction executing pipeline in the calculation core of the geometry processor for 3D graphics in accordance with the first embodiment of the present invention.

The geometry processor for 3D graphics executes an instruction in six stages pipeline. The six stages include to instruction fetch (IF) decode (DEC), source data read (RD), execution (EXE1 and EXE2) and write back (WB). Each stage is carried out in one machine cycle. The number of execution stages may be different, when an integer operation occurs, when a combinational operation is executed or a jump operation is executed. FIG. 17 shows the instruction pipeline in the geometry processor for 3D graphics schematically. Table 12 shows, operations in each pipeline stage.

TABLE 12

| Pipeline Stage | Operations |
|---|---|
| IF | IR←Instruction mem(PC) |
|  | Increment PC |
| DEC | Instruction decode |
|  | Modification of PC |
|  | Loop counter control |
|  | Modification of ARnx |

TABLE 12-continued

| Pipeline Stage | Operations |
|---|---|
|  | PC-Stack Push/Pop |
|  | Bit test |
| RD | Data memory read and Read Data Transfer |
|  | Transfer data stored in a control registers |
| EXE1 | Execution (1) FALU/FMPY/FDIV/FPOWER/IALU/ISFT |
| EXE2 | Execution (2) FALU/FMPY/FDIV/FPOWER/IALU/ISFT |
|  | IPU Flag register set (for 1 cycle operation) |
| WB | Data memory write |
|  | Control register write |
|  | FPU Flag register set |
|  | IPU Flag register set (for 2 cycle operation) |
|  | Clip-test code set |

Further, Table 13 shows, the number of stages in each unit.

TABLE 13

| Unit | Number of Stages |
|---|---|
| FALU:FP Arithmetic/Logical Unit | 3 |
| FMPY:FP Multiplier | 2 |
| FDIV:FP Divider | 9 |
| FPOWER:FP Power | 5 |
| IALU:Integer Arithmetic/Logical Unit | 2 or 3 |
| ISFT:Integer Shifter | 2 or 3 |

(1.4) Instructions

The instruction set is divided into the following groups.
(1) Program control (12 instructions)
(2) Move (2 instructions)
(3) Floating point arithmetic (16 instructions)
(4) Fixed point arithmetic (9 instructions) These groups will be described in order.

(1.4.1) [Program Control Instructions]

The program control instructions include jumps, conditional jumps and other instructions which affect the PC and address registers. The program control instructions are listed in Table 14.

TABLE 14

| Mnemonic | Opecode | Sub Opecode | Pipleine Execution | Stages | Description |
|---|---|---|---|---|---|
| nop | 00000 | — | FD | 2 | No Operation |
| reset | 00001 | — | FDREEW | 6 | S/W reset |
| mdr | 00010 | — | FDR | 3 | Modify Address registers |
| dja | 00011 | 000 | FD | 2 | Decrement jump to an absolute address |
|  |  |  | FDR | 3 |  |
| ja |  | 001 | FDR | 3 | Jump to an absolute address |
| jacc |  | 010 | FD | 2 | Jump conditionally to an absolute address |
|  |  |  | FDR | 3 |  |
| jabt |  | 011 | FD | 2 | Jump conditionally to an absolute address with bit test |
|  |  |  | FDR | 3 |  |
| jrmd |  | 100 | FDR |  | Jump to absolute address with graphics command |
|  |  |  |  | 3 | If direct addressing mode is set |
|  |  |  |  | 3 | If table look-up mode is enabled |
| jsr |  | 101 | FDR | 3 | Jump to subroutine |
| jscc |  | 110 | FD | 2 | Jump conditionally to subroutine |
|  |  |  | FDR | 3 |  |
| jsbt |  | 111 | FD | 2 | Jump conditionally to subroutine with bit test |
|  |  |  | FDR | 3 |  |
| rts | 00100 | — | FDR | 3 | Return from subroutine |

(1.4.2) [Move Instruction]

The Move/Load instructions perform data movement over the G-Bus 100 and O-Bus 116. The move instructions are shown in Table 15.

TABLE 15

| Mnemonic | Opecode | Sub Opecode | Pipleine Execution | Stages | Description |
|---|---|---|---|---|---|
| mv | 00101 | — | FDRW | 4 | Move data<br>Data memory <-> Control Register<br>Data memory <-> Data Memory |
| ldr | 00110 | — | FDRW | 4 | Load data<br>16-bit immediate -> Control Register |

(1.4.3) [Floating Point Arithmetic Instructions]

All floating point instructions can be executed in one instruction cycle in the IEEE mode, if non-normalized numbers are not detected. When the non-normalized number is detected, additional instruction cycles will be required. The floating point arithmetic instructions are listed in Table 16.

TABLE 16

| Mnemonic | Opecode | Sub Opecode | Pipleine Execution | Stages | Description |
|---|---|---|---|---|---|
| fthru | 10000 | — | FDREW | 5 | FP Through (Initialize accumulation register) |
| fabs | 10001 | — | FDREW | 5 | FP Absolute value |
| ftran | 10010 | 000 | FDREEEW | 7 | FP to 2's complement Integer translation |
| ftranu |  | 100 | FDREEEW | 7 | FP to Unsigned Integer translation |
| fdiv0 | 10011 | 000 | FDRTEEEEEEEEEW | 14 | FP Divide |
| fdiv1 |  | 100 | FDRTEEEEEEEEEW | 14 | FP Divide |
| fpow | 10100 | 000 | FDRTEEEEEW | 10 | FP Power |
| fsqrt |  | 001 | FDRTEEEEW | 9 | FP Square Root |
| fnorm |  | 010 | FDRTEEEEW | 9 | FP Norm |
| frcp |  | 011 | FDRTEEEEW | 9 | FP Reciprocal |
| reserved |  | 100 | — | — | reserved |
| ficmp | 10100 | — | FDREW | 5 | Compare with ftran results |
| fadd | 11000 | — | FDREEEW | 7 | FP Add |
| fsub | 11001 | — | FDREEEW | 7 | FP Sub |
| fclipt | 11010 | — | FDREEEEW | 8 | FP Geometry Clip test |
| fclmp | 11011 | — | FDREEEW | 7 | FP Clamp |
| fmpy | 11100 | — | FDREEW | 6 | FP Multiply |
| fmac1 | 11101 | — | FDREEEEW | 9 | FP Multiply and accumulate with ACC-1 |
| fmac2 | 11110 | — | FDREEEEW | 9 | FP Multiply and accumulate with ACC-2 |
| fmac3 | 11111 | — | FDREEEEW | 9 | FP Multiply and accumulate with ACC-3 |

(1.4.4) [Fixed Point Arithmetic Instructions]

The fixed point arithmetic instructions are listed in Table 17.

TABLE 17

| Mnemonic | Opecode | Sub-Opecode | Pipeline Execution | Stages | Description |
|---|---|---|---|---|---|
| add | 01000 | — | FDREEEW | 7 | Add |
| sub | 0.001 | — | FDREEEW | 7 | Sub |
| and | 01010 | — | FDREEW | 6 | And |
| or | 01011 | — | FDREEW | 6 | Or |
| bset | 01100 | — | FDREEW | 6 | Bit set |
| brst | 01101 | — | FDREEW | 6 | Bit reset |
| btst | 01110 | — | FDREEW | 6 | Bit test |
| lsft | 01111 | 000 | FDREEEW | 7 | Logical shift |
| asft | 01111 | 100 | FDREEEW | 7 | Arithmetic shift |

(1.5) Control Registers

Names and functions of control registers used for instruction control will be described in the following.

(1.5.1) [Program Counter (PC)] (FIG. 15)

The PC is a register storing program address (13 bit) of the next location to be fetched from instruction memory 92. When the geometry processor is initialized (reset), the PC is set to 0 and cannot be read or written by any instructions. The program address in the PC is incremented by 1 except for in case of executing jump operations and return from subroutine operation. When a jump to subroutine operation is executed, the content of the current PC is stacked on the PC stack, and jump address is loaded into the PC. The PC is reset to the value of '000H'.

(1.5.2.) [System Status Register (SR232)]

SR232 stores status flags of IPU 106, FPU0 (138) to FPU3 (144)/FDIV/FSQRT, geometry processor, GCR, IFIFO and input FIFO98. Table 18 shows relation between bits in SR232 and respective statuses. SR232 can be read by move instruction, and it cannot be a destination operand. SR232 is reset to the value of '0000H'.

TABLE 18

| Bit | Name | Destination | Reset |
|---|---|---|---|
| 0 | FIVL | The IEEE standard 754 invalid operation flag in the FPU/FDIV/FSQRT<br>1:INVALID OPERATION<br>0:NOT INVALID | 0b |

TABLE 18-continued

| Bit | Name | Destination | Reset |
|---|---|---|---|
| 1 | FOVF | The IEEE standard 754 overflow flag in the FPU/FDIV/FSQRT 1:OVFRFLOW 0:NOT | 0b |
| 2 | FUNF | The IEEE standard 754 underflow flag in the FPU/FDIV/FSQRT 1:UNDERFLOW 0:NOT | 0b |
| 3 | FDVZ | The IEEE standard 754 division by zero flag in the FDIV 1:DIVISION BY ZERO 0:NOT | 0b |
| 4 | IFEM | IFIFO empty flag 1:EMPTY 0:NOT | 0b |
| 5 | OFEM | OFIFO empty flag 1:EMPTY 0:NOT | 0b |
| 6 | IFFU | IFIFO full flag 1:FULL 0:NOT | 0b |
| 7 | OFFU | OFIFO full flag 1:FULL 0:NOT | 0b |
| 8 | PCSO | PC-Stack overflow 1:OVERFLOW | 0b |

(1.5.3) [System Mode Register (SMDR 250)] (FIG. 14)

SMDR 250 stores FPU/FDIVFSQRT exception modes (SMDR<3:0>) and a trap enable bit (SMDR <4>) for the PC stack overflow. SMDR 250 can be read and written by move instruction. Table 19 shows bit assignment of SMDR 250.

TABLE 19

| 7 6 5 | 4 | 3 | 2 | 1 | 0 |
|---|---|---|---|---|---|
|  | PSOM | FDZM | FUNM | FOVM | FIVM |

If an exception mode is set and a calculation error happens, the geometry processor asserts INTA# signal to request an interrupt sequence. If SMDR<4> is set and PC stack overflows, the geometry processor also asserts the INTA# signal to request an interrupt sequence. The SMDR 250 is set to the value of '1fH' during the reset sequence.

(1.5.4) [Geometry Calculation Mode Register (GAMR)] (FIG. 15)

The GMDR includes a 32 bit current geometry mode and/or enable flag register. The value is compared with reference enable registers (RENBRx: 0≦x≦31) to detect fast processing case. The programmer for microcode programming should define the bit assignment of GMDR and set or clear the specified bit of the GMDR by instruction.

(1.5.5) [Graphics Command Register (GCR)] (FIG. 14)

The GCR is a 32 bit input graphic command register. The register can be read by move instruction. Before jrmd instruction is issued, the content of the IFIFO should be loaded into the GCR. The operation code (GCR<31:26> is used to decide address of a jump address table JAT.

(1.5.6) [Clip Code Register (CCR 252)] (FIG. 14)

The CCR is a 32 bit register storing current vertex clip code, to immediately preceding vertex clip codes, clip flags and current primitive mode. The CCR can be read/written by move instructions. Table 20 shows bit assignment of the CCR.

TABLE 20

| Bit | Name | Destination | Bit Condition | Reset |
|---|---|---|---|---|
| 0 | V0R | 0:IN, 1:OUT | x0−w≦0 | 0b |
| 1 | V0TOP | 0:IN, 1:OUT | y0−w≦0 | 0b |
| 2 | V0BAK | 0:IN, 1:OUT | z0−w≦0 | 0b |
| 3 | V0L | 0:IN, 1:OUT | x0+w≦0 | 0b |
| 4 | V0BTM | 0:IN, 1:OUT | y0+w≦0 | 0b |
| 5 | V0FR | 0:IN, 1:OUT | z0+w≦0 | 0b |
| 6 | V1R | 0:IN, 1:OUT | x1−w≦0 | 0b |
| 7 | V1TOP | 0:IN, 1:OUT | y1−w≦0 | 0b |
| 8 | V1BAK | 0:IN, 1:OUT | z1−w≦0 | 0b |
| 9 | V1L | 0:IN, 1:OUT | x1+w≦0 | 0b |
| 10 | V1BTM | 0:IN, 1:OUT | y1+w≦0 | 0b |
| 11 | V1FR | 0:IN, 1:OUT | z1+w≦0 | 0b |
| 12 | V2R | 0:IN, 1:OUT | x2−w≦0 | 0b |
| 13 | V2TOP | 0:IN, 1:OUT | y2−w≦0 | 0b |
| 14 | V2BAK | 0:IN, 1:OUT | z2−w≦0 | 0b |
| 15 | V2L | 0:IN, 1:OUT | x2+w≦0 | 0b |
| 16 | V2BTM | 0:IN, 1:OUT | y2+w≦0 | 0b |
| 17 | V2FR | 0:IN, 1:OUT | z2+w≦0 | 0b |
| 18 | V0IN | 0:OUT, 1:IN | CCR[5:0]=00H | 0b |
| 19 | V1IN | 0:OUT, 1:IN | CCR[11:6]=00H | 0b |
| 20 | V2IN | 0:OUT, 1:IN | CCR[17:12]=00H | 0b |
| 21 | OIN |  | CCR[17:0]=3FFFF H | 0b |
| 22 | ONCRS |  | CCR[21]=0 && CCR[23]=0 | 0b |
| 23 | OCROS |  | CCR[29:24] ! =0 | 0b |
| 24 | OCL |  | (CCR[3] & CCR[9] & CCR[15] (CCR[3] \| CCR[9] \| CCR[15]=1 | 0b |
| 25 | OCR |  | (CCR[0] & CCR[6] & CCR[12] (CCR[0] \| CCR[6] \| CCR[12]=1 | 0b |
| 26 | OCBTM |  | (CCR[4] & CCR[10] & CCR[16] (CCR[4] \| CCR[10] \| CCR[16]=1 | 0b |
| 27 | OCTOP |  | (CCR[1] & CCR[7] & CCR[13] (CCR[1] \| CCR[7] \| CCR[13]=1 | 0b |
| 28 | OCFR |  | (CCR[5] & CCR[11] & CCR[17] (CCR[5] \| CCR[11] \| CCR[17]=1 | 0b |
| 29 | OCBAK |  | (CCR[2] & CCR[8] & CCR[14] (CCR[2] \| CCR[8] \| CCR[14]=1 | 0b |
| 30 | CPRIM | Current | Point: 00 | 00b |
| 31 |  | Primitive | Line: 01 Polygon: 10 |  |

The primitive mode should be set into the bits<31:30>. The clip code generator 318 shown in FIG. 4 manages CCR<29:0>referring to the primitive mode. The relation between six planes of view volume and each vertex are set in the CCR<17:0>. The relations between the view volume and each vertex is set in the CCR<20:18>. The relations between the view volume and the object are set in the CCR<23:21>. The relations between six planes of the view volume and the object are set in the CCR<29:24>. When fclipt instruction is issued, the vertex 0 and vertex 1 clip codes are shifted to vertex 1 and vertex 2 clip codes, respectively. Then, current clip code is set into the CCR<5:0>. Simultaneously, the clip flags are examined and set into the CCR. The CCR is reset to the value of '00000000H'.

(1.5.7) [Bit Test Target Register (BTR)] (FIG. 15)

The BTR (32 bit) stores target data, which will be used for jabt or jsbt instruction. When the jabt or jsbt instruction is executed, the BTR [n], that is, the bit position n is specified by an instruction operand, and is compared with the test value (1 or 0) specified by the instruction. The BTR can be read and written by move instructions. The BTR is reset to '00000000H'.

(1.5.8) [PC Stack 298] (FIG. 15)

The program counter stack (PCS) consists of eight levels, 13 bit registers read or written in the LIFO (last in first out) manner. It cannot be read and written directly by any instructions. When a jump to subroutine operation is executed, the contents of current PC are automatically loaded into the PCS. When return from subroutine instruction is executed, the top level value of the PCS is loaded into the PC.

(1.5.9) [Loop Counter (LC0, LC1)] (FIG. 15)

Loop counters LC0 and LC1 are 8 bit counters specifying the number of times to execute the hardware program loop. These counters can be read and written by move instruction. When dja instruction is executed, the specified loop counter is decremented by 1. If the counter is equal to 0, the PC is incremented by 1 and the loop operation is terminated. If the counter is not 0, the program address specified by the dja instruction is loaded into the PC. If the loop counter LC0 or LC1 is set to 0, the number of loop operation will be 255, not 0.

(1.5.10) [Special Case Command Register (SCCR)] (FIG. 15)

The SCCR (6 bit) specifies the special case command code. When the GCR is set, GCR<31:26> is compared with the SCCR. If they are equal and the GMDR corresponds to the RENBR, the PC decided by the jrmd instruction is selected from the JAT (JAT64–95). The SCCR can be read and written by move instruction.

(1.5.11) [Flag Registers FR0, FR1, FR2] (FIG. 15)

The flag registers include three registers FR0, FR1 and FR2. These registers can be read by move instruction. The FR0 (32 bit) stores arithmetic flags from the IPU and the floating point calculating unit FPU0–3. FR1 (32 bit) stores IEEE exception flags from all floating point calculating units FPU0–3. FR2 (32 bit) stores IEEE exception flags from FDIV0–1 and FPOWER. The IEEE exception bits in the SR are computed with the contents of FR1 and FR2. The FR0–2 are reset to the value of '00000000H' in the reset sequence.

A condition code for the conditional operations specifies one of the following conditions which are calculated with FR0, FR1 and FR2. If FR1 is specified, the arithmetic flags of FPU3 are used to the test under the following conditions, and the arithmetic flags of FPU0, FPU1 and FPU2 are ignored, because FPU0 to 3 operate in the SIMD fashion. Table 21 is a list of condition codes.

TABLE 21

| Condition Code | Mnemonic | Description | Condition |
|---|---|---|---|
| 00000 | | ignore | |
| 00001 | | (Loop Counter not 0) | |
| 00010 | cs | carry set | c |
| 00011 | cr | carry reset | ~c |
| 00100 | vs | overflow set | v |
| 00101 | vr | overflow reset | ~v |
| 00110 | ne | not equal | ~z |
| 00111 | eq | equal | z |
| 01000 | pl | plus | ~n&~z |
| 01001 | pe | plus or equal | ~n |
| 01010 | mi | minus | n |
| 01011 | me | minus or equal | n+z |
| 01100 | ge | greater or equal | n&v+~n&~v |
| 01101 | gt | greater than | (n&v+~n&~v)&~z |
| 01110 | le | less or equal | n&~v+~n&v+z |
| 01111 | lt | less than | n&~v+~n&v |
| 10000 | ferr | error | nan+open+ovf+unf |
| 10001–10101 | Reserved | | |
| 10110 | fne | (floating) not equal | ~z |
| 10111 | feq | (floating) equal | z |
| 11000 | fpl | (floating) plus | ~n |
| 11001 | Reserved | | |
| 11010 | fmi | (floating) minus | n |
| 11011 | Reserved | | |

(1.5.12) [Input FIFO (IFIFO)] (FIGS. 2 and 3)

An input FIFO consists of a 32 bit×256 word FIFO. The FIFO can be read by move instructions and jrmd instruction. The driver software should load input graphic data, including the graphic command, into the IFIFO.

(1.5.13) [Output FIFO (OFIFO)]

The output FIFO consists of a 32 bit×256 word FIFO. The output FIFO can be written by floating point arithmetic and fixed point arithmetic instructions. Both address incrementor output and output of a parallel-serial conversion with the processing unit (IPU and FPU) are loaded into the OFIFO by hardware support. This operation occurs independently and in parallel with the execution of the instructions. The OFIFO cannot be assigned as a source operand.

The output mode code (OFIFO0-F) should be written as the destination in a microcode and it specifies data to be loaded into the OFIFO. Each bit of this code corresponds to one of FPUs. If the code<0> is set to 1, an output from FPU0 is transferred to the OFIFO through O-Bus 116. If the user wants to use all data from FPU0 to 3, the user should specify code <3:0> to 1111 (fh). If the code<3:0> is 0000 (0h), the IPU is selected as a data source. Table 22 shows a relation between the output mode code and the selected FPUs.

TABLE 22

| code | <7:4> | <3> | <2> | <1> | <0> | Selected PUs |
|---|---|---|---|---|---|---|
| OFIFO0 | 1111 | 0 | 0 | 0 | 0 | IPU |
| OFIFO1 | 1111 | 0 | 0 | 0 | 1 | FPU0 |
| OFIFO2 | 1111 | 0 | 0 | 1 | 0 | FPU1 |
| OFIFO3 | 1111 | 0 | 0 | 1 | 1 | FPU1 + FPU0 |
| OFIFO4 | 1111 | 0 | 1 | 0 | 0 | FPU2 |
| OFIFO5 | 1111 | 0 | 1 | 0 | 1 | FPU2 + FPU0 |
| OFIFO6 | 1111 | 0 | 1 | 1 | 0 | FPU2 + FPU1 |
| OFIFO7 | 1111 | 0 | 1 | 1 | 1 | FPU2 + FPU1 + FPU0 |
| OFIFO8 | 1111 | 1 | 0 | 0 | 0 | FPU3 |
| OFIFO9 | 1111 | 1 | 0 | 0 | 1 | FPU3 + FPU0 |
| OFIFOa | 1111 | 1 | 0 | 1 | 0 | FPU3 + FPU1 |
| OFIFOb | 1111 | 1 | 0 | 1 | 1 | FPU3 + FPU1 + FPU0 |
| OFIFOc | 1111 | 1 | 1 | 0 | 0 | FPU3 + FPU2 |
| OFIFOd | 1111 | 1 | 1 | 0 | 1 | FPU3 + FPU2 + FPU0 |
| OFIFOe | 1111 | 1 | 1 | 1 | 0 | FPU3 + FPU2 + FPU1 |
| OFIFOf | 1111 | 1 | 1 | 1 | 1 | FPU3 + FPU2 + FPU1 + FPU0 |

(1.5.14) [Primary PCI Bus Interface Register (PBIR)]

The contents of the primary PCI bus register<2:0>, <9:8> correspond to the flags, GE_Reset, GE_Idle, GE_Idle_Ack, GE_Int_Req and GE_Int_Ack in the interface unit. PBIR<15:8> consists of IFIFO status flags and OFIFO status flags. The register can be read by move instruction. The write operation to PBIR affects only PBIR<9>. The PBIR is copied to/from the control registers in the PCI interface unit. The PBIR is reset to the value of '1502H' in the reset sequence. An instruction flag from the host, for example, is stored in the control register of the PCI interface unit, and copied to the PBIR. While the geometry calculation core operates in accordance with the contents of the PBIR, communication takes place between the PCI interface unit and the host computer, and the next instruction is stored in the register of the PCI interface unit. Therefore, operation of the geometry calculation core and communication between the host and the PCI interface unit can be executed in parallel, and hence speed of processing can be improved.

(1.5.15) [Primary Bus Interrupt Vector Register (PIVR)]

The primary bus interrupt vector register stores an interrupt vector for the host, if the geometry calculation core requests the interrupt process to the host. The interrupt vector for the interrupt request is set in the PIBR by move instruction before the interrupt request flag is set into the GE_Int_Req of the PBIR by an instruction (such as bset). Of the values, 00H is reserved for the trap of the IEEE exception. The PIVR is copied to the control register in the PCI interface unit. The PIVR is reset to '00H'.

(1.5.16) [Output Word Count Register (WCR)]

The WCR (8 bit) specifies a number of data which include PCI address data to be transferred to the secondary PCI bus.

The WCR should be set before an instruction transfers a start address of a burst.

(1.5.17) Output Data Register (DRIA) of IPU (IALU)] (FIG. 10)

The DRIA is a 32 bit IALU output data register. When one of add, sub, and, or, bset and brst instructions is executed, the DRIA always saves IALU output data even if the destination operand is not DRIA. The DRIA can be read and written by the integer arithmetic logical instructions.

(1.5.18) [Output Data Register (DRIS) of IPU (Shifter)] (FIG. 10)

The DRIS is a 32 bit ISFT output data register. When asft or lsft instruction is executed, the DRIS always saves ISFT output even if the destination operand is not DRIS. The DRIS can be read and written by arithmetic logical instructions.

(1.5.19) [Exponential Value Register (EXPR)]

The EXPR is a 32 bit floating point data register containing the exponential value used to execute fpow instruction in the FPU. The EXPR can be read and written by move instruction. The value of EXPR is ignored by instructions other than fpow instruction.

(1.5.20) [Output Data Register (DRFA0) of FALU] (FIG. 4)

The DRFA0 is a 32 bit output data register of the FALU. When one of the FALU operations is executed, the DRFA0 always saves FALU output even if the destination operand is not DRFA0. The DRFA0 can be read by the floating point arithmetic logical operations except fdiv, fsqrt and fisqrt instructions.

(1.5.21) [Floating Point Accumulation Register (DRFA1 to 3)] (FIG. 4)

DRFA1–3 is a 32 bit output data register of the FALU. When one of the instructions of FMAC1/FMAC2/FMAC3 is executed, one of the DRFAs always saves the FALU output data even if the destination operand is not the DRFA. DRFA1 is an accumulation register for FMAC instruction, DRFA2 is for FMAC2, and DRFA3 is for FMAC3. DRFAs1 to 3 can be read by floating point arithmetic logical instructions except fdiv, fsqrt and fisqrt instructions.

(1.5.22) [Output Data Register (DRFM) for FMPY] (FIG. 4)

The DRFM is a 32 bit FMPY output data register. When one of fmpy, famc and fpow instructions is executed, the DRFM always saves FMPY output even if the destination operand of the instruction is not the DRFM. The DRFM can be read and written by floating point arithmetic logical instructions except fdiv, fsqrt and fisqrt instructions.

(1.5.23) [Output Data Register (DRFP) of FPOWER Calculating Circuit 314] (FIG. 4)

The DRFP is a 32 bit output data register for FPOWER calculating circuit 314. When either fpow or fsqrt instruction is executed, the DRFP always saves the output of FPOWER calculating circuit 314 even if the destination operand of the instruction is not DRFP. The DRFP cannot be read by any floating point instructions.

(1.5.24) [Output Data Register (DRFD0-1) of FDIV0/FDIV1] (FIG. 16)

DRFD0–1 are 32 bit output data registers for FDIV. When fdiv0 instruction is executed, DRFD0 always saves the output of the floating point divider (FDIV0) even if the destination operand is not DRFD0. DRFD1 is for FDIV1. DRFD0/1 can be read and written by fdiv0/fdiv1 instructions.

(1.5.25) [Address Registers 0–7 (AGU0)] (FIG. 16, (AR00–07))

An address register consists of three address register files used as pointers to the memory (JAT, ILM, FLM0 to FLM3). The three address register files consist of 9 bit address registers AR0x ($0 \leq x \leq 7$) for source 0 operand, 9 bit address registers AR1y ($0 \leq y \leq 7$) for source 1 operand, and 9 bit address registers AR2z ($0 \leq z \leq 7$) for destination operand. The register files can be read and written by move instructions. The address in a selected address register is used to calculate the effective address of operand and is mostly modified (except for in displacement mode).

(1.5.26) [Index Register (AGU0)] (FIG. 16, (IXR00–07))

The index registers include three address register files. Each of the three address register files consists of eight 9-bit registers holding address offset values. These three register files include IXR0x registers ($0 \leq x \leq 7$) for source 0 operand, IXR1y registers ($0 \leq y \leq 7$) for source 1 operand and IXR2z registers ($0 \leq z \leq 7$) for destination operand. When an address register is read with index mode, the same number index register is read and is added to the address register. This can be read and written by move instructions.

The same applies to AGU1 and AGU2.

(1.5.27) [Modulo Mode Register] (FIG. 16, (MR0–7))

The MR register (MR0–7) is a 4 bit register used to specify a size of a circle buffer at the time of modulo addressing. By MRx ($0 \leq x \leq 7$), common circle buffer size can be specified for a total of three address registers of AR0x, AR1x and AR2x. When 0 is set in MRx, non-modulo mode is selected. The register can be read and written by move instruction. The register is reset to 0H in the reset sequence.

(1.5.28) [Reference Enable Flag Register (RENBRx: ($0 \leq x \leq 31$)]

Each reference enable flag register contains geometry calculation modes and/or enable flags to be processed faster. These registers can be read and written by move instructions, and should also be written by driver software. The RENBRx is compared with the current geometry modes and/or enable flags stored in the GMDR, to detect fast processing case when jrmd instruction is executed.

(1.5.29) [Jump Address Stable (JAT)] (FIG. 15)

The JAT includes a 16 bit×96 word jump address look-up table RAM. The JAT can be read and written by move instruction and should also be written by driver software. When jrmd instruction is executed, the PC is set to the content of JAT pointed by the address which is generated by both GCR and the result of comparing GMDR with RENBRx.

(2) Pin Specification (2.1) Pin Summary

Figure 18:
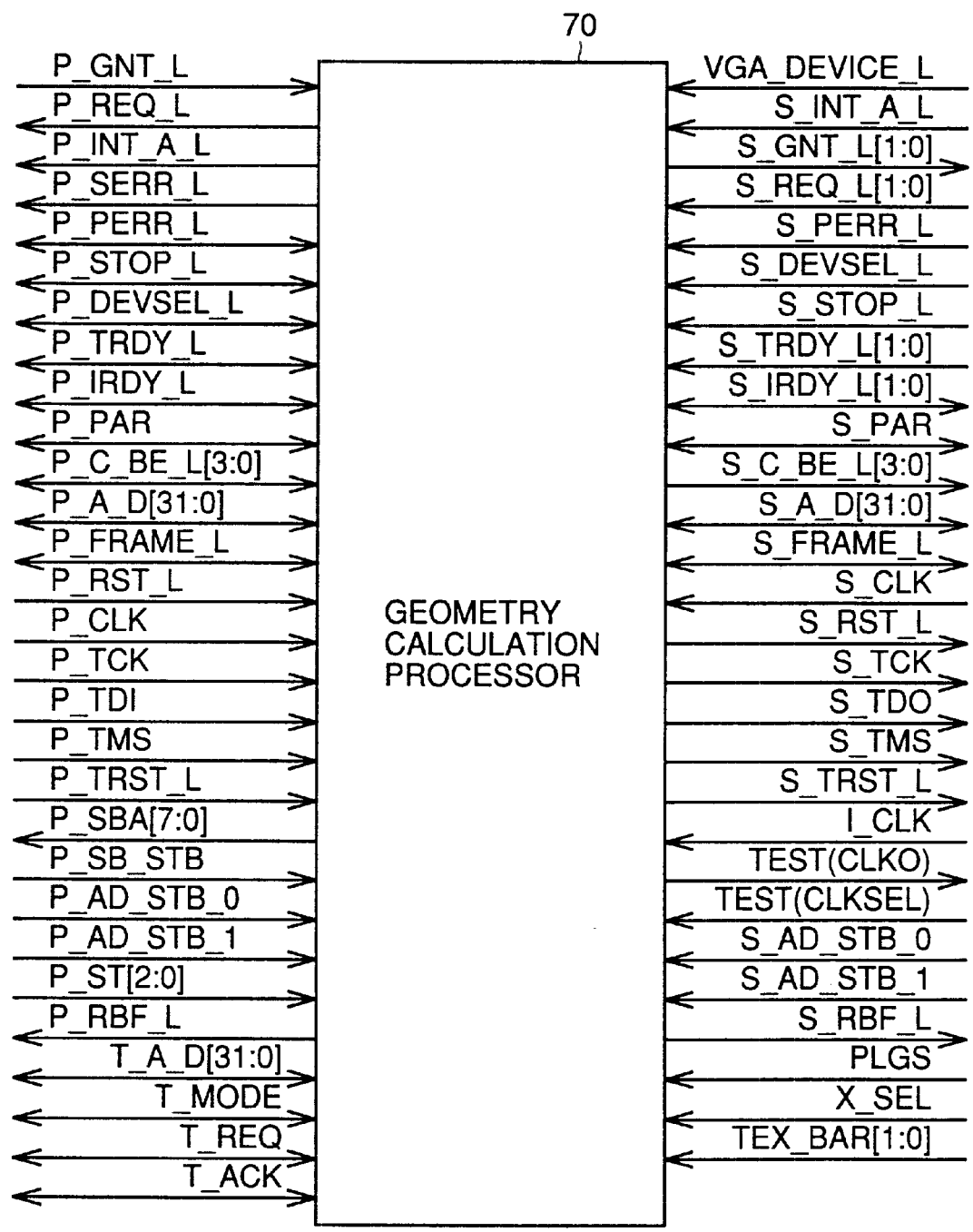
FIG. 18 represents pin assignment of geometry processor LSI for 3D graphics in accordance with the first embodiment of the present invention.

FIG. 18 shows pin assignment of the geometry processor for 3D graphics. Tables 23 to 30 represent contents of respective pins. A pin with "P__" at the head of a signal name is connected to the primary PCI bus, that is, AGP bus. A pin with "S__" is connected to the secondary PCI bus. A pin with "T__" at the head of a signal name is connected to another geometry processor for 3D graphics. A pin with "L__" at the end of a signal name indicates that the active state occurs when the signal is at a low voltage. In the following description, "I" represents an input, "O" an output, "IO" input/output, "tri-O" three-state output and "od-O" an open drain output, respectively.

(2.2) Primary PCI Bus

TABLE 23

| Signal Name | Pin Count | Pin Type | Description |
|---|---|---|---|
| P_CLK | 1 | I | Primary PCI Clock<br>This provides timing for all transaction on PCI and is an input to every PCI device. PCI operates up to 33 MHz. |
| P_RST_L | 1 | I | Primary PCI Reset<br>This is used to reset the GE-plus registers, sequencers and signals. |
| P_A_D[31:0] | 32 | I/O | Primary Address / Data<br>Address and Data are multiplexed on the same pins. A bus transaction consists of an address phase followed by one or more data phases. |
| P_C_BE_L[3:0] | 4 | I/O | Primary Bus Command / Byte Enable<br>Bus Command and Byte Enable are multiplexed on the same pins. During the address phase transaction, they define the bus command. During the address phase transaction, they are used as Byte Enables. |
| P_PAR | 1 | I/O | Primary Parity<br>This is even parity across P_A_D[31::00] and P_C_BE_L[3::0]. Parity generation is required by all PCI agents. P_PAR is stable and valid one clock after the address phase. For data phases, P_PAR is stable and valid one clock after either P_IRDY_L is asserted on a write transaction or P_TRDY_L is asserted on a read transaction. Once P_PAR is valid, it remains valid until one clock after the completion of the current data phase. |
| P_FRAME_L | 1 | I/O | Primary Cycle Frame<br>This is driven by the current master to indicate the beginning and duration of an access. P_FRAME_L is asserted to indicate a bus transaction is beginning. While P_FRAME_L is asserted, data transfer continue. When P_FRAME_L is deasserted, the transaction is in the final data phase or has completed. |
| P_IRDY_L | 1 | I/O | Primary Initiator Ready<br>This indicates the initiating agent's (bus master's) ability to complete the current data phase of the transaction. |
| P_TRDY_L | 1 | I/O | Primary Target Ready<br>This indicates the target agent's (selected master's) ability to complete the current data phase of the transaction. |
| P_STOP_L | 1 | I/O | Primary Stop<br>This indicates the current target is requesting the master to stop the current transaction. |

TABLE 24

| Signal Name | Pin Count | Pin Type | Description |
|---|---|---|---|
| P_DEVSEL_L | 1 | I/O | Primary Device Select<br>This indicates the driving device has decoded its address as the target of the current access, the device asserts P_DEVSEL_L. As an input, P_DEVSEL_L indicates whether any device on the bus has been selected. |
| P_PERR_L | 1 | I/O | Primary Parity Error<br>This is only the reporting data parity errors during all PCI transactions except a Special Cycle. |
| P_SERR_L | 32 | od-O | Primary System Error<br>This is for reporting address parity errors, data parity errors on the Special Cycle command, or any other system error where the result will be catastrophic. |
| P_REQ_L | 4 | tri-O | Primary Request<br>This indicates to the arbiter that this agent desires use of the bus. Every master has its own P_REQ_L which must be ignored while P_RST_L is asserted. |
| P_GNT_L | 1 | I | Primary Grant<br>This indicates to the agent that access to the bus has been granted. Every master has its own P_GNT_L which must be ignored while P_RST_L is asserted. |
| P_INT_A_L | 1 | od-O | Primary Interrupt Request A<br>This is used to request an interrupt. |

TABLE 25

| Signal Name | Pin Count | Pin Type | Description |
|---|---|---|---|
| P_SBA | 8 | O | Primary SideBand Address<br>SideBand Address port provides an additional bus to passrequests (address and command) to the target from the master. They are outputs from the master and an input to the target. This port is ignored by the target until enabled. |
| P_SB_STB | 1 | s-tri-I | Primary SideBand Strobe<br>SideBand Strobe provides timing for SBA[7::0] (when supported) and is always driven by the A.G.P. master. When the SideBand Strobe has been idle, a synch cycle needs to be performed before a request can be enqueued. |
| P_AD_STB_0 | 1 | s-tri-I | Primary AD Bus Strobe 0<br>AD Bus Strobe 0 provides timing for 2X data transfer mode on AD[15::00]. The agent that is providing data drives this signal. |
| P_AD_STB_1 | 1 | s-tri-I | Primary AD Bus Strobe 1<br>AD Bus Strobe 0 provides timing for 2X data transfer mode on AD[31::16]. The agent that is providing data drives this signal. |
| P_ST | 3 | I | Primary Status bus<br>Status bus provides information from the arbiter to the master on what it may do. ST[2::0] only have meaning to the master when its GNT# is asserted. When GNT# is deasserted, these signals have no meaning and must be ignored. |
| P_RBF_L | 1 | O | Primary Read Buffer Full<br>Primary Read Buffer Full indicates if the master is ready to accept previously requested low priority read data or not. When RBF# is asserted, |

TABLE 25-continued

| Signal Name | Pin Count | Pin Type | Description |
|---|---|---|---|
| | | | the arbiter is not allowed to initiate the return of low priority read data to the master. This signal must be pulled up by the central resource (A.G.P. target or motherboard). |

(2.3) Secondary PCI Bus Pin

TABLE 26

| Signal Name | Pin Count | Pin Type | Description |
|---|---|---|---|
| S_CLK | 1 | I | Secondary PCI Clock. This provides timing for all transaction on secondary PCI bus and is an input to every PCI device. PCI operates up to 66 MHz. |
| S_RST_L | 1 | O | Secondary PCI Reset. This is propagated P_RST_L. |
| S_A_D[31:0] | 32 | I/O | Secondary Address / Data. Address and Data are multiplexed on the same pins. A bus transaction consists of an address phase followed by one or more phases. |
| S_C_BE_L[3:0] | 4 | tri-O | Secondary Bus Command / Byte Enable. Bus Command and Byte Enable are multiplexed on the same pins. During the address phase transaction. they define the bus command. During the address phase transaction, they are used as Byte Enables. |
| S_PAR | 1 | I/O | Secondary Parity. This is even parity across S_A_D[31::00] and S_C_BE_L[3::0]. Parity generation is required by all PCI agents. S_PAR is stable and valid one clock after the address phase. For data phase S_PAR is stable and valid one clock after either S_IRDY_L is asserted on a write transaction or P_TRDY_L is asserted on a read transaction. Once or S_PAR is valid, it remains valid until one clock after the completion of the current data phase. |
| S_FRAME_L | 1 | I/O | Secondary Cycle Frame. This is driven by the current master to indicate the beginning and duration of an access. S_FRAME_L is asserted to indicate a bus transaction is beginning. While S_FRAME_L is asserted, data transaction continue. When S_FRAME_L is deasserted, the transaction is in the final data phase or has completed. |
| S_IRDY_L | 2 | I/O | Secondary Initiator Ready. This indicates the initiating agent's (bus master's) ability to complete the current data phase of the transaction. |
| S_TRDY_L | 2 | I | Secondary Target Ready. This indicates the target agent's (selected master's) ability to complete the current data phase of the transaction. |
| S_STOP_L | 1 | I | Secondary Stop. This indicates the current target is requesting the master to stop the current transaction. |

TABLE 27

| Signal Name | Pin Count | Pin Type | Description |
|---|---|---|---|
| S_DEVSEL_L | 1 | I | Secondary Device Select. This indicates the driving device has decoded its address as the target of the current access, the device asserts S DEVSEL_L. As an input, S_DEVSEL_L indicates whether any device on the bus has been selected. |
| S_PERR_L | 1 | I | Secondary Parity Error. This is only the reporting of data parity errors during all PCI transactions except a Special Cycle. |
| S_REQ_L | 2 | I | Secondary Request. This indicates to the arbiter that this agent desires use of the bus. Every master has its own S_REQ_L which must be ignored while S_RST_L is asserted. |
| S_GNT_L | 2 | tri-O | Secondary Grant. This indicates to the agent that access to the bus has been granted. Every master has its own S_GNT_L which must be ignored while S_RST_L is asserted. |
| S_INT_A_L | 1 | I | Secondary Interrupt Request A. This is used to request an interrupt. This interrupt is requested by each devices on the secondary bus and PCI-Bridge controller. |

TABLE 28

| Signal Name | Pin Count | Pin Type | Description |
|---|---|---|---|
| S_AD_STB_0 | 1 | s-tri-I | Secondary Address / Data Bus Strobe 0. AD Bus Strobe 0 provides timing for 2X data transfer mode on AD[15::00]. The agent that is providing data drives this signal. |
| S_AD_STB_1 | 1 | s-tri-I | Secondary Address / Data Bus Strobe 1. AD Bus Strobe 1 provides timing for 2X data transfer mode on AD[33::16]. The agent that is providing data drives this signal. |
| S_RBF_L | 1 | O | Secondary Read Buffer Full. Primary Read Buffer Full indicates if the master is ready to accept previously requested low priority read data or not. When RBF# is asserted, the arbiter is not allowed to initiate the return of low priority read data to the master. This signal must be pulled up by the central resource (A.G.P. target or motherboard). |

TABLE 29

| Signal Name | Pin Count | Pin Type | Description |
|---|---|---|---|
| T_A_D | 32 | I/O | Transfer Address/Data. Transfer Address and Data between master GE and slave GE |
| T_MODE | 1 | I/O | Transfer Mode. Read write select |

TABLE 29-continued

| Signal Name | Pin Count | Pin Type | Description |
|---|---|---|---|
| T_REQ | 1 | I/O | Transfer Request Handshake Request |
| T_ACK |  | I/O | Transfer Acknowledge Handshake Acknowledge |

(2.4) Other Pins

TABLE 30

| Signal Name | Pin Count | Pin Type | Description |
|---|---|---|---|
| P_TCK | 1 | I | Primary Test Clock. This is a input of the Test Access Port (TAP) controller and controls the test clock. |
| P_TDI | 1 | I | Primary Test Data Input. This is a input of the TAP controller and is directly connected to the first pad in the chain as well as the TAP controller. |
| P_TMS | 1 | I | Primary Test Mode Select. This is a input of the TAP controller and controls the test mode. |
| P_TRST_L | 1 | I | Primary Test Reset. This is a input of the TAP controller and controls the test reset. |
| S_TCK | 1 | O | Secondary Test Clock. This is propagated directly from primary input. |
| S_TDO | 1 | O | Secondary Test Output. This is a output of the TAP controller and provides the data shifted out of the chain if active and is tristated if not active. |
| S_TMS | 1 | O | Secondary Test Mode Select. This is Propagated directly from primary input. |
| S_TRST_L | 1 | O | Secondary Test Reset. This is Propagated directly from primary input. |
| VGA_DEVICE_L | 1 | I | VGA Indicate. This is used to indicate that a VGA function is propagated to the secondary bus. |
| L_CLK | 1 | I | Clock Input 66 MHz |
| TEST(CLKO) | 1 | O | Test Clock output |
| TEST(CLKSEL) | 1 | I | Test Clock Select |
| PLGS | 1 | I | Select 2 times or 4 times for PLL |
| X_SEL | 1 | I | Select 1x or 2X AGP |
| TEX_BAR | 2 | I | Select Size of Texture Memory |
| VDD | TBD |  | Power Supply of 2.5vision |
| GND | TBD |  | Ground |

(3) Operation of Geometry Processor (3.1) Addressing Functions (3.1.1) [Addressing Modes]

Referring to FIG. 16, the AGU can perform address calculations in three operand addressing modes, which are specified by a single instruction.

(1) Pre-addition by Displacement DIS (ARxn+DIS)

The address of the operand is in the address register ARx (x=0–2, n=0–7). Before the operand address is used, the contents of the 4 bit displacement data (DIS) given with the instruction are added. The contents of the DIS are treated as an unsigned integer ($0 \leq DIS \leq 15$). The contents of the ARxn register are not changed. This mode is not affected by the modulo mode.

(2) Post-addition by index IXR and immediate offset (ARxn+IXR)

The contents of the operand address are in address register ARxn. After the operand address is used, both the contents of the IXRxn register and the immediate data are added and stored in the same address register. The contents of the IXRxn are treated as a 9 bit 2's complement integer ($-256 \leq IXRxn \leq 255$). The contents of the IXRxn are not changed. The mode is not affected by the modulo mode.

(3) Pre-addition by 1: (+ARxn)

The address of the operand is in address register ARxn (x=0–2, n=0–7). Before the operand address is used, 1 is added. The contents of the ARxn are changed. This mode is affected by the modulo mode.

(4) Pre-decrement by 1 (−ARxn)

The address of the operand is in the address register ARxn (x=0–2, n=0–7). Before the operand address is used, 1 is subtracted. The contents of the ARxn are changed. This mode is affected by the modulo mode.

(5) Modulo mode

The modulo mode is activated by setting non-zero value onto a 4 bit MR register MRn (n=0–7). Eight MR registers enable use of eight different size of circle buffers. The MR registers specifies a size of circle buffers. In the case of MR=0101 (5H), the size of circle buffers is 5 words. The top address of the buffer is equal to AR<8:4>+0100 (4H). AR<8:4> is used to specify a base address of the circle buffer.

The address of operand is calculated by using one of the above addressing modes, even if the MR is not equal to 0. When IXR is used, non-modulo mode addressing is performed. The value set in MR is invalid.

Addressing control in three different manners is performed dependent on the value set in the MRx. The modulo mode is effective only in the address register update mode. Therefore, in displacement addition (AR non-addition), the values set in MR is invalid.

When ARn is 0 at the time of decrement, ARn is updated to ARn=MR value (−1).

When the AR is in the initial value, or when the AR value enters a region between circle buffers by the use of IXR, address update is performed in non-modulo mode. After the AR value assumes an address within the circle buffers, normal modulo mode control is performed, except for non-modulo mode addressing mode.

(3.2) Sequence Control

Sequencer 94 shown in FIG. 15 will be described mainly referring to FIG. 15.

(3.2.1) [Conditional Sequence Control]

The geometry processor for 3D graphics provides three conditional jump instructions and five conditional subroutine calls. The three conditional jump instructions are jacc, jrmd and dja instructions. Specially, the jrmd instruction is a unique and effective instruction for geometry processing compliant with OpenGL. Various sections will be described with reference to FIG. 15.

(1) Memory indirect branching control unit 260

Generation of values to be selected as the PC by jrmd instruction is divided into two dependent on the value of GCR<13>.

GCR<13>=1

In this case, the value of GCR<12:0> is directly used as the branching address. Determination of the branch destination address is not affected by the contents of GMDR, RENBR0–31, GCR<31:26> and SCCR.

GCR<13>=0

The value stored in the JAT address determined in the following manner based on the result of comparison between GMDR and RENB0–31 and the result of comparison between GCR<31:26> and SCCR is used as the branching address.

First, when "GCR<31:26> is not equal to SCCR" or when "GCR <31:26> is equal to SCCR and none of RENBR0–31 is the same as GMDR", then JAT is referenced with {0, GCR<31:26>} used as an address, for lower 64 words of JAT. When "GCR<31:26> is equal to SCCR and any of RENBR0–31 is the same as GMDR", upper 32 words of the JAT is referenced. The addresses 64 to 95 of the JAT correspond to the reference positions when RENBR0–31 match GMDR, respectively. For example, when RENBR0 matches GMDR, 64th address of the JAT is referenced. When two or more of RENBR0–31 are equal to each other, priority is given to the RENBR having smaller number.

Figure 19:
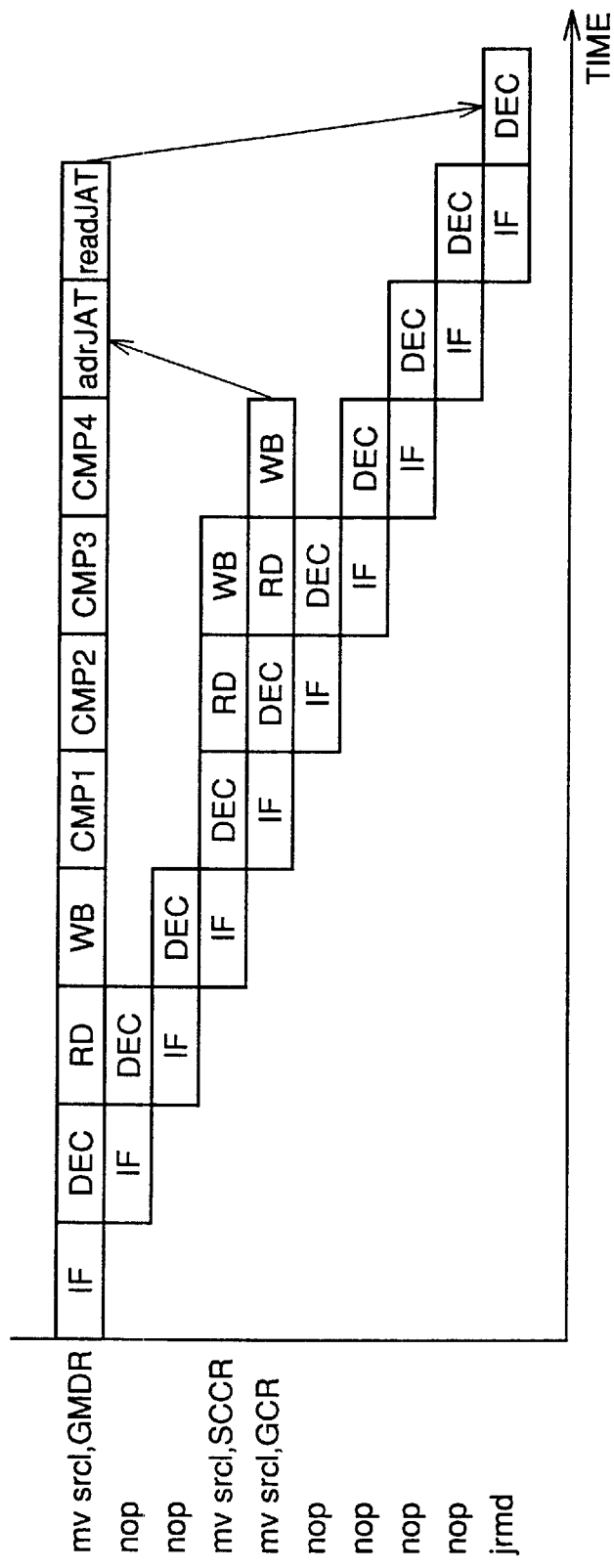
FIG. 19 represents timings of jrmd instruction and GMDR, GCR and SCCR writings.
Figure 20:
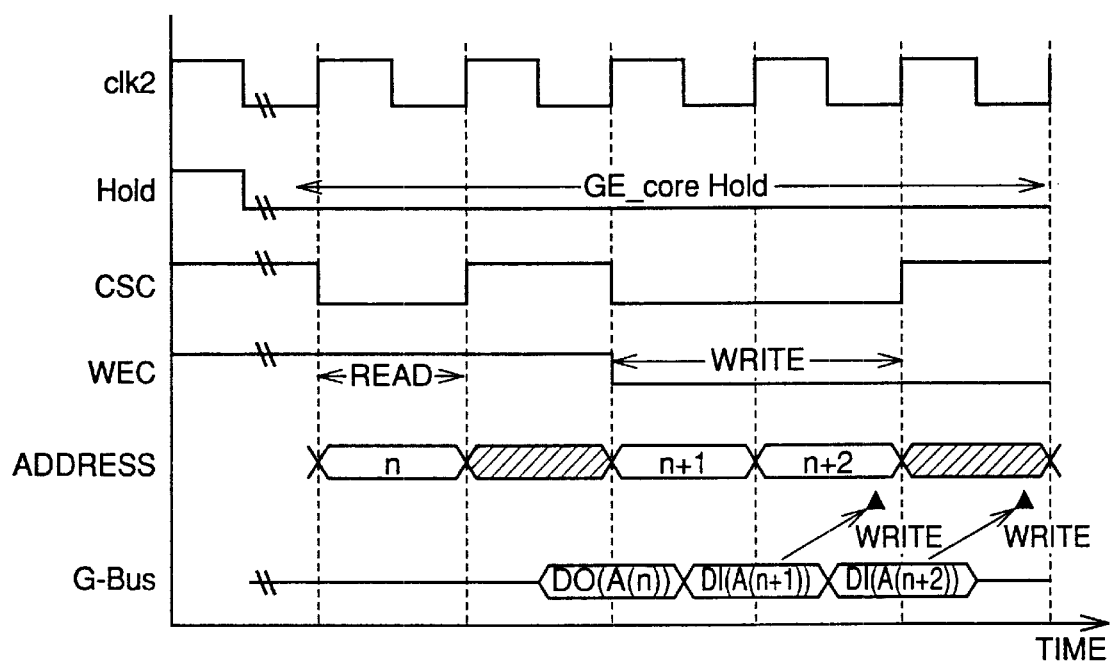
FIG. 20 is a timing chart of host access to IMEM.
Figure 21:
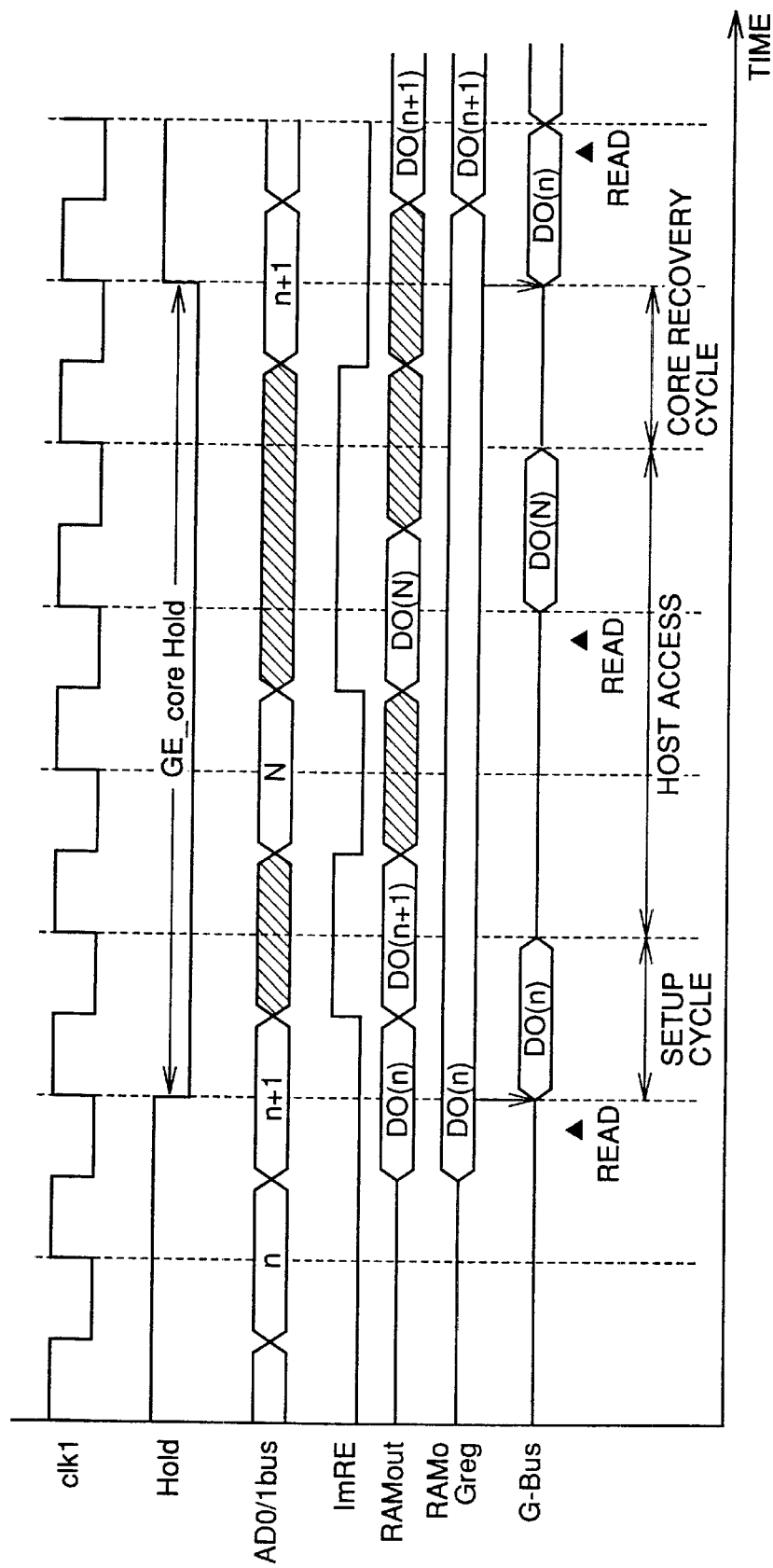
FIG. 21 is a timing chart of local memory read in the host access to ILM/FLM0-3/FLU.
Figure 22:
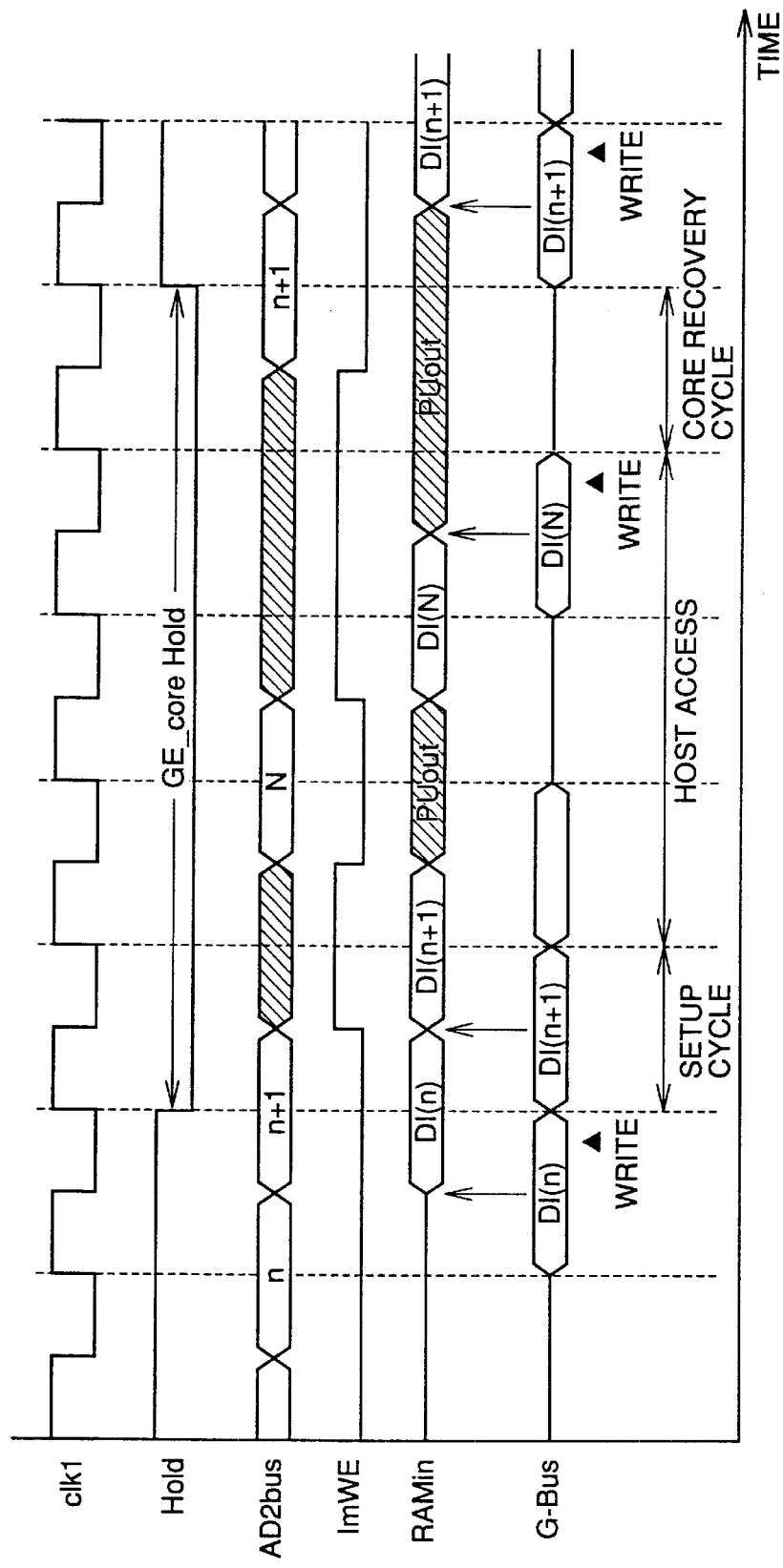
FIG. 22 is a timing chart of local memory write in the host access to ILM/FLM0-3/FLU.
Figure 23:
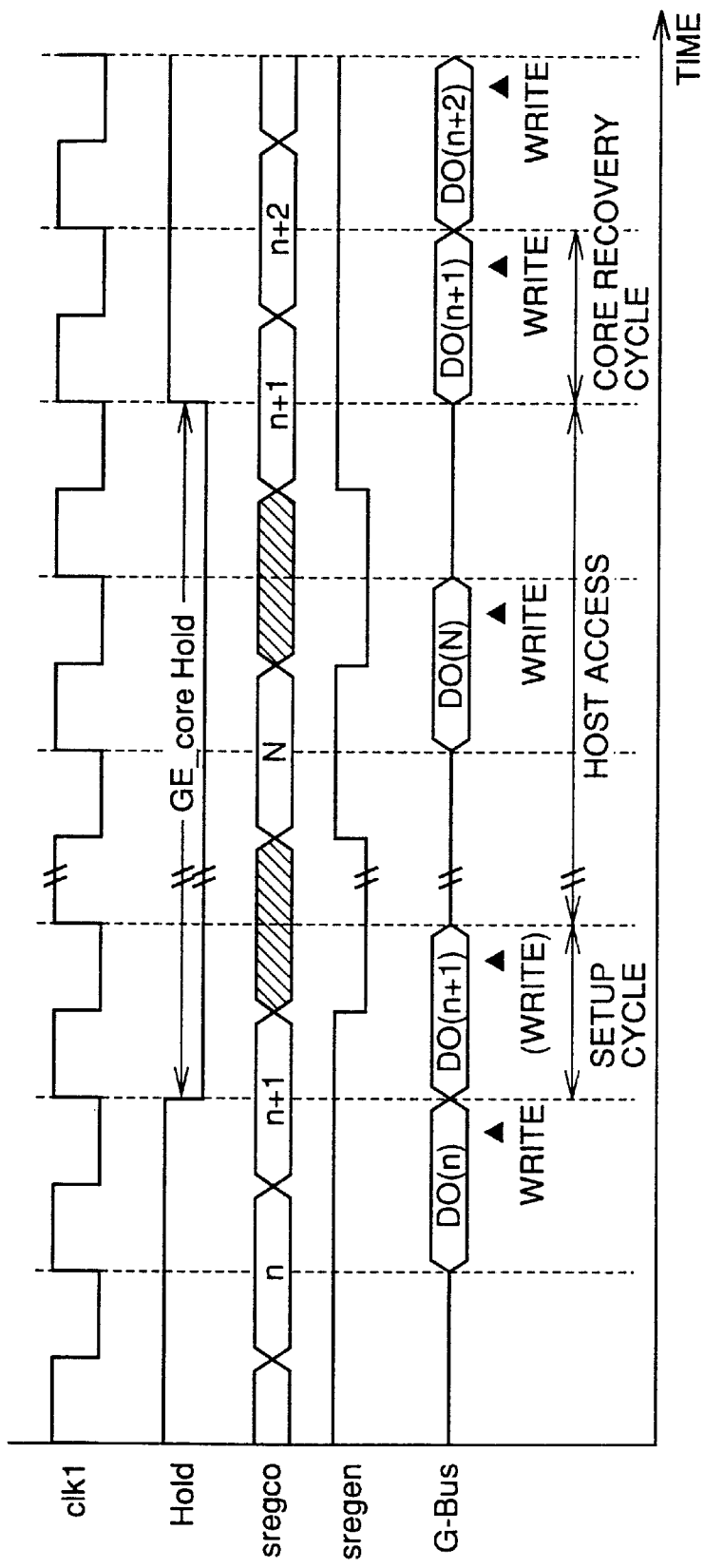
FIG. 23 is a timing chart of local memory read in the host access to the control register.

FIG. 19 shows relations of jrmd instruction and write timings of GMDR, GCR and SCCR. First, comparison between GMDR and RENBR0–31 is activated by writing of GMDR (mv src1, GMDR). Starting from the next stage of the write stage to the GMDR by mv instruction (or 1dr instruction), comparison is performed eight by eight in the order of RENBR0–7, RENBR8–15, RENBR16–23 and RENBR24–31, over a total of four stages (CMP1–CMP4). In the next stage following termination of comparison ("adrJAT" in FIG. 19), the JAT address is determined based on the result of comparison and on the result of comparison between the GCR and SCCR which has been established in the previous stage.

In the next stage ("readJAT" in FIG. 19), the JAT is referenced, and in the subsequent (following) jrmd instruction decode stage, the read data of the JAT is selected as the PC value. Therefore, when JAT reference is made, there must be an interval of at least 8 stages between transfer instruction to the GMDR and the jrmd instruction, and at least 4 stages between the transfer instruction to GCR and SCCR and jrmd instruction, respectively. If it is guaranteed that there is no JAT reference with GCR <13>=1, it is possible to select GCR<12:0> as the PC in the stage following the writing to the GCR. Therefore, in this case, it is necessary to provide an interval of at least two stages between the transfer instruction to the GCR and the jrmd instruction.

(2) Loop control section 262

Referring to FIG. 15, loop control section 262 performs PC selection control by decrement jump utilizing a loop counter by dja instruction. There are two loop counters; loop counter LC0 and loop counter LC1 (both of 8 bits). Loop control section 262 decrements by 1 the value of the loop counter specified by the instruction in the second stage of dja instruction, and if it is zero, the PC is incremented, and otherwise, a branch destination address given by the instruction (IR<12:0>) is selected as the PC.

(3) Bit test section 264

Bit test section 264 determines state of any one bit among 32 bit BTR (Bit test Target Register) specified by jabt and jsbt instructions. If the result of determination is in the specified state, the branch destination address given by the instruction is selected as the PC, and if the state is different from the specified state, the PC is incremented. Updating of the PC is carried out in the second stage.

(4) Condition code test section 266

Condition code test section 266 tests flag registers in accordance with condition codes provided by jacc and jscc instructions. If the condition is satisfied, condition code test section 266 selects the branch destination address given by the instructions as the PC and otherwise, increments the PC.

(5) PC stack control section 268

PC stack control section 268 is formed by 13 bit×8 level LIFO (Last In First Out) type stacks. PC stack control section 268 saves, when a branch occurs by a subroutine branch instruction (jsr, jscc, jsbt), the PC value of the second stage (return address from a branch) at the top of the stack, and updates the stack pointer. In the second stage of the subroutine return instruction (rts), PC stack control section 268 counts down the stack pointer value by 1, takes out the saved PC value from the top of the stack, and applies the PC value to PC selection control section 270.

The PC stack and the stack pointer are not connected to G-Bus 100, and therefore they cannot be read or written.

(6) PC selection control section 270

PC selection control section 270 determines the PC in the manner as represented by the following Table 31 in the second stage of the instruction.

TABLE 31

| Update Mode Type | | Instruction | Contents |
| --- | --- | --- | --- |
| Hold | | | when HOLD signal is "L" PCnext = PCnow |
| Subroutine Call | Unconditional | jsr | PCnext = IR <12:0> PCstack = PCnow |
| | Conditional | jscc | when cc test holds PCnext = IR <12:0> PCstack = PCnow when cc test fails PCnext = PCnow + 1 |
| | | jsbt | when bit test match PCnext = IR <12:0> PCstack = PCnow when bit test mismatch PCnext = PCnow + 1 |
| Return to Subroutine | | rts | PCnext = PCstack |
| Jump | Unconditional | Ja | PCnext = IR <12:0 |
| | Conditional | jacc | when cc test holds PCnext = IR <12:0> when cc test fails PCnext = PCnow + 1 |
| | | Jabt | when bit test match PCnext = IR <12:0> when bit test mismatch PCnext = PCnow + 1 |
| | Decrement | dja | specified loop counter ≠ 0 PCnext = IR <12:0> specified loop counter = 0 PCnext = PCnow + 1 |
| | Memory Indirect | jrmd | GCR <13> = 1 PCnext = GCR <12:0> GCR <13> = 0 PCnext = JAToutput |
| Increment | | Others | PCnext = PCnow + 1 |

(3.3) System State Control (3.3.1) [Reset Operation]

The geometry processor for 3D graphics can be reset by using the system reset or the reset instruction (software reset). The system reset initializes the whole chip including the PCI portion, while software reset initializes only the geometry calculation core. Reset operation is executed during six cycles.

(3.3.2) [Wait Operation]

The geometry calculation core enters a wait state if at least one of the following conditions occurs.

(1) Reset
(2) Hold instruction from host
(3) Interrupt to host
(4) IFIFO empty
(5) OFIFO full If a reset sequence occurs, all components in the chip are initialized to predetermined initial values. After the reset sequence, the internal condition of the chip is "wait".

The host CPU 52 can force the geometry calculation core into a standby mode (wait), by setting hold Req. bit in the PBIR through the primary PCI bus. Even if the geometry calculation core is executing any process (including data transfer to the OFIFO (FIFO_C2S) and the waiting for a response to an interrupt request from the host CPU 52), the idle request is detected, and the geometry calculation core enters the wait state (hold_ack bit in the PBIR is set). The restart of the geometry calculation core can be triggered by resetting the hold_Req. bit in the host interface register. The PCI interface unit in the chip is not affected by the hold request.

The geometry calculation core enters the wait state also by setting another bit in the PBIR. When the geometry calculation core requests an interrupt, the interrupt request flag and hold_ack bit are set. Thereafter, the INTA_L pin of the primary PCI port is asserted, and the geometry calculation core enters the wait state until the hold_Req. bit is reset. When the interrupt request flag bit is set, hold_Req. bit is set. Whenever the hold_Req. bit is set, the geometry calculation core resumes the suspended operation.

Also, the condition of the IFIFO causes the geometry calculation core to enter the wait state. If the IFIFO is empty, the geometry calculation core waits for the next data. In this case, when the IFIFO receives new data and the empty flag of the IFIFO is reset, the geometry calculation core resumes the suspended operation. In this case, the hold_ack bit in the PBIR is set.

Further, the secondary PCI bus causes the geometry calculation core to enter the wait state. If the previous output data are remaining in the OFIFO (C2S-FIFO) in the secondary PCI interface and the geometry calculation core is to further output data to the OFIFO, the geometry calculation core enters the wait state (the hold_ack bit in the PBIR is not affected). In this case, after the previous data stored in the FIFO are transferred completely, the geometry calculation core resumes the data transfer to the output FIFO.

Only if the wait state is caused by conditions (1) to (4) listed above, the host CPU 52 can read/write from/to the internal data memories/control registers in the geometry calculation core in the wait state. When the wait state is caused by the condition (5), read/write from/to the internal data memories and the control registers in the geometry calculation core are not guaranteed, because, in this case, the hold_ack bit in the PBIR is not set, even if the hold_Req. bit is set by the host.

(3.3.3) [Interrupt]

An interrupt request to the host CPU 52 is asserted in the following cases.

(1) IEEE standard 754 exception occurs
(2) PC stack overflow occurs
(3) Interrupt from debug modes occurs
(4) Interrupt request bit in the PBIR is set by the instruction An interrupt request to the host CPU 52 is asserted, when an error correction is needed for the geometry calculation core, such as for the IEEE 754 exceptions and a PC stack overflow. If a calculation error occurs in the processing units, the geometry calculation core requests an interrupt, the interrupt request bit in the PBIR is set, and the geometry calculation core stops operating simultaneously. In this case, PIVR is set to zero. This assertion of the interrupt request is affected by the contents of SMDR <6:0>. For example, if SMDR<5> is zero and "DZ" flag is set, the interrupt request assertion is prohibited. If SMDR<5> is 1 and "DZ" flag is set, the interrupt request assertion is carried out. It should be noted that when SMDR<6:0> is '0000000' (calculation error ignore mode), any calculations are continued with error values.

The setting of the interrupt request bit can be done by using either the move instruction or load instruction, if necessary. In this case, the PIBR should be loaded by the instruction, before setting the interrupt request bit, because the setting of the interrupt request bit forces the geometry calculation core to enter the wait state. Host CPU 52 can read the system status register (SR) in the geometry calculation core in order to specify which error condition occurred. The geometry calculation core is in the wait state until the Idle_Req. bit in the PBIR is reset. During waiting, any read/write from/to the internal data memories/control registers in the geometry calculation core are possible. If the instruction memory is rewritten by the host, the host should reset the geometry calculation core in order to reset the PC. Otherwise, after the Idle_Req. bit in the PBIR is reset, the geometry calculation core resumes the operations from an instruction before the interrupt.

When the geometry calculation core is posting data to the OFIFO, if an interrupt occurs, this data posting is incompleted.

(3.3.4) [Down-Loading to Internal Memories/Control Registers]

Data down-loading to internal memories and/or control registers in the geometry calculation core is performed during the geometry calculation core is in the wait state. When the geometry calculation core is in the wait state, host CPU controls down-loading to the instruction memory by using the primary PCI bus capabilities, such as "MEMORY WRITE" command. If data read from the internal memories/control registers is needed, host CPU 52 may issue "MEMORY READ" command.

Host CPU 52 should set the hold_Req flag before issuing "MEMORY WRITE" command to the geometry calculation core.

FIGS. 20 to 24 show the access sequence from host CPU to the internal memories and the control registers, classified in accordance with the objects and the access modes.

Figure 24:
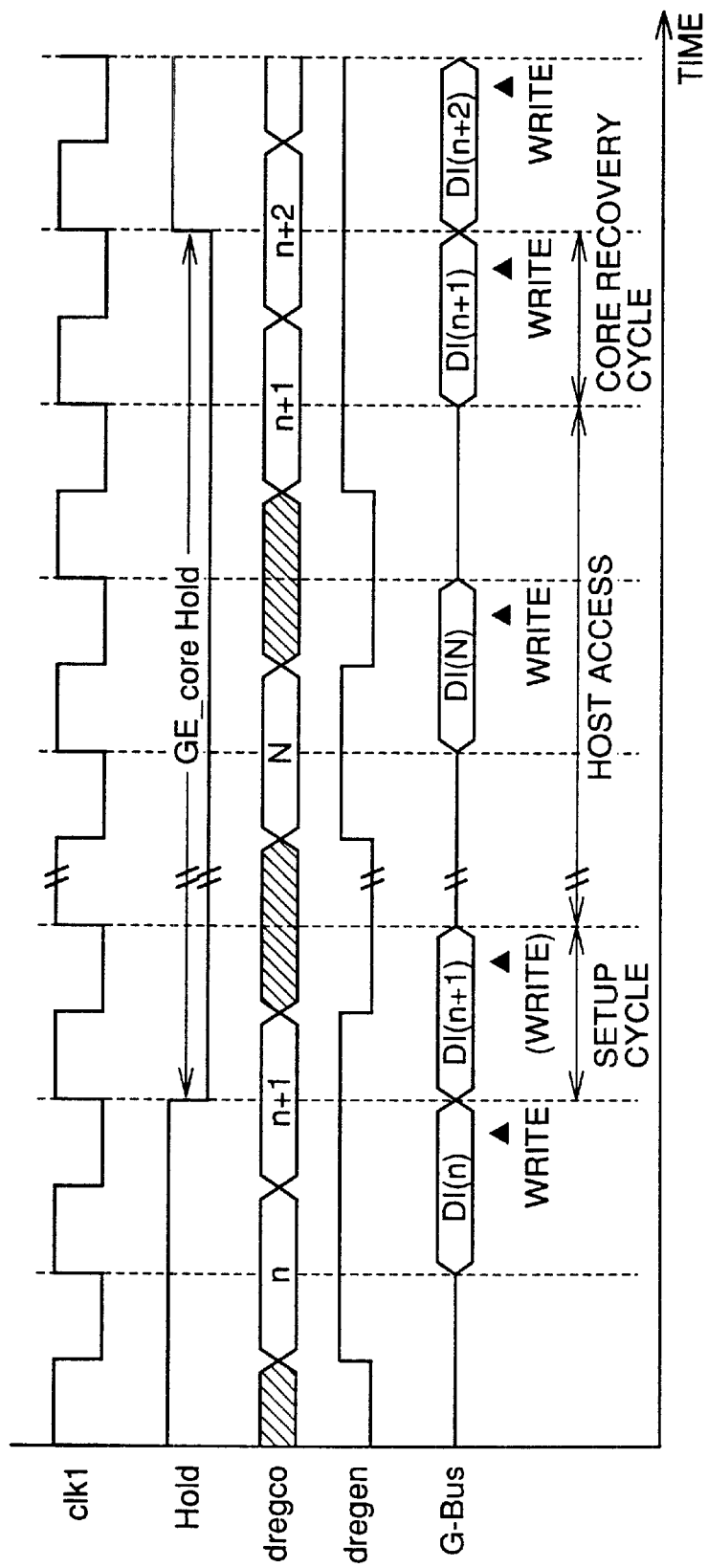
FIG. 24 is a timing chart of a local memory write in the host access to the control register.

Referring to FIG. 24, in order to allow read/write from/to host CPU 52, the control register operates even if the geometry calculation core is in the hold state. Therefore, the WRITE operation in the set up cycle is executed. The WRITE operation is executed again in the first cycle after return from HOLD.

(3.3.5) [Reset Sequence]

Figure 25:
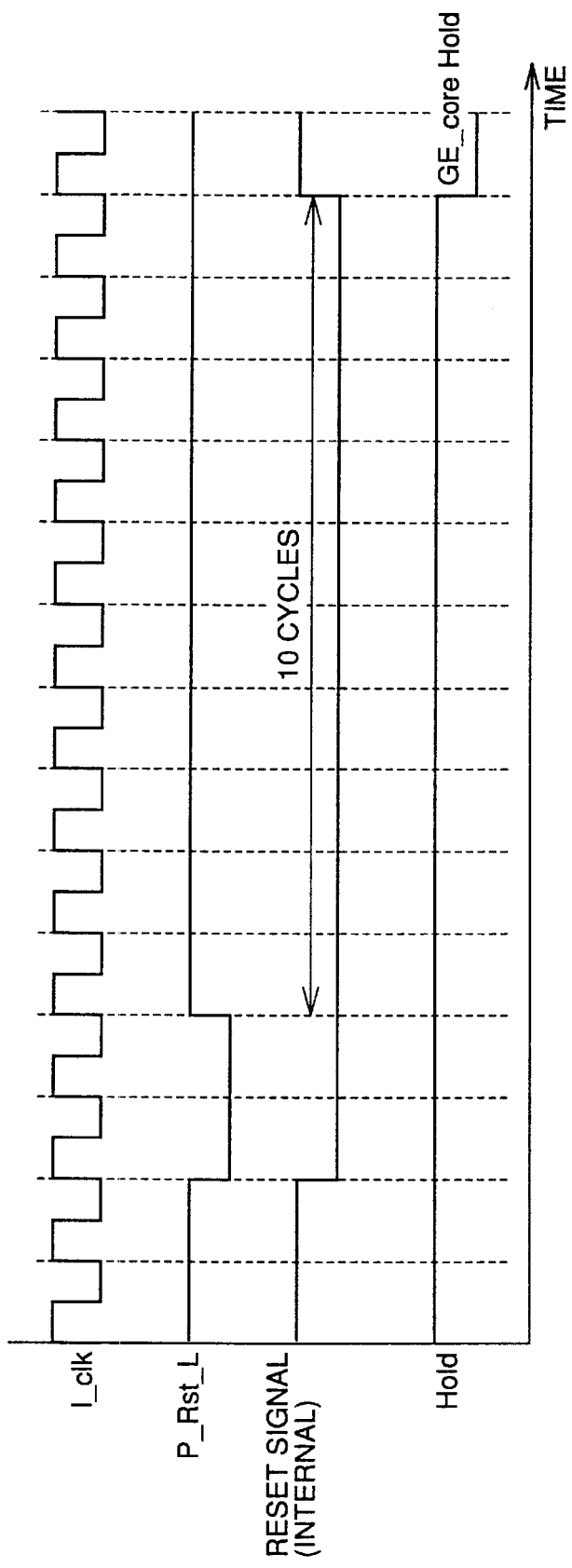
FIG. 25 represents a reset sequence of the geometry processor for 3D graphics in accordance with the present invention.

The geometry processor for 3D graphics has two reset modes. Namely, system reset and core reset. The system reset causes the initialization of the whole chip. The system reset is triggered by using the PCI reset (P_RST_L pin) as shown in FIG. 25.

The core reset also results in the initialization of the whole chip. The PCI interface section in the geometry processor for 3D graphics is also reset by the core reset. Each reset mode takes six cycles to reset the inside of the geometry processor for 3D graphics before going into the hold state.

The core reset can be triggered in two ways. Namely, GE_reset_request and the reset instruction. Host CPU 52 can access GE_reset_request in the PBIR through the primary PCI bus. If this bit is set by host CPU 52, the hardware resources in the geometry calculation core are reset to the default values except for the primary PCI logic.

The reset sequence will take six cycles to initialize internal pipeline registers. After the reset sequence, the geometry calculation core automatically enters the wait state, while the PCI interface unit can continue to communicate with the other agents.

The reset codes by host CPU 52 has higher priority than other Hold.

(3.4) OFIFO

Figure 26:
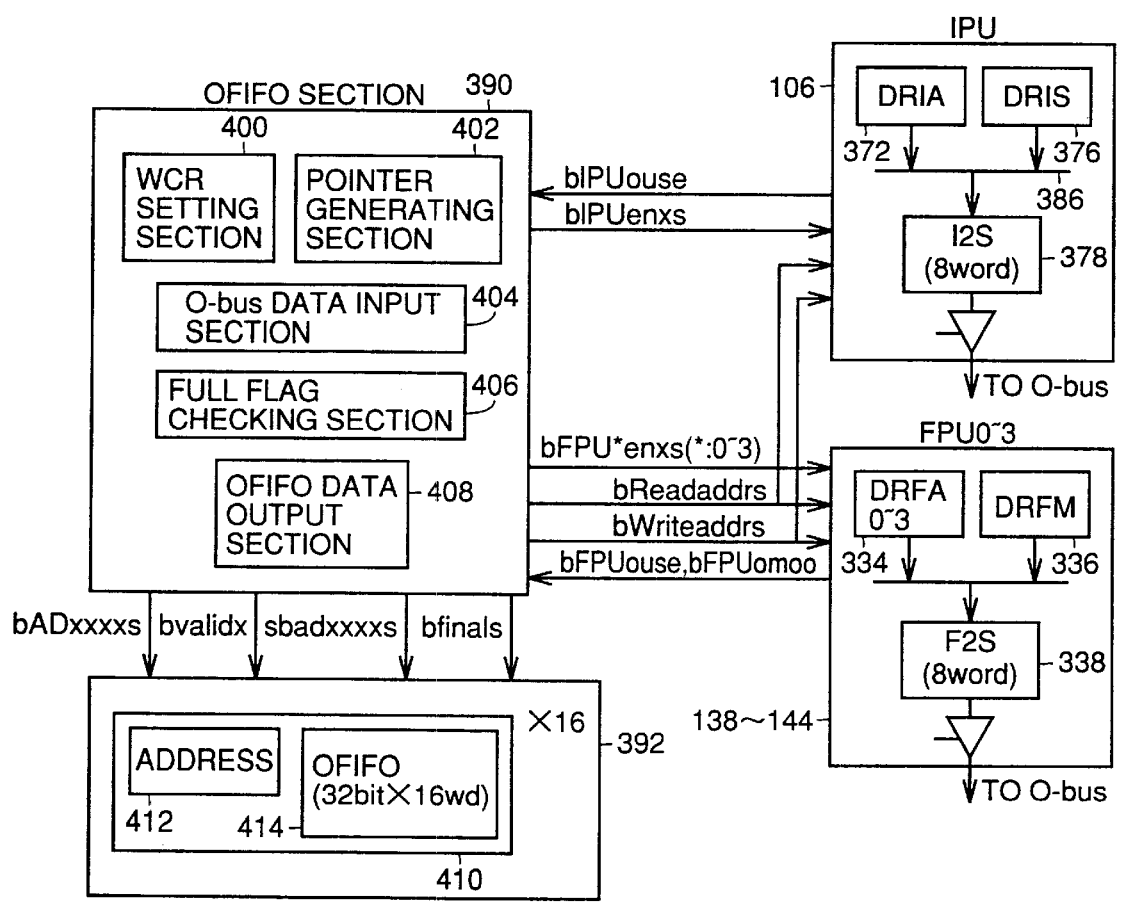
FIG. 26 is a block diagram of the OFIFO section of the geometry processor for 3D graphics in accordance with the present invention.

Referring to FIG. 26, an OFIFO section 390 for data transfer to OFIFO 392 includes a pointer generating section 402 responsive to a signal bIPUouse/bFPUouse from IPU 106 (a signal indicating an output instruction from IPU/FPU to OFIFO 392) for generating a write pointer and outputting the pointer to various blocks and for generating a mode signal (indicating data of which block of FPU0–3 is to be transferred to OFIFO 392), an enable signal for reading data of IPU/FPU output buffer (I2S/F2S) to O-Bus 116 and a read pointer; a WCR setting section 400 for setting the WCR counting which one of the burst is the transfer data to OFIFO 392, and generating a signal (badxxxxs) indicating whether the data is an address signal or not, and a signal indicating that the data is the last one of the burst (bfinals); an O-Bus data input section 404 for storing data output from the blocks to O-Bus 116 to the address section 412 of OFIFO 392 and to OFIFO 414 in accordance with the processing by WCR setting section 400; a FULL_Flag checking section 406 for checking the OFIFO_Full flag to determine Hold or not; and an OFIFO data output section 408 for outputting signals (bADxxxxs, bWDxxxxs, badxxxxs, bfinals) necessary for data transfer to OFIFO 392.

(3.4.1) [WCR Setting]

WCR can be set via G-Bus 100 by using move instruction (mv) or load instruction (ldr). When data transfer to the OFIFO through O-Bus 116 is activated, the modification of WCR occasionally may cause a wrong operation.

The geometry calculation core needs to know a size of a burst. The WCR is a register storing the burst size, which means a number of data to be transferred via O-Bus 116. If a user wishes to send a burst of five data words (DW) to the PCI section through O-Bus 116, the WCR should be set to 6 and not 5, because the burst start address have to be transferred to the PCI sections through O-Bus 116. Therefore, there is the relation represented by the following equation.

$$WCR=1 \text{ (burst start address)}+N \text{ (number of burst data)}$$

Figure 27:
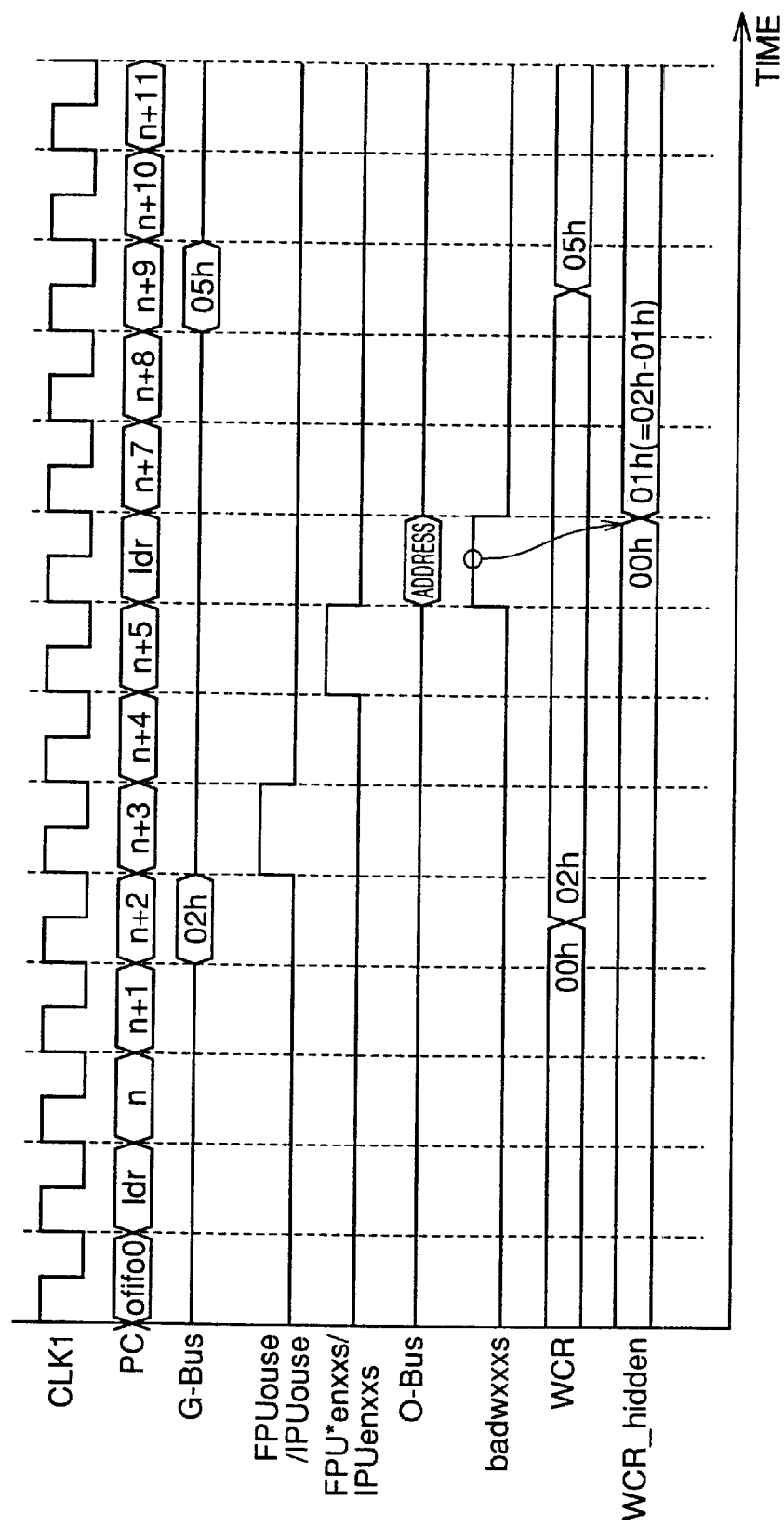
FIG. 27 represents a sequence of WCR setting.

Another notice is a timing relation between the WCR setting and the OFIFO writing. As described above, the geometry calculation core refers to the WCR in order to start the secondary PCI state machine after the completion of data writing to the OFIFO. Therefore, if the modification of WCR occurs before the completion, the geometry calculation core logic cannot accomplish the current burst transfer. A microcode designer should take care of this timing. Concerning this timing issue, a microcode programmer should check whether WCR set timing is proper or not by using a software simulator. FIG. 27 shows an example of WCR setting sequence.

(3.4.2) [O-Bus 116 Data Transfer (Single/Multiple)]

The restriction of multiple source command includes: that it does not include a next start address, and that it does not go over a bank boundary. If multiple source command is used, the second data and reminder of the multiple data stream does not cause the pipeline stall. This is a benefit of the multiple source.

(3.4.3) [Wait Caused by OFIFO_Full Flag]

The OFIFO_Full flag is sampled in the following cases.

(1) When the 15th data in each bank is written to OFIFO (2) When Final flag indicating the last data of the burst is asserted.

The OFIFO_Full flag (SR [8]) in the SR receives the FIFO_C2S_Full flag from the PCI interface every cycle, if the geometry calculation core is not in the wait state. If in the wait state, the FIFO_C2S_Full flag is not loaded into the SR. The FIFO_C2S_Full flag is set in the SR [8] after the delay of half cycle.

The OFIFO control logic checks the FIFO_C2S_Full flag, in order to inhibit overwriting to the OFIFO. The control logic samples FIFO_C2S_Full flag in two cases. One is when the final flag is asserted, that is, when the burst write to the OFIFO is completed. An internal bfinalxs signal indicates an end of the burst. Whenever the bfinalxs is asserted, the FIFO_C2S_Full flag from the PCI logic is sampled. The second is when a burst needs multibanks processing. When the WCR is equal to 10, writing is performed to one full bank (16 words) and one more word is written in another bank.

Figure 28:
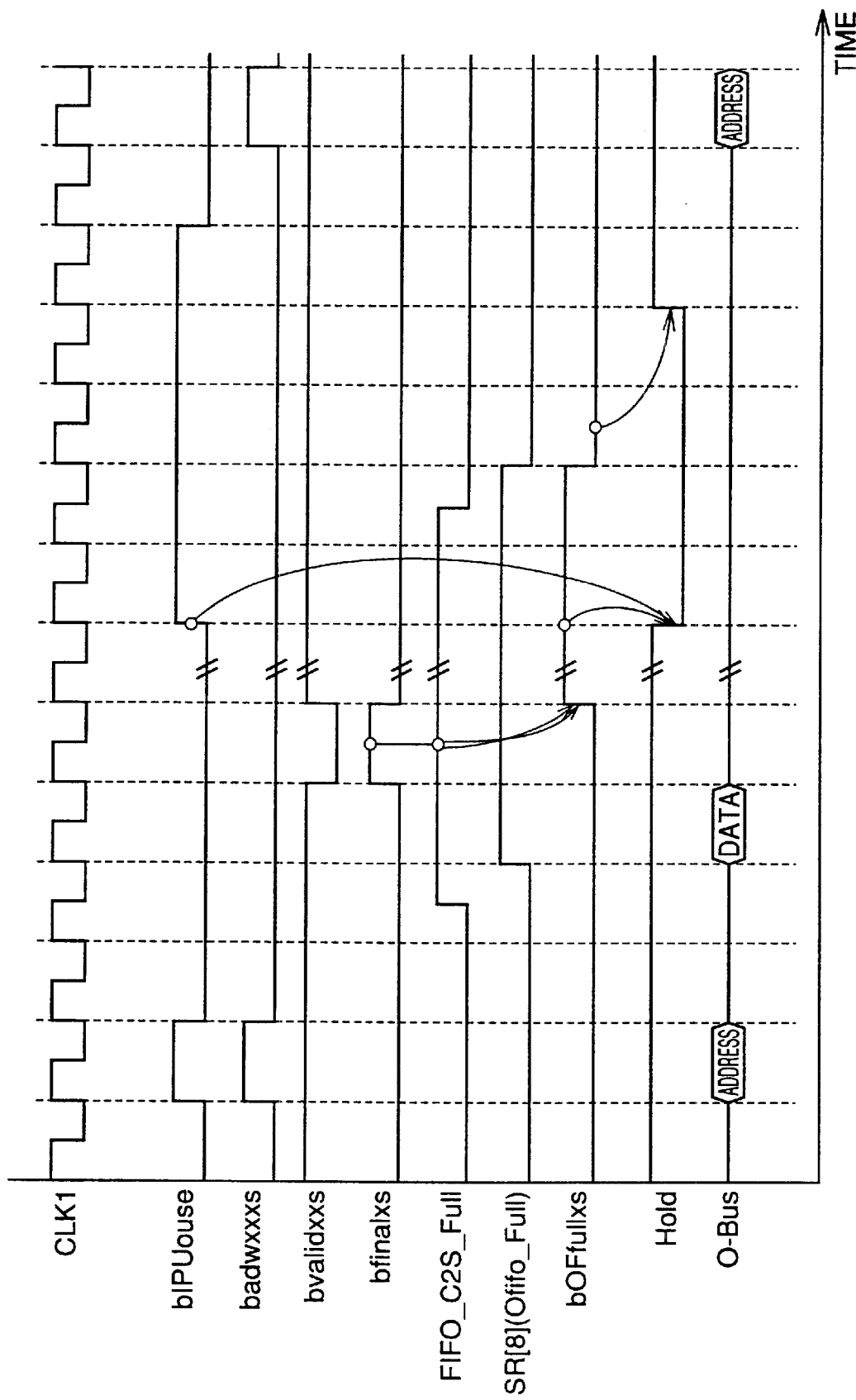
FIGS. 28 and 29 are timing charts representing sampling of OFIFO__Full.
Figure 29:
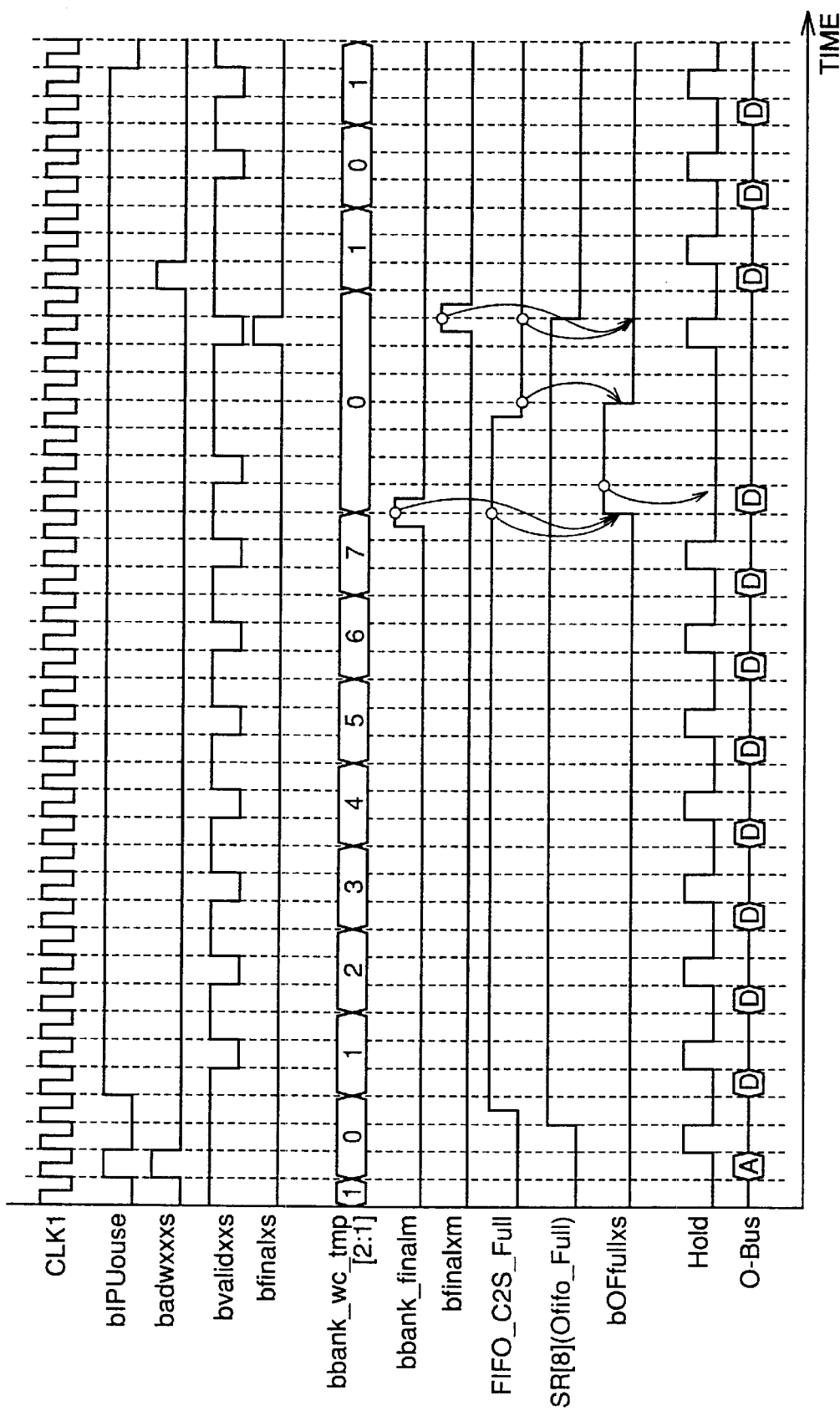

FIGS. 28 and 29 show sampling timings of OFIFO_Full_flag. In this manner, in the OFIFO section 390, data output is performed independent from the host processor or the operating section of the geometry calculation processor while preventing overwriting to the OFIFO 392, the host processor and the operating section of the geometry calculation processor are free of any load affecting other processors, in order to perform normal data output.

(3.5) Data Transfer from IFIFO

Data from host CPU 52 to the geometry calculation core are stored in input FIFO 98. Data reading from input FIFO 98 to internal memories and registers can be done only by using the move instruction. When the move instruction from the input FIFO 98 to other registers or the internal memories is executed, the input FIFO 98 outputs data pointed out by a read pointer on G-Bus 100, in the similar manner as other registers and data memories.

In this case, if the IFIFO is empty, the sequence controller makes the pipeline stall until data to be read are ready in the IFIFO.

The IFIFO_Empty flag is one of the reasons causing the geometry calculation core to enter the hold state. When the move instruction from input FIFO 98 is issued and the IFIFO_EMPTY flag in the SR is set, the geometry calculation core enters the idle state from the third stage of the move instruction. After the data becomes available in the IFIFO, the geometry calculation core restarts and read operation (the third stage of the move instruction) will be carried out.

Figure 30:
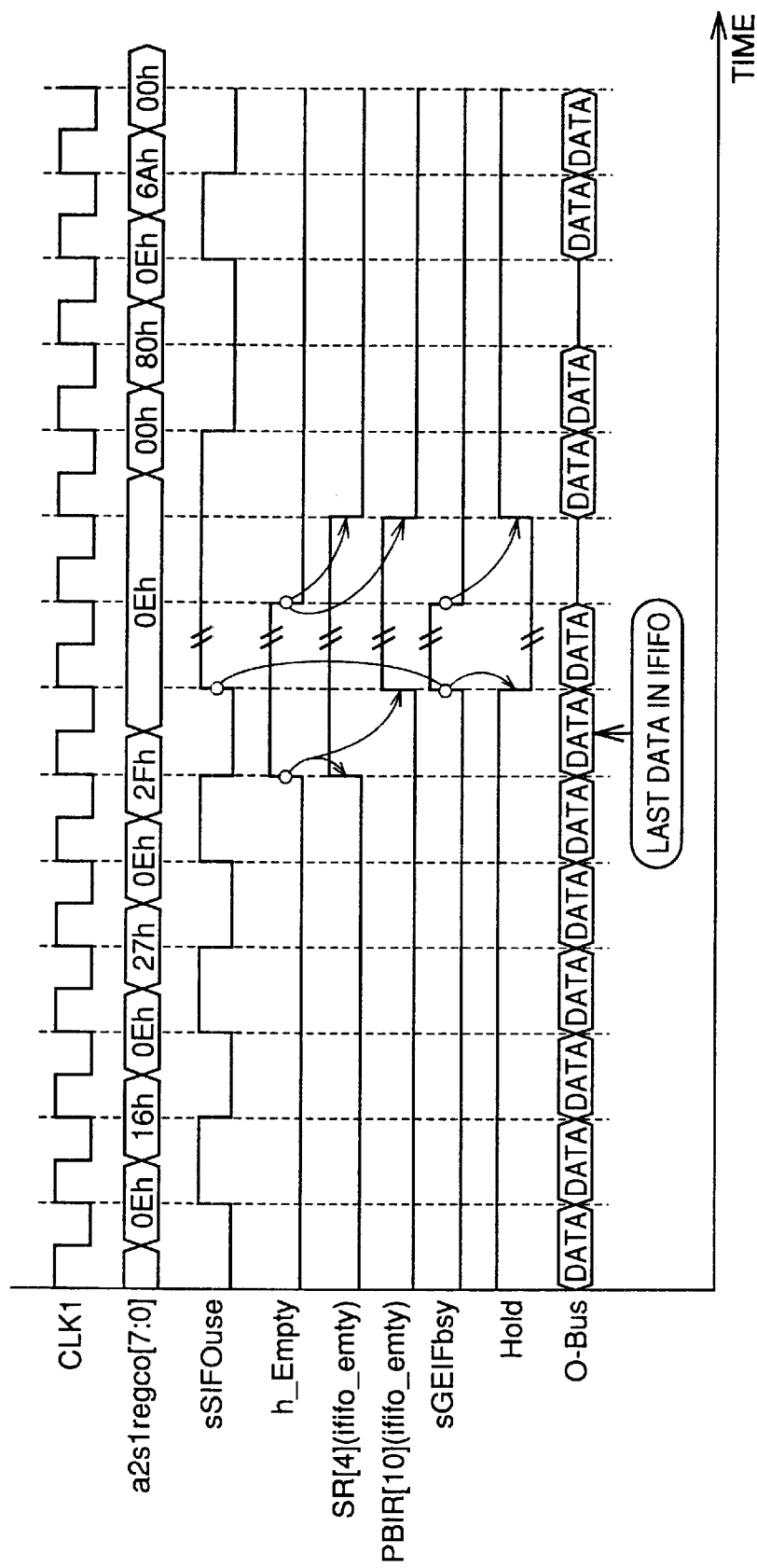
FIG. 30 is a timing chart representing a reading operation of IFIFO.

FIG. 30 shows Hold sequence caused by IFIFO_Empty condition.

(4) Debug Modes

The geometry calculation core in accordance with the present embodiment supports two kinds of debug functions for facilitating programming. The first is a trace mode, and the second is a break point mode.

(4.1) Trace Mode

The trace mode enables debugging of the program in a step by step manner. For the trace mode, the geometry calculation core uses two bit control signals, that is, trace_enable and trace_INT_enable, which are assigned to the PCICR.

When trace_enable is set, the geometry calculation core executes an instruction address by the current value of the program counter (PC=n). After the instruction to be executed is normally finished, the geometry calculation core enters the wait state.

When trace_enable bit and trace_INT_enable are both set, the interrupt signal to host CPU 52 is automatically generated, and the geometry calculation core enters the wait state. As a result, the geometry calculation core is forced to wait consecutively.

Host CPU should respond to the interrupt request from the geometry calculation core, and set the IDLE flag in the PBIR to low, for next step execution. If trace_enable bit is still set, then the above operation will be repeated.

Figure 31:
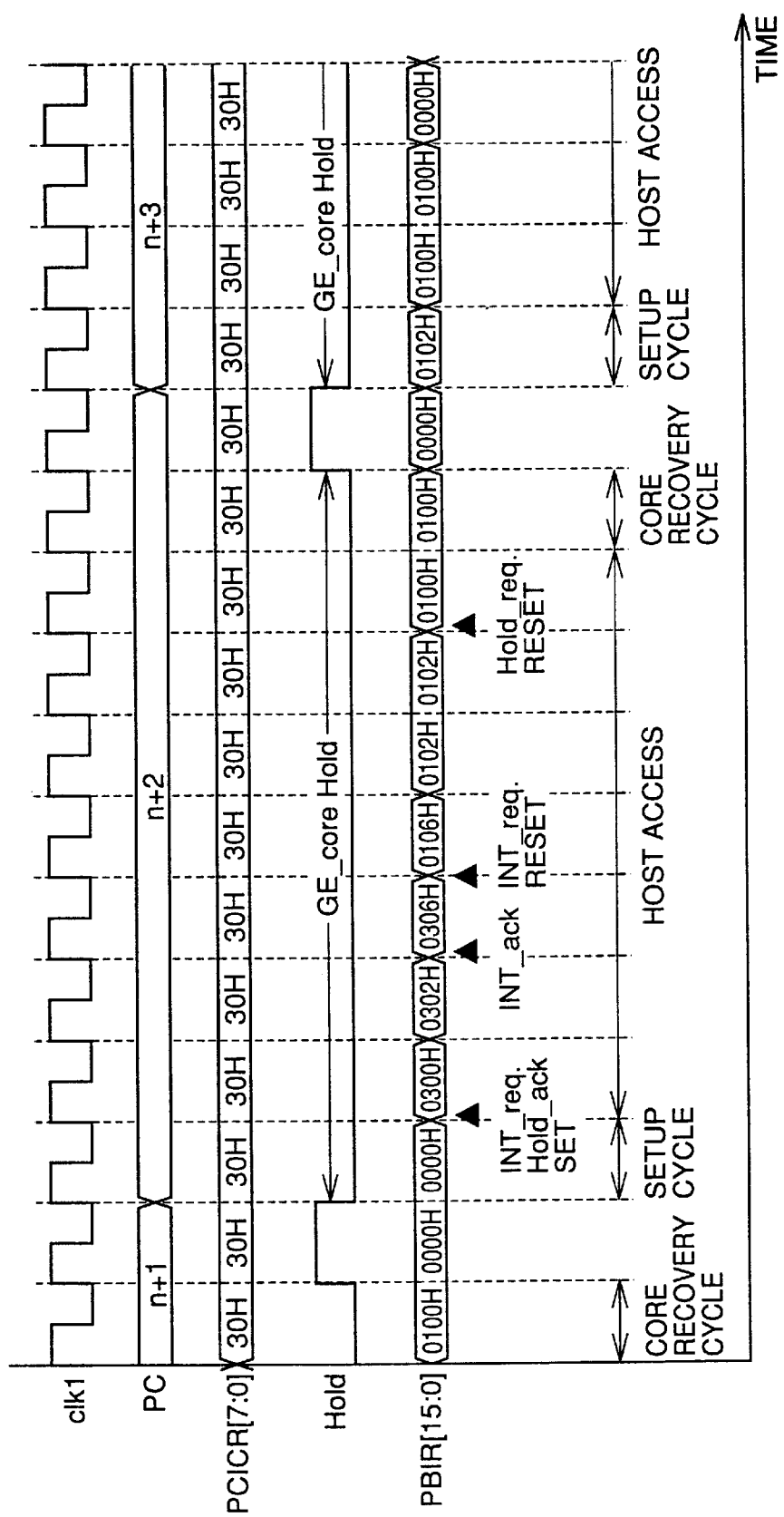
FIG. 31 is a timing chart of a trace mode of the geometry processor for 3D graphics.

FIG. 31 shows in detail the trace mode timing.

(4.2) Breakpoint Mode

A programmer can stop program operations at a program address indicated with a breakpoint address register (PCIAR). The PCIAR may be implemented as one of control registers in the PCI interface. For using the breakpoint function, the programmer should initialize break_enable and break_INT_enable in the PCICR. Both the PCICR and the PCIAR can be directly accessed through the PCI interface. The PCICR and the PCIAR should be initialized before activating the geometry calculation core. That is, these registers should be initialized during the wait state after reset. After the initialization and the resetting of the IDLE flag by the host CPU 52, the geometry calculation core starts the process at PC=0. When the contents of the PC becomes equal to the contents of the PCICR and break_enable flag is set, then the geometry calculation core enters the wait state. The instruction indicated at that time by the PC is normally fetched in the instruction register. Consequent pipeline stages of this instruction, however, would not be executed (wait state). If the break_INT_enable bit is set, the interrupt to the host CPU 52 is automatically generated. After host CPU 52 responds to the interrupt and resets the IDLE flag in the PBIR, the geometry calculation core restarts at the next address of the PCIAR.

Figure 32:
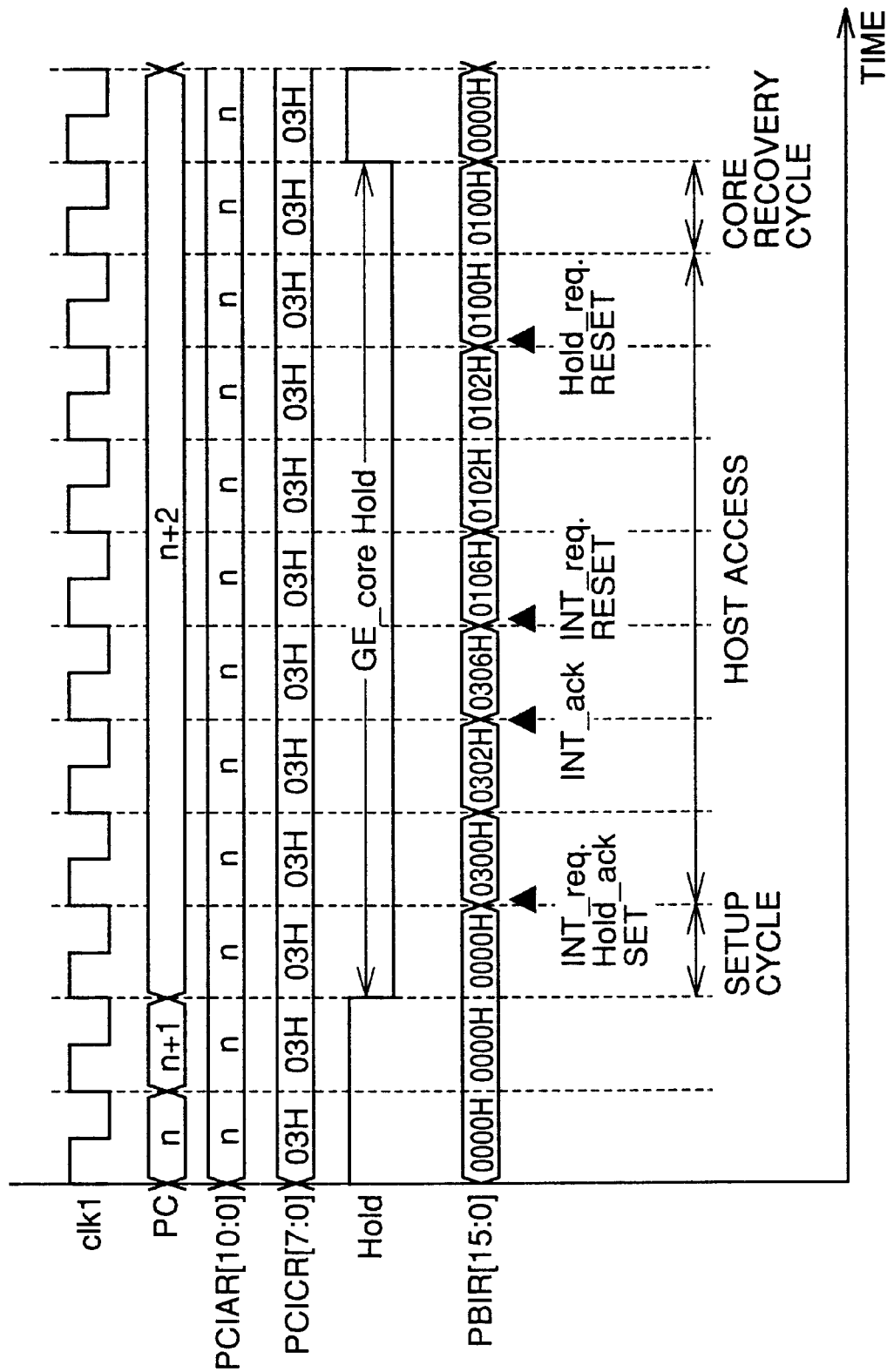
FIG. 32 is a timing chart of a break point mode of the geometry processor for 3D graphics.

FIG. 32 shows in detail the break point mode timings.

(5) JTAG Boundary Scan

The boundary scan technique is defined in "IEEE Standard Test Access Port and Boundary-Scan Architecture." The geometry calculation core in accordance with the present embodiment provides the boundary scan function compliant with the IEEE standard 1149.1-1990. The boundary scan functions supported by the geometry calculation core are EXTEST, BYPASS and SAMPLE/PRELOAD, which are defined as default functions in the above standard.

Figure 33:
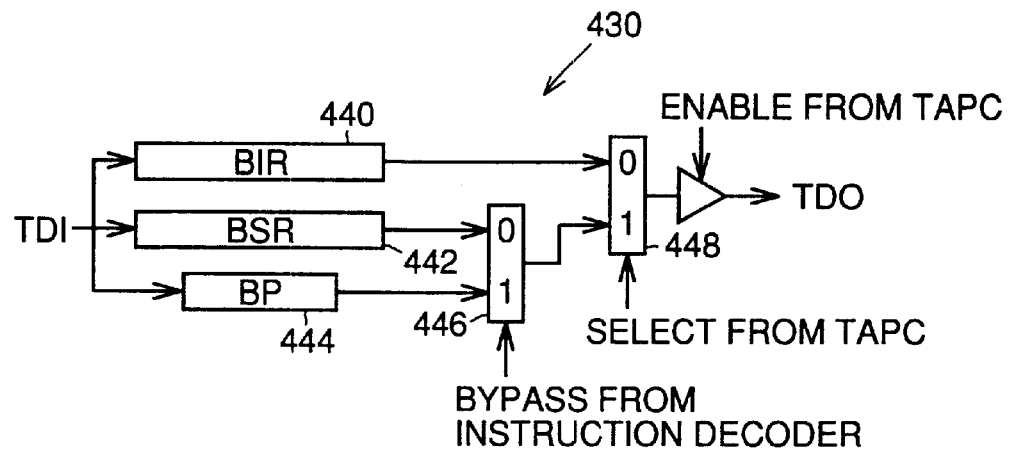
FIG. 33 is a block diagram of a section related to boundary scan of the geometry processor for 3D graphics.

FIG. 33 illustrates an architecture of the boundary scan section in the geometry calculation core in accordance with the present embodiment. The boundary scan circuit 430 provides the JTAG boundary scan function, and includes: an instruction register (BIR 440) of 4 bit register for storing an instruction specifying the operation of the boundary scan circuit 430; a boundary scan register (BSR 442 to which the boundary scan data are shifted and transferred, and for holding test input/output data; a bypass register (BP444) forming a bypass route for the boundary scan data to pass by BSR 442 as needed; a selector 446 for selecting and passing either one of the outputs of BSR 442 and BP444; and a selector 448 for selecting and passing either one of outputs of BIR 440 and selector 446.

Inputs of BIR 440, BSR 442 and BP444 are all connected to a test data input (TDI). An output of selector 448 is connected to a test data output (TDO).

Figure 34:
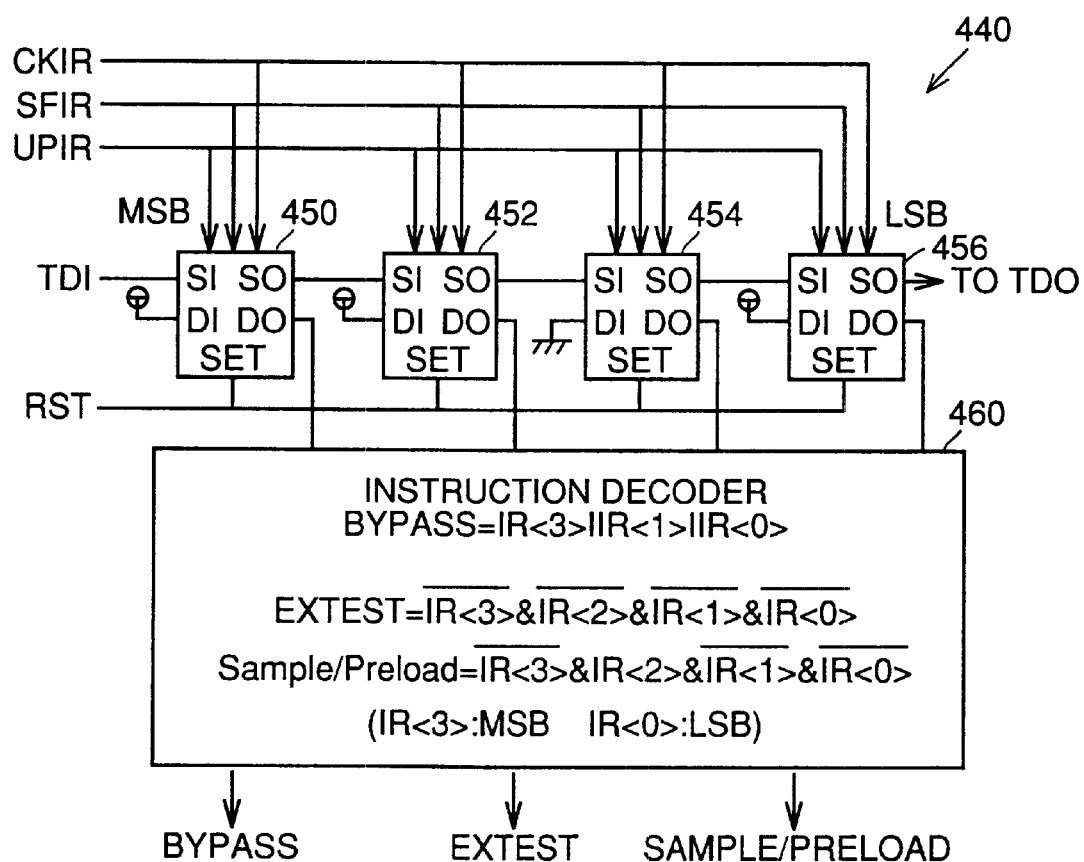
FIG. 34 is a block diagram of an instruction register for boundary scan of the geometry processor for 3D graphics.

More specifically, referring to FIG. 34, BIR 440 includes four shift registers 450 to 456 connected in series between TDI and TDO. Shift register 450 is for storing the most significant bit (MSB) and shift register 456 is for the least significant bit (LSB). Though the number of shift registers is 4 in the example shown in FIG. 34 as the instruction has 4 bits in the present embodiment, the number of shift registers is not limited to 4 and it may be changed in accordance with the number of bits of the instruction. Data outputs DO of shift registers 450 to 456 are connected to an instruction decoder 460.

In the boundary scan circuit 430 shown in FIGS. 33 and 34, first, an instruction is set in BIR 440. In this case, first, the output of BIR 440 is selected by selector 448, and instruction codes are serially transferred from the TDI to the TDO. When respective bits of the instruction code are stored in shift registers 450 to 456, outputs of the shift registers 450 to 456 are applied to instruction decoder 460 and decoded. In accordance with the result of decoding, instruction decoder 460 generates the control signals such as BYPASS, EXTEST or SAMPLE/PRELOAD, by the logic shown in FIG. 34. Table 32 shows relation between instruction codes (4 bits) set in the BIR 440 and functions specified thereby.

TABLE 32

| BIR<4:3> BIR<1:0> | 0 0 | 0 1 | 1 0 | 1 1 |
|---|---|---|---|---|
| 0 0 | EXTEST | SAMPLE/PRELOAD | BYPASS | BYPASS |
| 0 1 | BYPASS | BYPASS | BYPASS | BYPASS |
| 1 0 | BYPASS | BYPASS | BYPASS | BYPASS |
| 1 1 | BYPASS | BYPASS | BYPASS | BYPASS |

When the test data are to be set in the BSR 442, the output of selector 446 is selected by selector 448, and the output of BSR 442 is selected by the selector 446, respectively. The test data are transferred serially from TDI to TDO, and when desired test data are set in respective shift registers in BSR 442, test is executed. The same applies when the test result data are to be output from BSR 442 to TDO.

When it is adapted that the output of selector 446 is selected by selector 448 and the output of BP444 is selected by selector 446, the test data bypasses BSR 442 and output to the next circuit. This makes shorter the shifting path of the test data, and hence reduces the test time.

As described above, according to the present invention, the geometry calculation core is provided with a floating point calculating unit of SIMD type architecture, and further with a floating point power computing unit and the integer calculating unit. Therefore, the geometry processor is capable of processing geometry calculations especially in the 3D graphics system at high speed. Further, as the geometry calculation processor has three external interfaces, data output after calculation and operation of the geometry calculation core can be executed in parallel.

According to the preferred embodiment, data necessary for the calculating process can all be prepared in one cycle, and the result of simultaneous calculation process can be stored in the destination. This facilitates pipelining, and improves speed of processing.

As two data buses are used for data exchange within the geometry calculation core, the wait time until the data bus is granted can be eliminated, and therefore the speed of operation can further be improved.

Data output involving serial data conversion to the output FIFO can be performed independent from and in parallel to the processing by the geometry calculation core. Therefore, processings can be multiplexed within the geometry calculation processor, and hence the speed of operation is improved.

The operation sequences are controlled by a controller different from the host processor, and three addresses are generated for executing operations and output to three address buses. Accordingly, execution cycles of operations can be shortened, and the speed of overall processing can be improved.

After the contents of the first register are copied in the second register, operation of the geometry calculation core based on the contents of the second register can be performed parallel to the process of storing the next instruction to the first register. Accordingly, processes can be multiplexed, and the speed is improved.

Further, the geometry calculation processor in accordance with the present invention is capable of calculating power by a simple structure, and enables pipelining of the process of calculation. Therefore, graphics processing which frequently employs power calculation, can be done at high speed.

In the geometry calculation processor in accordance with the present invention, data transfer to the output FIFO is performed in the burst manner in response to an output request from the arithmetic processing unit, and therefore the speed of output of process itself can be improved. Further, during this period, the arithmetic processing unit can execute the next operation parallel to the data output. Therefore, the speed of overall processing can further be improved. Even when data cannot be received because of remaining data in the output FIFO, the data output can be controlled without the necessity of control by the host processor or the arithmetic processing unit. Therefore, for normal output processing, the load on the arithmetic processing unit is not increased.

Further, the geometry calculation processor of the present invention is provided with two modes, that is, writing not going over the bank boundary, and writing permitting going over of the bank boundary. Accordingly, in the geometry processor of the present invention, write position is controlled simply by mode designation, and therefore load on the processing apparatus using the data output control apparatus is reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A geometry processor, comprising:
   first and second external interface ports independent from each other, connected to a host processor, and a rendering processor, respectively; and
   a geometry calculation core provided with a geometry calculation instruction from said host processor through said first external interface,
   said geometry calculation core including
      a plurality of SIMD type floating point calculating units each having an input connected to said first external interface,
      a floating point power computing unit having an input connected to said first external interface,
      an integer calculating unit having an input connected to said first external interface,
      a controller responsive to an instruction from said host processor which controls the plurality of floating point calculating units, the floating point computing unit and the integer calculating unit to process data from said host processor, and
      an output controller connected to outputs of said plurality of floating points calculating units, an output of said floating point power computing unit and an output of said integer calculating unit, which outputs data after processing by these units, to said rendering processor through said second external interface.

2. The geometry processor according to claim 1, wherein said geometry calculation core further includes
   a first data bus capable of communicating with said first and second external interface ports, said plurality of floating point calculating units, said floating point power computing unit, said integer calculating unit and said controller,
   a second data bus connecting said plurality of floating point calculating units and said floating point power computing unit,
   a third data bus which conveys data received from said plurality of floating point calculating units and said floating point power computing unit to said second external interface port, and
   a first address bus, a second address bus and a third address bus each being capable of communicating with said first extending interface port, said plurality of floating point calculating units, said geometry processor, said integer calculating unit and said controller, which conveys mutually independent three addresses generated by said controller; and wherein
      said first data bus is capable of multicasting data among components connected to said first data bus.

3. The geometry processor according to claim 2, wherein said second data bus includes a first unidirectional data bus which conveys outputs of said plurality of floating point calculating units to said geometry processor, and a second unidirectional data bus which applies an output of said geometry processor to said plurality of floating point calculating units.

4. The geometry processor according to claim 3, further comprising
   an output FIFO provided between said third data bus and said second external interface; wherein
      said third data bus has a function of converting parallel data as outputs of the geometry processor for three dimensional graphics and the geometry processor to serial data and providing the serial data to said output FIFO.

5. The geometry processor according to claim 4, wherein said controller includes
   an instruction memory storing a graphic processing instruction applied through said first external interface port,
   a sequencer which decodes an instruction stored in said instruction memory to control operation sequences of said plurality of floating point calculating units, the geometry processor and said integer calculating unit in accordance with the result of decoding, and
   an address generating circuit which generates three independent addresses to be output to said first, second and third address buses under the control of said sequencer.

6. The geometry processor according to claim 3, wherein said controller includes
   an instruction memory storing a graphic processing instruction applied through said first external interface port,
   a sequencer which decodes an instruction stored in said instruction memory to control operation sequences of said plurality of floating point calculating units, the geometry processor and said integer calculating unit in accordance with the result of decoding, and
   an address generating circuit which generates three independent addresses to be output to said first, second and third address buses under the control of said sequencer.

7. The geometry processor according to claim 2, further comprising
an output FIFO provided between said third data bus and said second external interface; wherein
said third data bus has a function of converting parallel data as outputs of the geometry processor for three dimensional graphics and the geometry processor to serial data and providing the serial data to said output FIFO.

8. The geometry processor according to claim 7, wherein said controller includes
an instruction memory storing a graphic processing instruction applied through said first external interface port,
a sequencer for decoding an instruction stored in said instruction memory which controls operation sequences of said plurality of floating point calculating units, the geometry processor and said integer calculating unit in accordance with the result of decoding, and
an address generating circuit which generates three independent addresses to be output to said first, second and third address buses under the control of said sequencer.

9. The geometry processor according to claim 2, wherein said controller includes
an instruction memory storing a graphic processing instruction applied through said first external interface port,
a sequencer which decodes an instruction stored in said instruction memory to control operation sequences of said plurality of floating point calculating units, the geometry processor and said integer calculating unit in accordance with the result of decoding, and
an address generating circuit which generates three independent addresses to be output to said first, second and third address buses under the control of said sequencer.

10. A geometry processor, comprising:
an external interface port including a first register connected to a host processor which stores information to be exchanged with said host processor;
a geometry calculation core which processes an instruction applied from said host processor through said external interface;
a second register; and
a circuit which copies contents of said first register provided from said host processor to said second register; wherein
said geometry calculation core operates in accordance with the contents of said second register;
said geometry processor further comprising
a circuit which performs communication between said host processor and said external interface port in parallel with an operation of said geometry calculation core in accordance with the contents of said second register.

11. The geometry processor according to claim 10, further comprising
an input FIFO for data supplied from the host computer to said geometry calculation core; wherein
said geometry calculation core accesses said input FIFO in response to the contents of said second register, and temporarily stops operation when said input FIFO is empty.

* * * * *

UNITED STATES PATENT AND TRADEMARK OFFICE
CERTIFICATE OF CORRECTION

PATENT NO.     : 6,603,481 B1
DATED          : August 5, 2003
INVENTOR(S)    : Hiroyuki Kawai et al.

It is certified that error appears in the above-identified patent and that said Letters Patent is hereby corrected as shown below:

Column 48,
Lines 18-19, delete "said geometry processor"

Colum 50,
Line 10, after the word "interface" insert the word -- port --

Signed and Sealed this

Fifteenth Day of June, 2004

JON W. DUDAS
*Acting Director of the United States Patent and Trademark Office*